US012718378B2

(12) United States Patent
Fujiwara et al.

(10) Patent No.: US 12,718,378 B2

(45) Date of Patent: Aug. 25, 2026

(54) IMAGING APPARATUS, IMAGING METHOD, AND PROGRAM THAT OUTPUT IMAGE DATA INCLUDING BOUNDARY PORTION OF DEPTH OF FIELD

(71) Applicant: FUJIFILM Corporation, Tokyo (JP)

(72) Inventors: Shinya Fujiwara, Saitama (JP); Taro Saito, Saitama (JP); Yukinori Nishiyama, Saitama (JP); Takehiro Koguchi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 265 days.

(21) Appl. No.: 18/539,234

(22) Filed: Dec. 13, 2023

(65) Prior Publication Data

US 2024/0119599 A1 Apr. 11, 2024

Related U.S. Application Data

(63) Continuation of application No. PCT/JP2022/019582, filed on May 6, 2022.

(30) Foreign Application Priority Data

Jun. 30, 2021 (JP) ................................ 2021-109304

(51) Int. Cl.
*G06T 7/13* (2017.01)
*G06F 3/14* (2006.01)
(Continued)

(52) U.S. Cl.
CPC .................. *G06T 7/13* (2017.01); *G06F 3/14* (2013.01); *G06T 5/50* (2013.01); *G06V 10/25* (2022.01);
(Continued)

(58) Field of Classification Search
CPC ........ G03B 13/36; G03B 13/32; G03B 15/00; H04N 23/675; H04N 23/959;
(Continued)

(56) References Cited

U.S. PATENT DOCUMENTS

2010/0157127 A1* 6/2010 Takayanagi ............ H04N 23/63 348/E5.022
2012/0027393 A1* 2/2012 Tsuda .................. H04N 23/675 396/102

(Continued)

FOREIGN PATENT DOCUMENTS

JP H10197938 7/1998
JP 2005338614 12/2005

(Continued)

OTHER PUBLICATIONS

"International Search Report (Form PCT/ISA/210) of PCT/JP2022/019582," mailed on Aug. 2, 2022, with English translation thereof, pp. 1-5.

(Continued)

*Primary Examiner* — Emily C Terrell

(74) *Attorney, Agent, or Firm* — JCIPRNET

(57) ABSTRACT

There is provided an imaging apparatus including an image sensor and a processor, in which the processor acquires distance data related to distances between the imaging apparatus and a plurality of subjects within an imaging area imaged by the image sensor, generates boundary data indicating a region of a boundary subject that is present at a distance of a boundary portion of a depth of field among the plurality of subjects, based on the distance data, generates moving image data including the boundary data based on image data obtained by imaging with the image sensor, and outputs the moving image data.

26 Claims, 28 Drawing Sheets

(51) Int. Cl.
*G06T 5/50* (2006.01)
*G06V 10/25* (2022.01)
*G06V 10/74* (2022.01)

(52) U.S. Cl.
CPC .. *G06V 10/761* (2022.01); *G06T 2207/20221* (2013.01)

(58) Field of Classification Search
CPC .... H04N 23/635; H04N 23/61; H04N 23/611; H04N 23/633; G06T 2207/20221; G06T 2207/10028; G06T 7/11; G06V 10/25
See application file for complete search history.

(56) References Cited

U.S. PATENT DOCUMENTS

2014/0253760 A1* 9/2014 Watanabe ............ H04N 23/632
348/222.1
2016/0134807 A1 5/2016 Tsutsumi
2021/0011169 A1* 1/2021 Yang ...................... H04N 25/40
2022/0046228 A1* 2/2022 Haskin ................. H04N 17/002
2023/0326170 A1* 10/2023 Sakurabu ............... G06V 10/25
2024/0020968 A1* 1/2024 Haskin .................... G06F 16/29
2024/0320786 A1* 9/2024 McIntosh ................ G06T 7/246

FOREIGN PATENT DOCUMENTS

JP 2007214845 8/2007
JP 2008145465 6/2008
JP 2010093422 4/2010
JP 2010177741 8/2010
JP 2012124555 6/2012
JP 2015188251 10/2015

OTHER PUBLICATIONS

"Written Opinion of the International Searching Authority (Form PCT/ISA/237) of PCT/JP2022/019582," mailed on Aug. 2, 2022, with English translation thereof, pp. 1-6.

* cited by examiner

CONTROLLER
CPU
NVM
MOVING IMAGE DATA
RAM
IMAGE MEMORY
UI TYPE DEVICE
DISPLAY
RECEPTION DEVICE
TOUCH PANEL
HARD KEY UNIT
EXTERNAL I/F
COMMUNICATION I/F
INPUT/OUTPUT INTERFACE
IMAGING TIME SIGNAL
PHOTOELECTRIC CONVERSION ELEMENT DRIVER
IMAGE SENSOR
IMAGING DATA
A/D CONVERTER
CONTROL DEVICE
10 12 16 18 20 28 30 36 37 38 39 40 40A 40B 40C 40D 40D1 40D2 42A 42B 42C 46 48 50 52 54 62 64 66 68 70 72 72A 73 74 76 78 80 OA

ALLOWABLE CONFUSION CIRCLE DIAMETER $\delta$

72

72A

40

IMAGE DISTANCE

OBJECT DISTANCE

NEAR POINT DISTANCE

FAR POINT DISTANCE

DEPTH DIRECTION

NEAR POINT

FRONT SIDE DEPTH OF FIELD

FOCUSING POSITION

DEPTH OF FIELD

REAR SIDE DEPTH OF FIELD

FAR POINT

OA

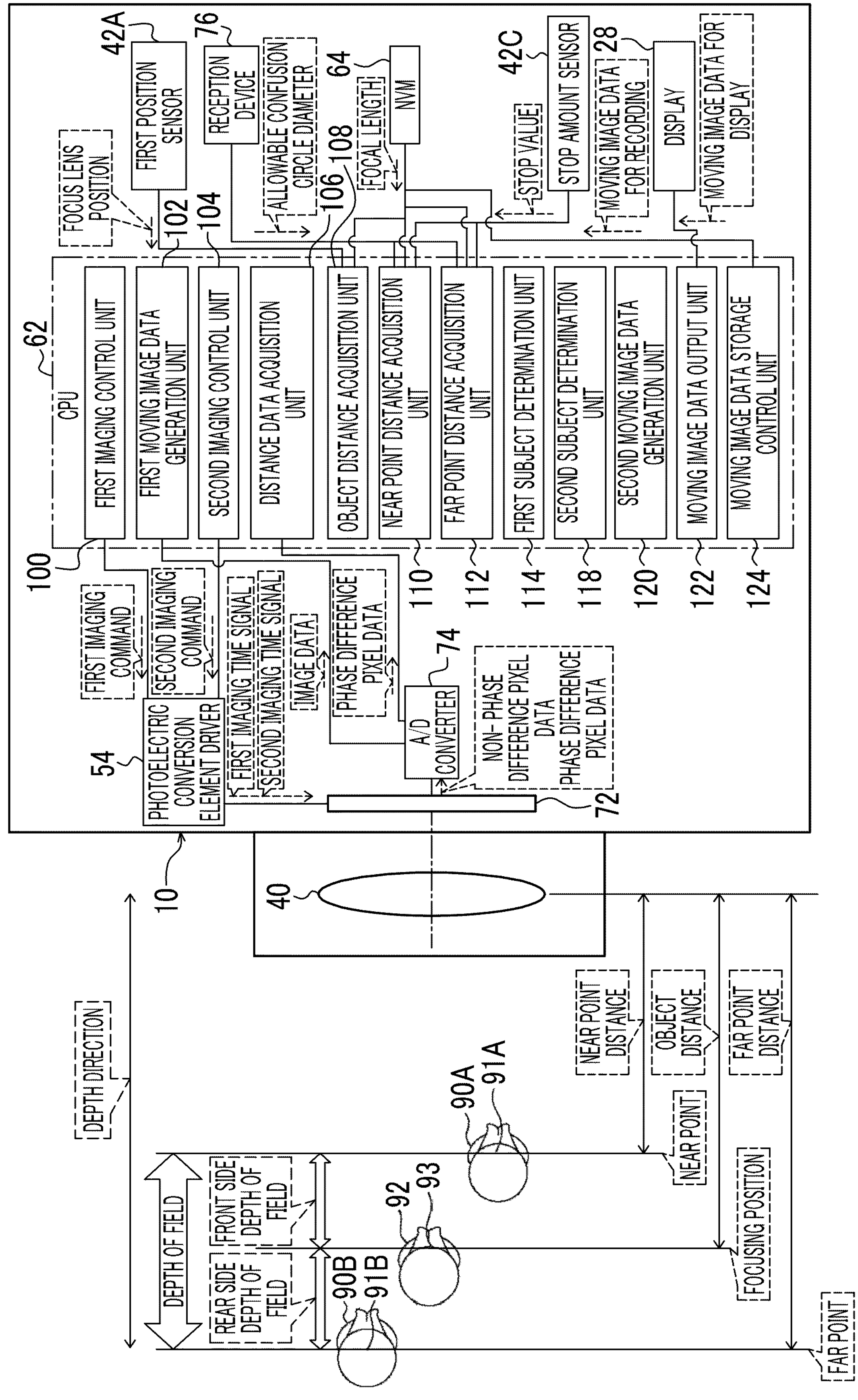

FIG. 6

10
40
54 PHOTOELECTRIC CONVERSION ELEMENT DRIVER
72
74 A/D CONVERTER
NON-PHASE DIFFERENCE PIXEL DATA
PHASE DIFFERENCE PIXEL DATA
FIRST IMAGING COMMAND
SECOND IMAGING COMMAND
FIRST IMAGING TIME SIGNAL
SECOND IMAGING TIME SIGNAL
IMAGE DATA
PHASE DIFFERENCE PIXEL DATA
100
62 CPU
FIRST IMAGING CONTROL UNIT
102 FIRST MOVING IMAGE DATA GENERATION UNIT
104 SECOND IMAGING CONTROL UNIT
106 DISTANCE DATA ACQUISITION UNIT
108 OBJECT DISTANCE ACQUISITION UNIT
110 NEAR POINT DISTANCE ACQUISITION UNIT
112 FAR POINT DISTANCE ACQUISITION UNIT
114 FIRST SUBJECT DETERMINATION UNIT
118 SECOND SUBJECT DETERMINATION UNIT
120 SECOND MOVING IMAGE DATA GENERATION UNIT
122 MOVING IMAGE DATA OUTPUT UNIT
124 MOVING IMAGE DATA STORAGE CONTROL UNIT
FOCUS LENS POSITION
42A FIRST POSITION SENSOR
76 RECEPTION DEVICE
ALLOWABLE CONFUSION CIRCLE DIAMETER
64 NVM
FOCAL LENGTH
STOP VALUE
42C STOP AMOUNT SENSOR
MOVING IMAGE DATA FOR RECORDING
28 DISPLAY
MOVING IMAGE DATA FOR DISPLAY
DEPTH DIRECTION
NEAR POINT DISTANCE
OBJECT DISTANCE
FAR POINT DISTANCE
90A 91A
NEAR POINT
92 93
FOCUSING POSITION
90B 91B
FAR POINT
DEPTH OF FIELD
FRONT SIDE DEPTH OF FIELD
REAR SIDE DEPTH OF FIELD

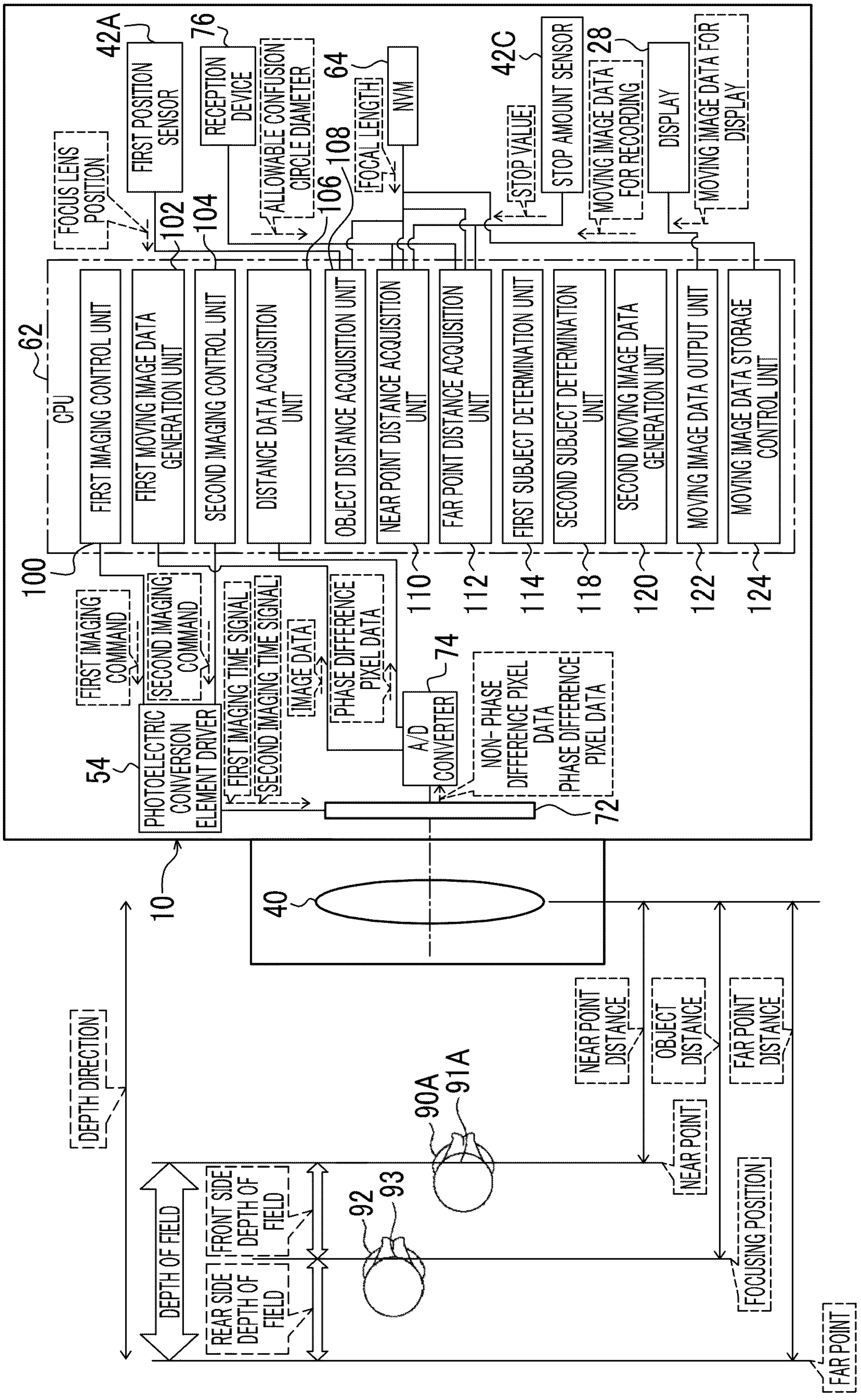

FIG. 8

CPU
FIRST IMAGING CONTROL UNIT
FIRST MOVING IMAGE DATA GENERATION UNIT
SECOND IMAGING CONTROL UNIT
DISTANCE DATA ACQUISITION UNIT
OBJECT DISTANCE ACQUISITION UNIT
NEAR POINT DISTANCE ACQUISITION UNIT
FAR POINT DISTANCE ACQUISITION UNIT
FIRST SUBJECT DETERMINATION UNIT
SECOND SUBJECT DETERMINATION UNIT
SECOND MOVING IMAGE DATA GENERATION UNIT
MOVING IMAGE DATA OUTPUT UNIT
MOVING IMAGE DATA STORAGE CONTROL UNIT
FIRST POSITION SENSOR
RECEPTION DEVICE
NVM
STOP AMOUNT SENSOR
DISPLAY
FOCUS LENS POSITION
ALLOWABLE CONFUSION CIRCLE DIAMETER
FOCAL LENGTH
STOP VALUE
MOVING IMAGE DATA FOR RECORDING
MOVING IMAGE DATA FOR DISPLAY
FIRST IMAGING COMMAND
SECOND IMAGING COMMAND
FIRST IMAGING TIME SIGNAL
SECOND IMAGING TIME SIGNAL
IMAGE DATA
PHASE DIFFERENCE PIXEL DATA
PHOTOELECTRIC CONVERSION ELEMENT DRIVER
A/D CONVERTER
NON-PHASE DIFFERENCE PIXEL DATA
PHASE DIFFERENCE PIXEL DATA
DEPTH DIRECTION
DEPTH OF FIELD
FRONT SIDE DEPTH OF FIELD
REAR SIDE DEPTH OF FIELD
NEAR POINT DISTANCE
OBJECT DISTANCE
FAR POINT DISTANCE
NEAR POINT
FOCUSING POSITION
FAR POINT
10, 28, 40, 42A, 42C, 54, 62, 64, 72, 74, 76, 90A, 91A, 92, 93, 100, 102, 104, 106, 108, 110, 112, 114, 118, 120, 122, 124

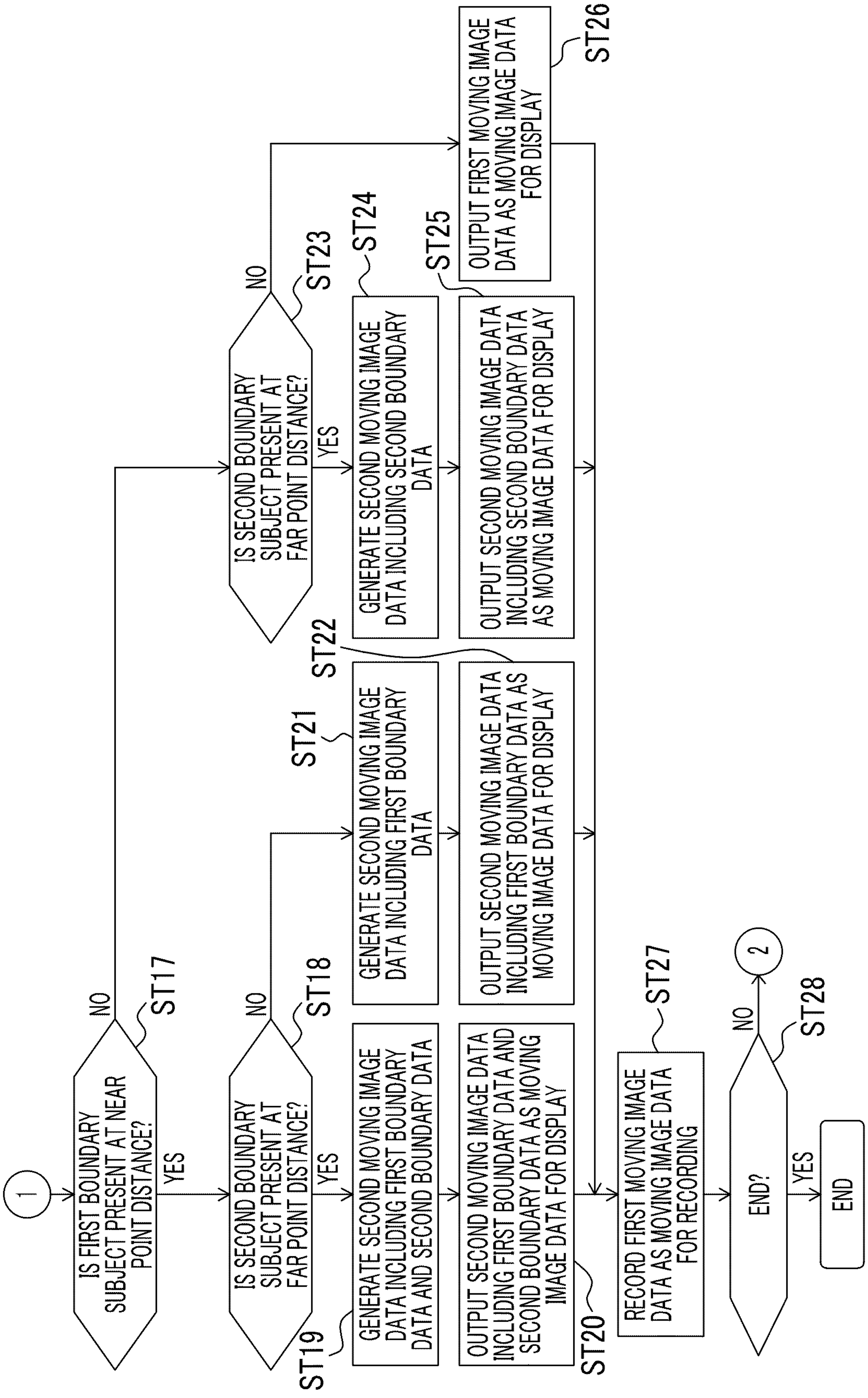

FIG. 12B
1
IS FIRST BOUNDARY SUBJECT PRESENT AT NEAR POINT DISTANCE?
ST17
YES
NO
IS SECOND BOUNDARY SUBJECT PRESENT AT FAR POINT DISTANCE?
ST18
YES
NO
ST19
GENERATE SECOND MOVING IMAGE DATA INCLUDING FIRST BOUNDARY DATA AND SECOND BOUNDARY DATA
OUTPUT SECOND MOVING IMAGE DATA INCLUDING FIRST BOUNDARY DATA AND SECOND BOUNDARY DATA AS MOVING IMAGE DATA FOR DISPLAY
ST20
ST21
GENERATE SECOND MOVING IMAGE DATA INCLUDING FIRST BOUNDARY DATA
ST22
OUTPUT SECOND MOVING IMAGE DATA INCLUDING FIRST BOUNDARY DATA AS MOVING IMAGE DATA FOR DISPLAY
IS SECOND BOUNDARY SUBJECT PRESENT AT FAR POINT DISTANCE?
ST23
YES
NO
GENERATE SECOND MOVING IMAGE DATA INCLUDING SECOND BOUNDARY DATA
ST24
ST25
OUTPUT SECOND MOVING IMAGE DATA INCLUDING SECOND BOUNDARY DATA AS MOVING IMAGE DATA FOR DISPLAY
OUTPUT FIRST MOVING IMAGE DATA AS MOVING IMAGE DATA FOR DISPLAY
ST26
RECORD FIRST MOVING IMAGE DATA AS MOVING IMAGE DATA FOR RECORDING
ST27
END?
NO
2
ST28
YES
END

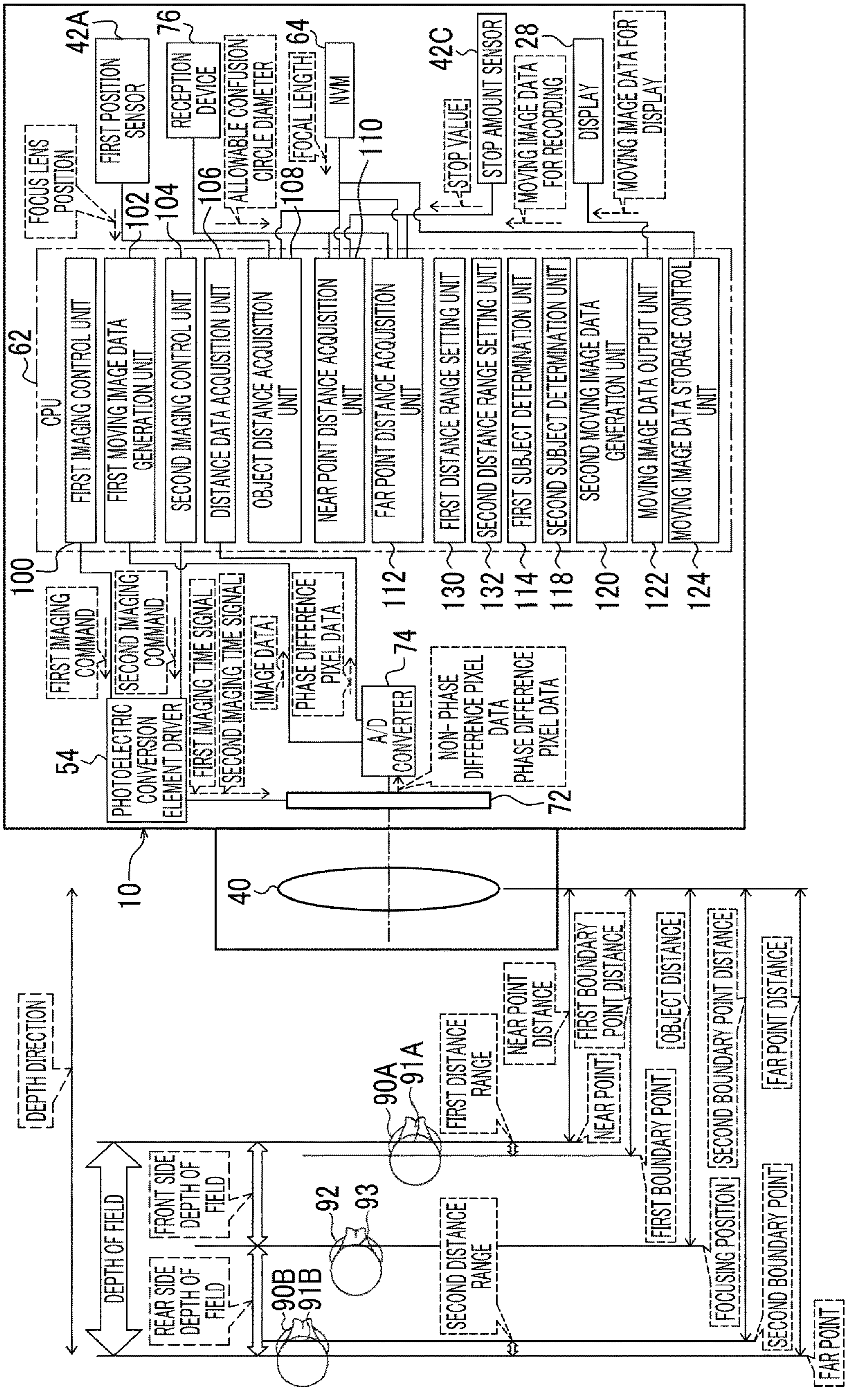

FIG. 13

10
40
54 PHOTOELECTRIC CONVERSION ELEMENT DRIVER
FIRST IMAGING COMMAND
SECOND IMAGING COMMAND
FIRST IMAGING TIME SIGNAL
SECOND IMAGING TIME SIGNAL
IMAGE DATA
PHASE DIFFERENCE PIXEL DATA
74 A/D CONVERTER
NON-PHASE DIFFERENCE PIXEL DATA
PHASE DIFFERENCE PIXEL DATA
72
62 CPU
100 FIRST IMAGING CONTROL UNIT
102 FIRST MOVING IMAGE DATA GENERATION UNIT
104 SECOND IMAGING CONTROL UNIT
106 DISTANCE DATA ACQUISITION UNIT
108 OBJECT DISTANCE ACQUISITION UNIT
110 NEAR POINT DISTANCE ACQUISITION UNIT
112 FAR POINT DISTANCE ACQUISITION UNIT
130 FIRST DISTANCE RANGE SETTING UNIT
132 SECOND DISTANCE RANGE SETTING UNIT
114 FIRST SUBJECT DETERMINATION UNIT
118 SECOND SUBJECT DETERMINATION UNIT
120 SECOND MOVING IMAGE DATA GENERATION UNIT
122 MOVING IMAGE DATA OUTPUT UNIT
124 MOVING IMAGE DATA STORAGE CONTROL UNIT
FOCUS LENS POSITION
42A FIRST POSITION SENSOR
76 RECEPTION DEVICE
ALLOWABLE CONFUSION CIRCLE DIAMETER
FOCAL LENGTH
64 NVM
STOP VALUE
42C STOP AMOUNT SENSOR
MOVING IMAGE DATA FOR RECORDING
28 DISPLAY
MOVING IMAGE DATA FOR DISPLAY
DEPTH DIRECTION
DEPTH OF FIELD
FRONT SIDE DEPTH OF FIELD
REAR SIDE DEPTH OF FIELD
90A
91A
92
93
90B
91B
FIRST DISTANCE RANGE
SECOND DISTANCE RANGE
NEAR POINT DISTANCE
NEAR POINT
FIRST BOUNDARY POINT DISTANCE
FIRST BOUNDARY POINT
OBJECT DISTANCE
FOCUSING POSITION
SECOND BOUNDARY POINT DISTANCE
SECOND BOUNDARY POINT
FAR POINT DISTANCE
FAR POINT

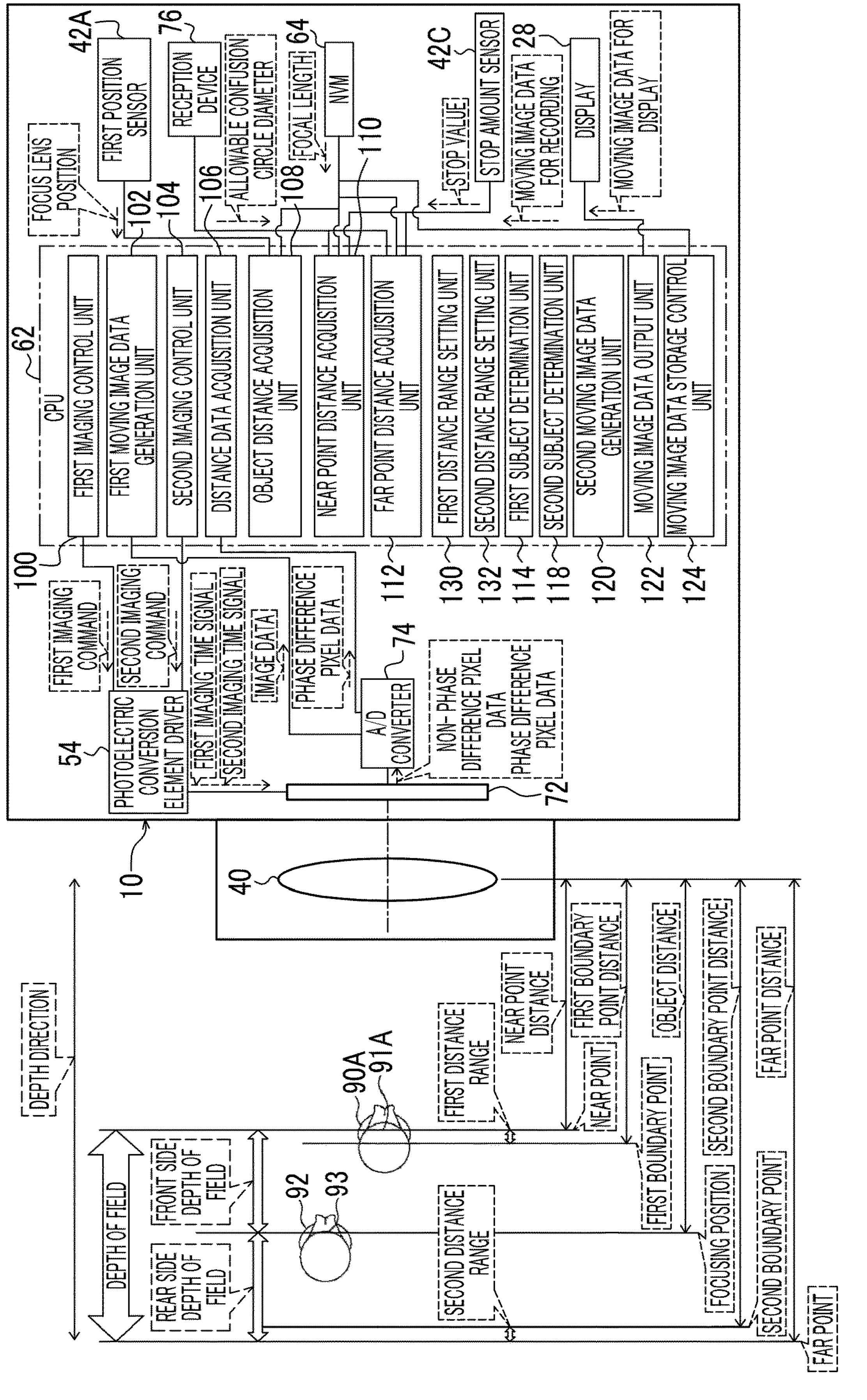

FIG. 14
DEPTH DIRECTION
DEPTH OF FIELD
REAR SIDE DEPTH OF FIELD
FRONT SIDE DEPTH OF FIELD
92
93
90A
91A
SECOND DISTANCE RANGE
FIRST DISTANCE RANGE
NEAR POINT DISTANCE
NEAR POINT
FIRST BOUNDARY POINT DISTANCE
FIRST BOUNDARY POINT
OBJECT DISTANCE
FOCUSING POSITION
SECOND BOUNDARY POINT DISTANCE
SECOND BOUNDARY POINT
FAR POINT DISTANCE
FAR POINT
10
40
54
PHOTOELECTRIC CONVERSION ELEMENT DRIVER
FIRST IMAGING COMMAND
SECOND IMAGING COMMAND
FIRST IMAGING TIME SIGNAL
SECOND IMAGING TIME SIGNAL
IMAGE DATA
PHASE DIFFERENCE PIXEL DATA
A/D CONVERTER
74
NON- PHASE DIFFERENCE PIXEL DATA
PHASE DIFFERENCE PIXEL DATA
72
100
62
CPU
FIRST IMAGING CONTROL UNIT
FIRST MOVING IMAGE DATA GENERATION UNIT
SECOND IMAGING CONTROL UNIT
DISTANCE DATA ACQUISITION UNIT
OBJECT DISTANCE ACQUISITION UNIT
NEAR POINT DISTANCE ACQUISITION UNIT
FAR POINT DISTANCE ACQUISITION UNIT
FIRST DISTANCE RANGE SETTING UNIT
SECOND DISTANCE RANGE SETTING UNIT
FIRST SUBJECT DETERMINATION UNIT
SECOND SUBJECT DETERMINATION UNIT
SECOND MOVING IMAGE DATA GENERATION UNIT
MOVING IMAGE DATA OUTPUT UNIT
MOVING IMAGE DATA STORAGE CONTROL UNIT
112
130
132
114
118
120
122
124
102
104
106
108
110
FOCUS LENS POSITION
42A
FIRST POSITION SENSOR
76
RECEPTION DEVICE
ALLOWABLE CONFUSION CIRCLE DIAMETER
FOCAL LENGTH
64
NVM
STOP VALUE
42C
STOP AMOUNT SENSOR
MOVING IMAGE DATA FOR RECORDING
28
DISPLAY
MOVING IMAGE DATA FOR DISPLAY

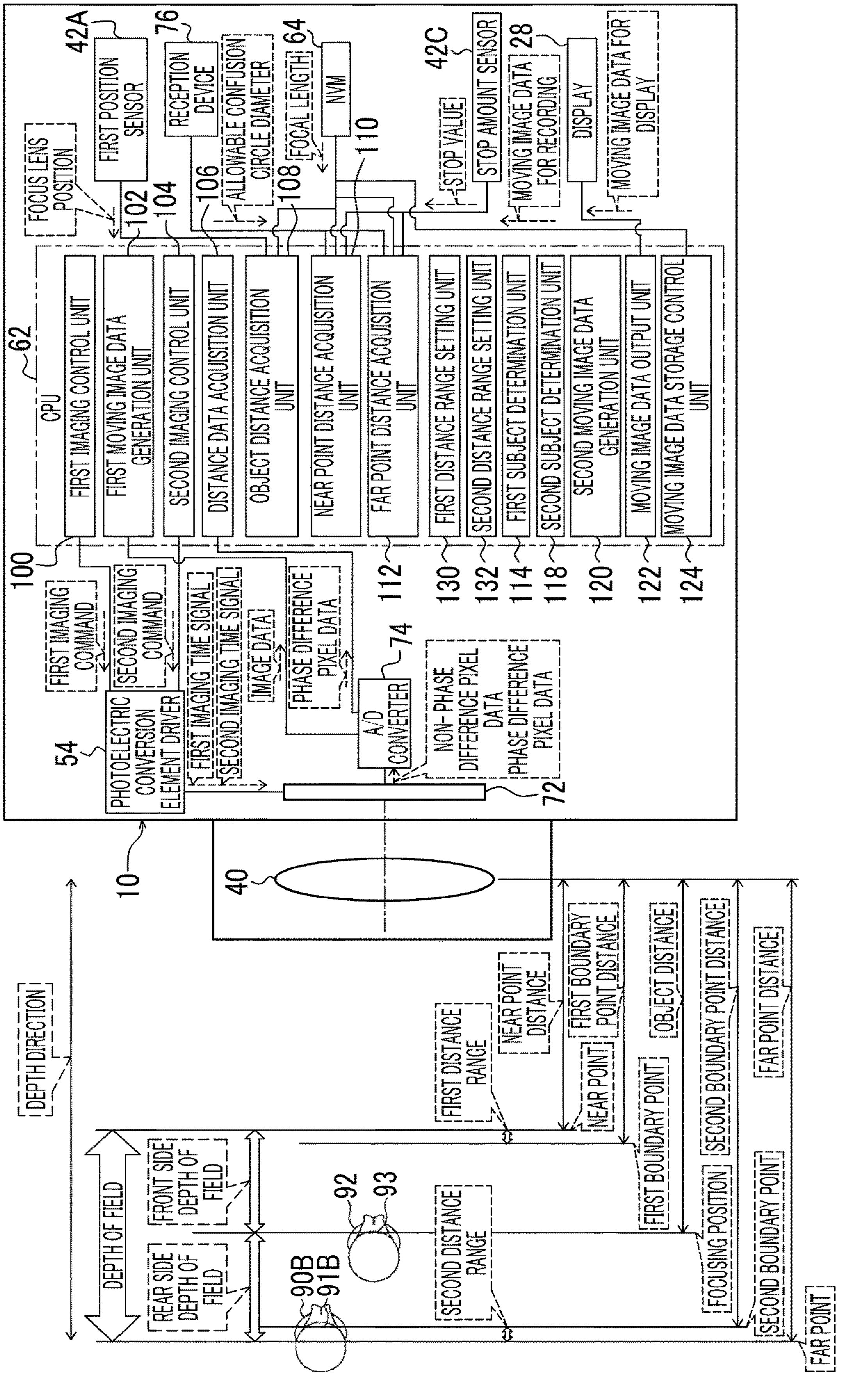

FIG. 15

10
40
54
PHOTOELECTRIC CONVERSION ELEMENT DRIVER
72
74
A/D CONVERTER
NON-PHASE DIFFERENCE PIXEL DATA
PHASE DIFFERENCE PIXEL DATA
FIRST IMAGING COMMAND
SECOND IMAGING COMMAND
FIRST IMAGING TIME SIGNAL
SECOND IMAGING TIME SIGNAL
IMAGE DATA
PHASE DIFFERENCE PIXEL DATA
100
62
CPU
FIRST IMAGING CONTROL UNIT
102
FIRST MOVING IMAGE DATA GENERATION UNIT
104
SECOND IMAGING CONTROL UNIT
106
DISTANCE DATA ACQUISITION UNIT
108
OBJECT DISTANCE ACQUISITION UNIT
110
NEAR POINT DISTANCE ACQUISITION UNIT
112
FAR POINT DISTANCE ACQUISITION UNIT
130
FIRST DISTANCE RANGE SETTING UNIT
132
SECOND DISTANCE RANGE SETTING UNIT
114
FIRST SUBJECT DETERMINATION UNIT
118
SECOND SUBJECT DETERMINATION UNIT
120
SECOND MOVING IMAGE DATA GENERATION UNIT
122
MOVING IMAGE DATA OUTPUT UNIT
124
MOVING IMAGE DATA STORAGE CONTROL UNIT
42A
FIRST POSITION SENSOR
FOCUS LENS POSITION
76
RECEPTION DEVICE
ALLOWABLE CONFUSION CIRCLE DIAMETER
64
NVM
FOCAL LENGTH
42C
STOP AMOUNT SENSOR
STOP VALUE
28
DISPLAY
MOVING IMAGE DATA FOR RECORDING
MOVING IMAGE DATA FOR DISPLAY
DEPTH DIRECTION
DEPTH OF FIELD
FRONT SIDE DEPTH OF FIELD
REAR SIDE DEPTH OF FIELD
90B
91B
92
93
FIRST DISTANCE RANGE
SECOND DISTANCE RANGE
NEAR POINT DISTANCE
NEAR POINT
FIRST BOUNDARY POINT DISTANCE
FIRST BOUNDARY POINT
OBJECT DISTANCE
FOCUSING POSITION
SECOND BOUNDARY POINT DISTANCE
SECOND BOUNDARY POINT
FAR POINT DISTANCE
FAR POINT

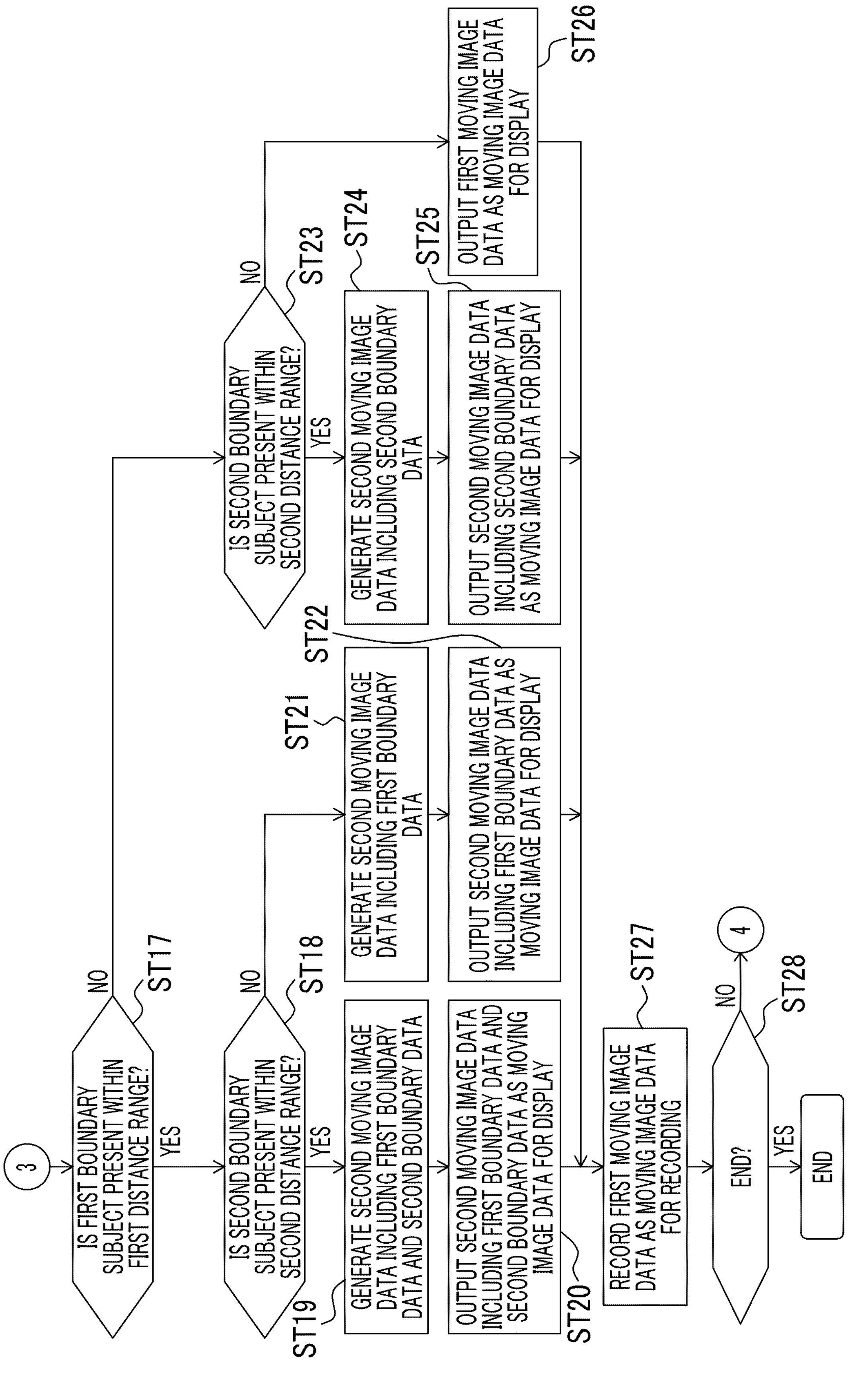

FIG. 16B
3
IS FIRST BOUNDARY SUBJECT PRESENT WITHIN FIRST DISTANCE RANGE?
ST17
YES
NO
IS SECOND BOUNDARY SUBJECT PRESENT WITHIN SECOND DISTANCE RANGE?
ST18
YES
NO
GENERATE SECOND MOVING IMAGE DATA INCLUDING FIRST BOUNDARY DATA AND SECOND BOUNDARY DATA
ST19
OUTPUT SECOND MOVING IMAGE DATA INCLUDING FIRST BOUNDARY DATA AND SECOND BOUNDARY DATA AS MOVING IMAGE DATA FOR DISPLAY
ST20
GENERATE SECOND MOVING IMAGE DATA INCLUDING FIRST BOUNDARY DATA
ST21
OUTPUT SECOND MOVING IMAGE DATA INCLUDING FIRST BOUNDARY DATA AS MOVING IMAGE DATA FOR DISPLAY
ST22
IS SECOND BOUNDARY SUBJECT PRESENT WITHIN SECOND DISTANCE RANGE?
ST23
YES
NO
GENERATE SECOND MOVING IMAGE DATA INCLUDING SECOND BOUNDARY DATA
ST24
OUTPUT SECOND MOVING IMAGE DATA INCLUDING SECOND BOUNDARY DATA AS MOVING IMAGE DATA FOR DISPLAY
ST25
OUTPUT FIRST MOVING IMAGE DATA AS MOVING IMAGE DATA FOR DISPLAY
ST26
RECORD FIRST MOVING IMAGE DATA AS MOVING IMAGE DATA FOR RECORDING
ST27
END?
ST28
YES
NO
4
END

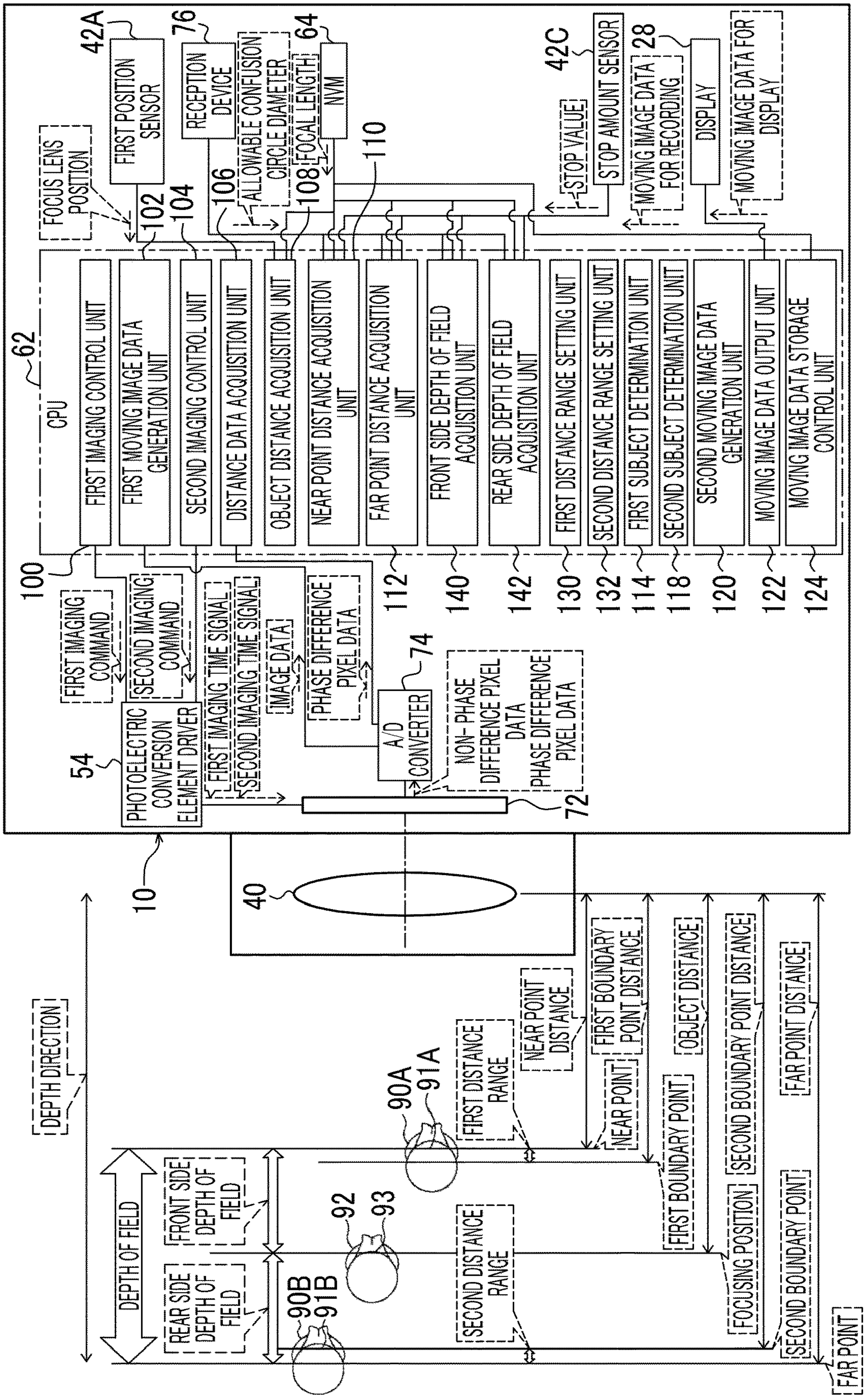

FIG. 17
DEPTH DIRECTION
DEPTH OF FIELD
REAR SIDE DEPTH OF FIELD
FRONT SIDE DEPTH OF FIELD
90B
91B
92
93
90A
91A
SECOND DISTANCE RANGE
FIRST DISTANCE RANGE
NEAR POINT DISTANCE
NEAR POINT
FIRST BOUNDARY POINT DISTANCE
FIRST BOUNDARY POINT
OBJECT DISTANCE
FOCUSING POSITION
SECOND BOUNDARY POINT DISTANCE
SECOND BOUNDARY POINT
FAR POINT DISTANCE
FAR POINT
40
10
54
PHOTOELECTRIC CONVERSION ELEMENT DRIVER
FIRST IMAGING COMMAND
SECOND IMAGING COMMAND
FIRST IMAGING TIME SIGNAL
SECOND IMAGING TIME SIGNAL
IMAGE DATA
PHASE DIFFERENCE PIXEL DATA
A/D CONVERTER
74
NON- PHASE DIFFERENCE PIXEL DATA
PHASE DIFFERENCE PIXEL DATA
72
100
62
CPU
FIRST IMAGING CONTROL UNIT
FIRST MOVING IMAGE DATA GENERATION UNIT
SECOND IMAGING CONTROL UNIT
DISTANCE DATA ACQUISITION UNIT
OBJECT DISTANCE ACQUISITION UNIT
NEAR POINT DISTANCE ACQUISITION UNIT
FAR POINT DISTANCE ACQUISITION UNIT
FRONT SIDE DEPTH OF FIELD ACQUISITION UNIT
REAR SIDE DEPTH OF FIELD ACQUISITION UNIT
FIRST DISTANCE RANGE SETTING UNIT
SECOND DISTANCE RANGE SETTING UNIT
FIRST SUBJECT DETERMINATION UNIT
SECOND SUBJECT DETERMINATION UNIT
SECOND MOVING IMAGE DATA GENERATION UNIT
MOVING IMAGE DATA OUTPUT UNIT
MOVING IMAGE DATA STORAGE CONTROL UNIT
112
140
142
130
132
114
118
120
122
124
FOCUS LENS POSITION
42A
FIRST POSITION SENSOR
102
104
76
RECEPTION DEVICE
106
ALLOWABLE CONFUSION CIRCLE DIAMETER
108
FOCAL LENGTH
64
NVM
110
STOP VALUE
42C
STOP AMOUNT SENSOR
MOVING IMAGE DATA FOR RECORDING
28
DISPLAY
MOVING IMAGE DATA FOR DISPLAY

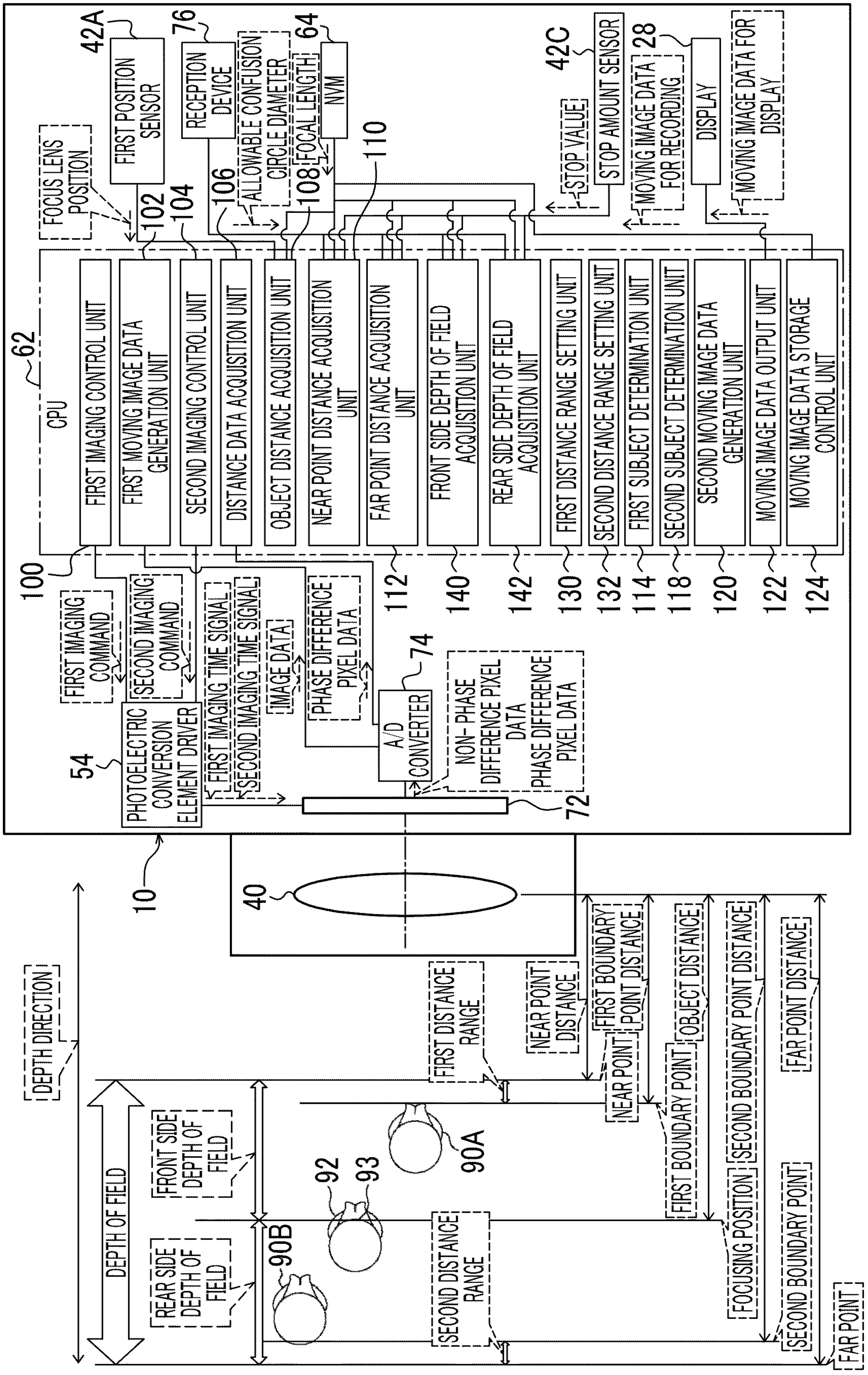

FIG. 18
DEPTH DIRECTION
DEPTH OF FIELD
REAR SIDE DEPTH OF FIELD
FRONT SIDE DEPTH OF FIELD
90B
92
93
90A
SECOND DISTANCE RANGE
FIRST DISTANCE RANGE
NEAR POINT DISTANCE
NEAR POINT
FIRST BOUNDARY POINT DISTANCE
FIRST BOUNDARY POINT
OBJECT DISTANCE
FOCUSING POSITION
SECOND BOUNDARY POINT DISTANCE
SECOND BOUNDARY POINT
FAR POINT DISTANCE
FAR POINT
10
40
54
PHOTOELECTRIC CONVERSION ELEMENT DRIVER
FIRST IMAGING COMMAND
SECOND IMAGING COMMAND
FIRST IMAGING TIME SIGNAL
SECOND IMAGING TIME SIGNAL
IMAGE DATA
PHASE DIFFERENCE PIXEL DATA
A/D CONVERTER
74
NON- PHASE DIFFERENCE PIXEL DATA
PHASE DIFFERENCE PIXEL DATA
72
100
62
CPU
FIRST IMAGING CONTROL UNIT
FIRST MOVING IMAGE DATA GENERATION UNIT
SECOND IMAGING CONTROL UNIT
DISTANCE DATA ACQUISITION UNIT
OBJECT DISTANCE ACQUISITION UNIT
NEAR POINT DISTANCE ACQUISITION UNIT
FAR POINT DISTANCE ACQUISITION UNIT
FRONT SIDE DEPTH OF FIELD ACQUISITION UNIT
REAR SIDE DEPTH OF FIELD ACQUISITION UNIT
FIRST DISTANCE RANGE SETTING UNIT
SECOND DISTANCE RANGE SETTING UNIT
FIRST SUBJECT DETERMINATION UNIT
SECOND SUBJECT DETERMINATION UNIT
SECOND MOVING IMAGE DATA GENERATION UNIT
MOVING IMAGE DATA OUTPUT UNIT
MOVING IMAGE DATA STORAGE CONTROL UNIT
112
140
142
130
132
114
118
120
122
124
102
104
106
108
110
FOCUS LENS POSITION
42A
FIRST POSITION SENSOR
76
RECEPTION DEVICE
ALLOWABLE CONFUSION CIRCLE DIAMETER
FOCAL LENGTH
64
NVM
STOP VALUE
42C
STOP AMOUNT SENSOR
MOVING IMAGE DATA FOR RECORDING
28
DISPLAY
MOVING IMAGE DATA FOR DISPLAY

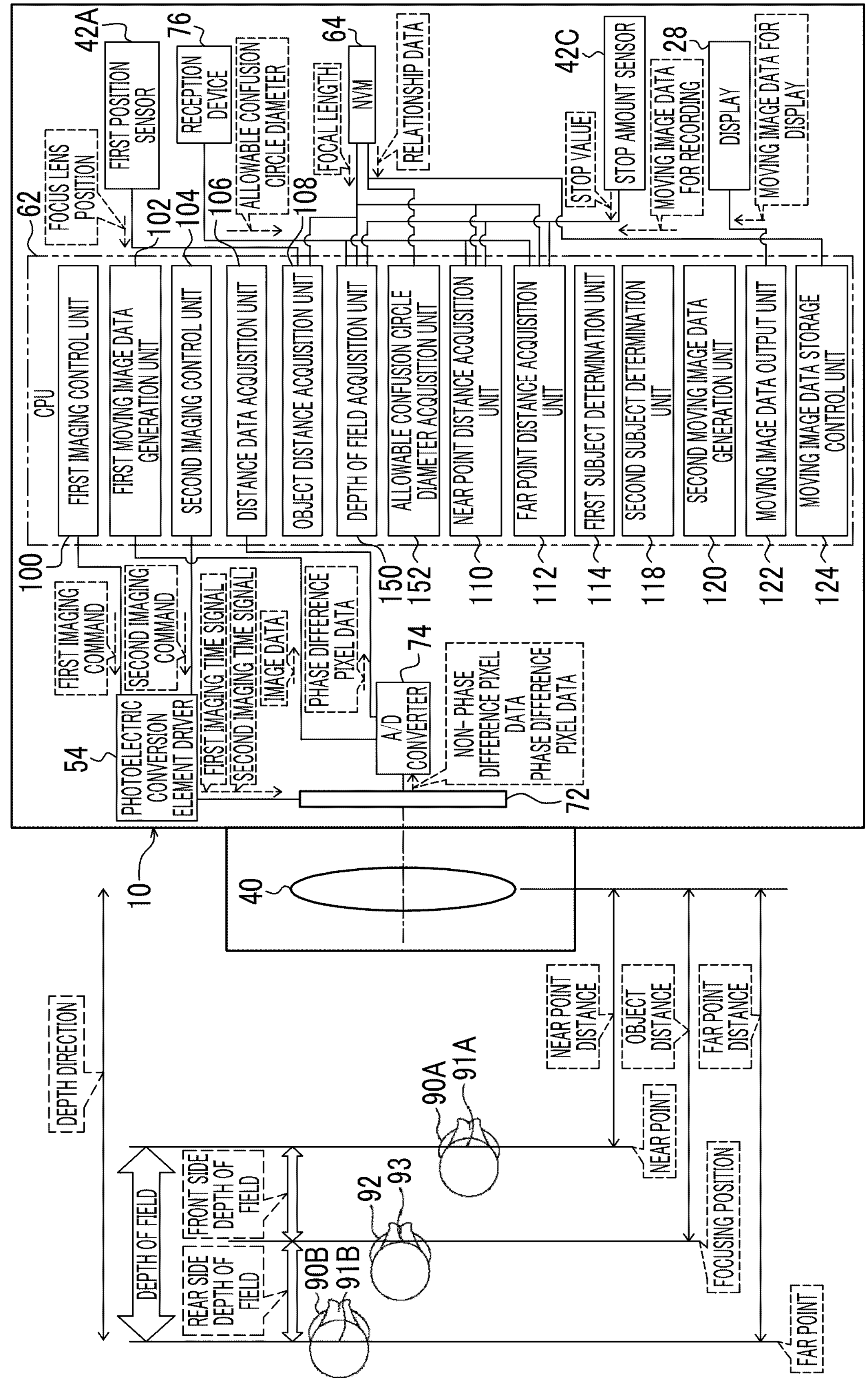

FIG. 20

10
62
CPU
100 FIRST IMAGING CONTROL UNIT
102 FIRST MOVING IMAGE DATA GENERATION UNIT
104 SECOND IMAGING CONTROL UNIT
106 DISTANCE DATA ACQUISITION UNIT
108 OBJECT DISTANCE ACQUISITION UNIT
150 DEPTH OF FIELD ACQUISITION UNIT
152 ALLOWABLE CONFUSION CIRCLE DIAMETER ACQUISITION UNIT
110 NEAR POINT DISTANCE ACQUISITION UNIT
112 FAR POINT DISTANCE ACQUISITION UNIT
114 FIRST SUBJECT DETERMINATION UNIT
118 SECOND SUBJECT DETERMINATION UNIT
120 SECOND MOVING IMAGE DATA GENERATION UNIT
122 MOVING IMAGE DATA OUTPUT UNIT
124 MOVING IMAGE DATA STORAGE CONTROL UNIT
42A FIRST POSITION SENSOR
FOCUS LENS POSITION
76 RECEPTION DEVICE
ALLOWABLE CONFUSION CIRCLE DIAMETER
64 NVM
FOCAL LENGTH
RELATIONSHIP DATA
42C STOP AMOUNT SENSOR
STOP VALUE
MOVING IMAGE DATA FOR RECORDING
28 DISPLAY
MOVING IMAGE DATA FOR DISPLAY
FIRST IMAGING COMMAND
SECOND IMAGING COMMAND
FIRST IMAGING TIME SIGNAL
SECOND IMAGING TIME SIGNAL
IMAGE DATA
PHASE DIFFERENCE PIXEL DATA
74 A/D CONVERTER
NON-PHASE DIFFERENCE PIXEL DATA
PHASE DIFFERENCE PIXEL DATA
54 PHOTOELECTRIC CONVERSION ELEMENT DRIVER
72
40
DEPTH DIRECTION
NEAR POINT DISTANCE
OBJECT DISTANCE
FAR POINT DISTANCE
90A 91A
NEAR POINT
92 93
FOCUSING POSITION
90B 91B
FAR POINT
DEPTH OF FIELD
FRONT SIDE DEPTH OF FIELD
REAR SIDE DEPTH OF FIELD

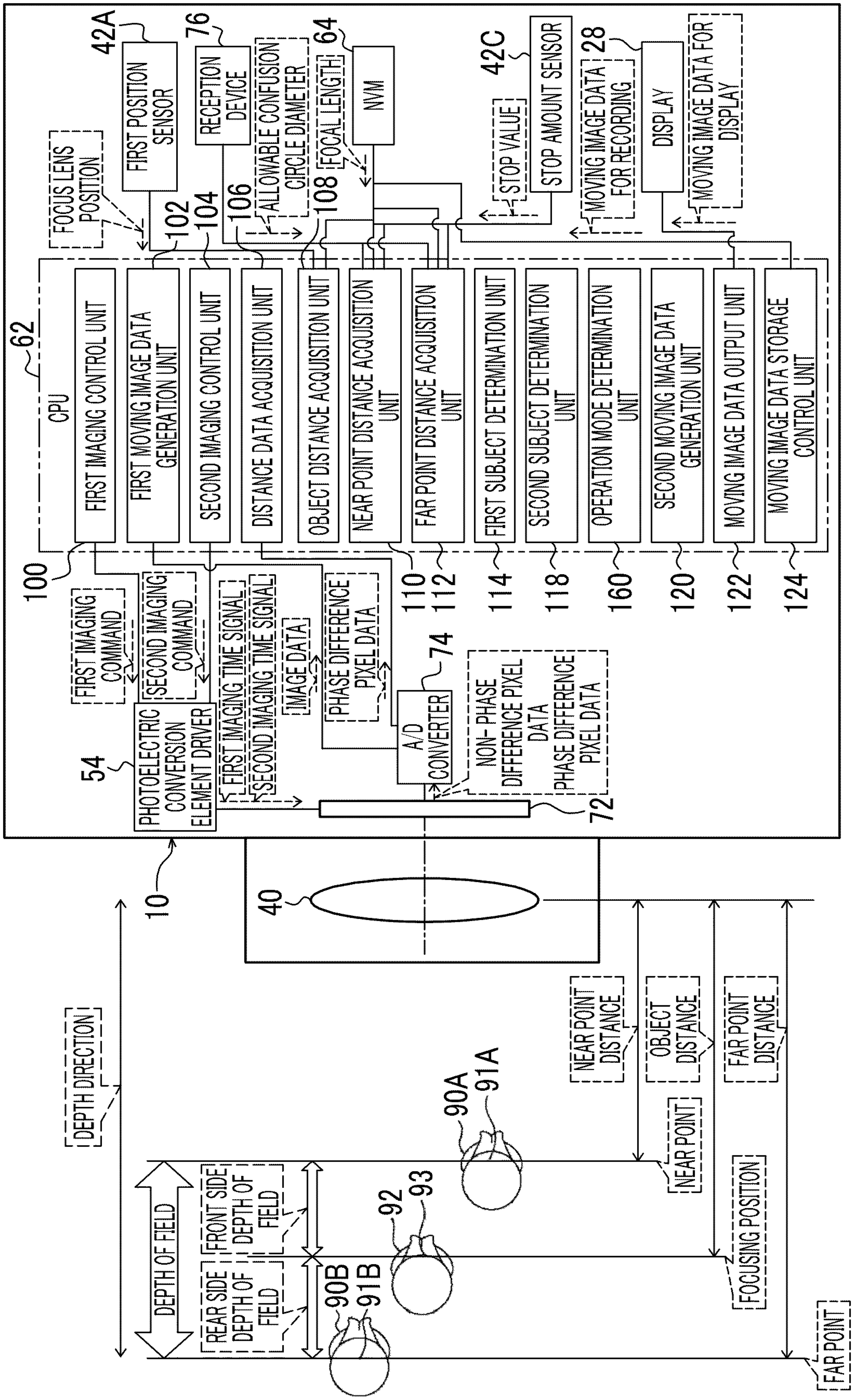

FIG. 23

10
40
42A FIRST POSITION SENSOR
FOCUS LENS POSITION
76 RECEPTION DEVICE
ALLOWABLE CONFUSION CIRCLE DIAMETER
64 NVM
FOCAL LENGTH
42C STOP AMOUNT SENSOR
STOP VALUE
MOVING IMAGE DATA FOR RECORDING
28 DISPLAY
MOVING IMAGE DATA FOR DISPLAY
62 CPU
100 FIRST IMAGING CONTROL UNIT
102 FIRST MOVING IMAGE DATA GENERATION UNIT
104 SECOND IMAGING CONTROL UNIT
106 DISTANCE DATA ACQUISITION UNIT
108 OBJECT DISTANCE ACQUISITION UNIT
110 NEAR POINT DISTANCE ACQUISITION UNIT
112 FAR POINT DISTANCE ACQUISITION UNIT
114 FIRST SUBJECT DETERMINATION UNIT
118 SECOND SUBJECT DETERMINATION UNIT
160 OPERATION MODE DETERMINATION UNIT
120 SECOND MOVING IMAGE DATA GENERATION UNIT
122 MOVING IMAGE DATA OUTPUT UNIT
124 MOVING IMAGE DATA STORAGE CONTROL UNIT
FIRST IMAGING COMMAND
SECOND IMAGING COMMAND
FIRST IMAGING TIME SIGNAL
SECOND IMAGING TIME SIGNAL
IMAGE DATA
PHASE DIFFERENCE PIXEL DATA
54 PHOTOELECTRIC CONVERSION ELEMENT DRIVER
74 A/D CONVERTER
NON-PHASE DIFFERENCE PIXEL DATA
PHASE DIFFERENCE PIXEL DATA
72
DEPTH DIRECTION
DEPTH OF FIELD
FRONT SIDE DEPTH OF FIELD
REAR SIDE DEPTH OF FIELD
90A
91A
92
93
90B
91B
NEAR POINT DISTANCE
OBJECT DISTANCE
FAR POINT DISTANCE
NEAR POINT
FOCUSING POSITION
FAR POINT

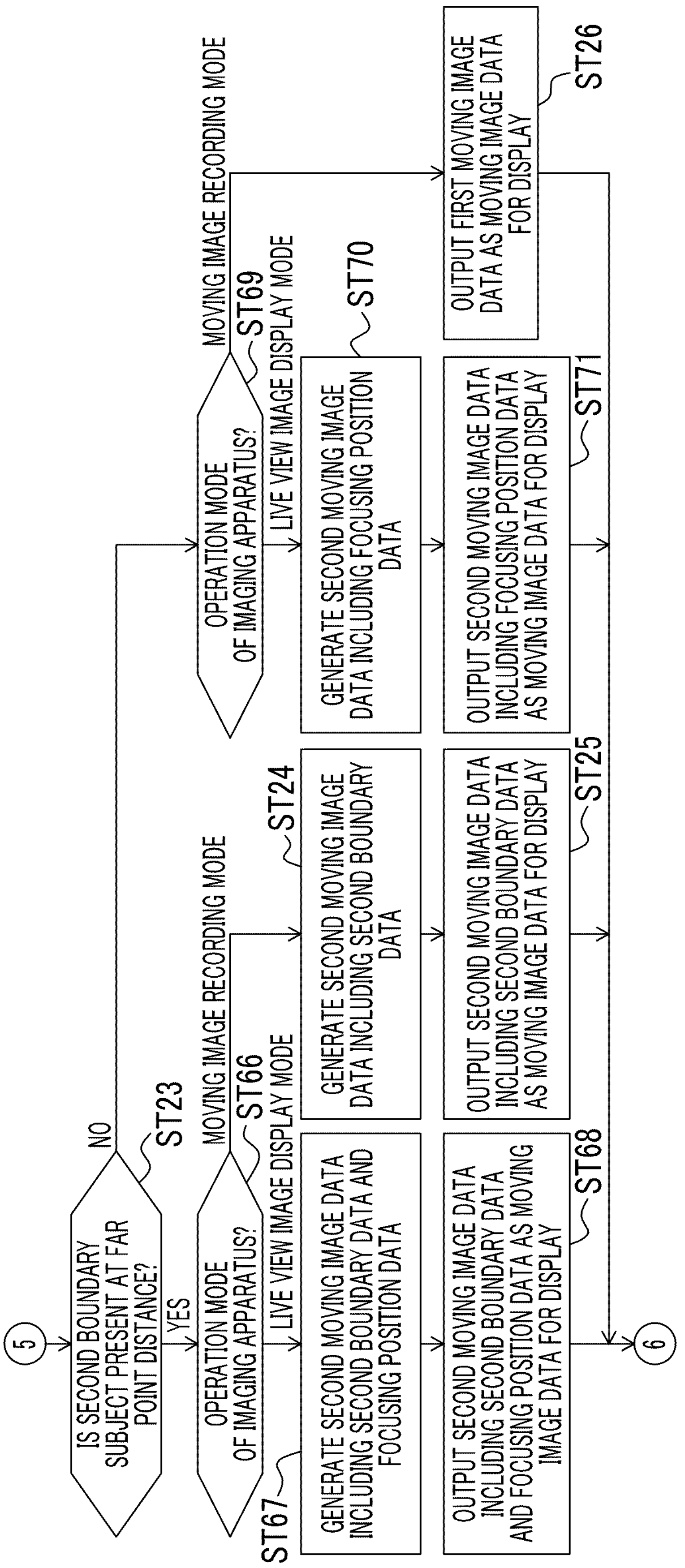

FIG. 25B
5
IS SECOND BOUNDARY SUBJECT PRESENT AT FAR POINT DISTANCE?
ST23
YES
NO
OPERATION MODE OF IMAGING APPARATUS?
ST66
LIVE VIEW IMAGE DISPLAY MODE
MOVING IMAGE RECORDING MODE
GENERATE SECOND MOVING IMAGE DATA INCLUDING SECOND BOUNDARY DATA AND FOCUSING POSITION DATA
ST67
OUTPUT SECOND MOVING IMAGE DATA INCLUDING SECOND BOUNDARY DATA AND FOCUSING POSITION DATA AS MOVING IMAGE DATA FOR DISPLAY
ST68
GENERATE SECOND MOVING IMAGE DATA INCLUDING SECOND BOUNDARY DATA
ST24
OUTPUT SECOND MOVING IMAGE DATA INCLUDING SECOND BOUNDARY DATA AS MOVING IMAGE DATA FOR DISPLAY
ST25
OPERATION MODE OF IMAGING APPARATUS?
ST69
LIVE VIEW IMAGE DISPLAY MODE
MOVING IMAGE RECORDING MODE
GENERATE SECOND MOVING IMAGE DATA INCLUDING FOCUSING POSITION DATA
ST70
OUTPUT SECOND MOVING IMAGE DATA INCLUDING FOCUSING POSITION DATA AS MOVING IMAGE DATA FOR DISPLAY
ST71
OUTPUT FIRST MOVING IMAGE DATA AS MOVING IMAGE DATA FOR DISPLAY
ST26
6

IMAGING APPARATUS, IMAGING METHOD, AND PROGRAM THAT OUTPUT IMAGE DATA INCLUDING BOUNDARY PORTION OF DEPTH OF FIELD

This application is a continuation application of International Application No. PCT/JP2022/019582, filed May 6, 2022, the disclosure of which is incorporated herein by reference in its entirety. Further, this application claims priority under 35 USC 119 from Japanese Patent Application No. 2021-109304 filed Jun. 30, 2021, the disclosure of which is incorporated by reference herein.

BACKGROUND OF THE INVENTION

1. Field of the Invention

The present disclosed technology relates to an imaging apparatus, an imaging method, and a program.

2. Description of the Related Art

JP2008-145465A discloses, in an imaging apparatus that includes a manual focus adjustment function, that includes a function allowing a user to set an F stop value at the user's discretion before imaging, and that includes a function of detecting a contrast and focus determining a focus based on a height thereof, a display method of capturing all contrast data within a focus drivable range from an image element with a lens set to an F stop open value, converting a table of the acquired contrast data into a focus determination table, and display method for superposition displaying focus distribution data on a live view using two colors by using a depth of field and the focus determination table obtained based on the contrast data, and a user interface where the focus distribution data is displayed.

JP2007-214845A discloses an electronic camera that has a multi-point simultaneous focus frame display mode, the electronic camera includes: a focus target candidate acquisition unit that compares contrast values of captured images sequentially obtained by an imaging element during the multi-point simultaneous focus frame display mode and that acquires, as a focus target candidate, each of subjects corresponding to a collection of contrasts of which difference of contrast values are within a predetermined threshold value; a focus point acquisition unit that acquires a focus lens position of each focus target candidate; a focus point approximation determination unit that compares the focus lens positions of each of the focus target candidates acquired by the focus point acquisition unit and that determines whether or not the focus points are approximate; and a focus frame display control unit that displays a focus frame of substantially the same color for each image of the focus target candidate of which the focus lens position is determined to be approximate by the focus point approximation determination unit.

JP2010-093422A discloses an imaging apparatus that images a subject, the imaging apparatus includes: a unit that detects distance information of the subject; a unit that extracts the subject according to a distance based on the distance information; a unit that calculates focus information based on a focal length obtained based on a position of a focusing lens and an F value of a stop; a display unit that displays, on a display screen, an image of the subject and a subject distance graph that is displayed on a graph using a distance as an axis and in which focus information is added to a subject position mark indicating a position of the subject created based on the extracted subject; and a unit that changes a focus and that adjusts the stop according to an operation on the displayed subject distance graph or the image of the subject.

JP1998-197938A (JP-H10-197938A) discloses a camera that displays an in-focus distance range that is configured to display an in-focus appropriate distance range, which is calculated based on a setting state of an imaging distance and a set value of a stop, in correspondence with a distance scale.

JP2010-177741A discloses an imaging apparatus including: an imaging unit that images an imaging target object; a focus adjustment unit that adjusts a focus; a map image generation unit that generates a map image for indicating a depth position representing a position of the imaging target object in a depth direction and a focus position representing a position of the focus; and a display unit that displays the generated map image.

SUMMARY OF THE INVENTION

One embodiment according to the present disclosed technology provides an imaging apparatus, an imaging method, and a program that enable a user to understand a position of a boundary portion of a depth of field based on an image shown through moving image data, for example.

An imaging apparatus of the present disclosure comprises: an image sensor; and a processor, in which the processor is configured to: acquire distance data related to distances between the imaging apparatus and a plurality of subjects within an imaging area imaged by the image sensor; generate boundary data indicating a region of a boundary subject that is present at a distance of a boundary portion of a depth of field, based on the distance data; generate moving image data including the boundary data based on image data obtained by imaging with the image sensor; and output the moving image data.

The processor may output the moving image data as data for displaying, on a first display, a first image represented in a manner in which a region of the boundary subject and regions other than the region of the boundary subject are distinguished from each other.

The boundary data may be data used in image processing of indicating a region of the boundary subject with respect to a second image displayed on a second display based on the image data.

The image processing may be processing of assigning default color to a first pixel corresponding to the region of the boundary subject among a plurality of first pixels constituting the second image.

The image processing may be processing of assigning default luminance to a second pixel corresponding to the region of the boundary subject among a plurality of second pixels constituting the second image.

The image processing may be processing of assigning a mark indicating the region of the boundary subject to the second image.

The image processing may be processing of superimposing a distance image, which is generated based on the distance data, on the second image.

The boundary portion may include a first boundary portion positioned on a near point side of the depth of field, and a second boundary portion positioned on a far point side of the depth of field, the boundary subject may include a first boundary subject present at a distance of the first boundary portion, and a second boundary subject present at a distance of the second boundary portion, and the boundary data may include first boundary data indicating a region of the first boundary subject, and second boundary data indicating a region of the second boundary subject.

The first boundary data may be data that represents, in a first manner, the region of the first boundary subject with respect to a third image displayed on a third display based on the image data, and the second boundary data may be data that represents, in a second manner different from the first manner, the region of the second boundary subject with respect to the third image.

The boundary portion may be at least one of a near point or a far point of the depth of field.

The processor may be configured to: acquire region data indicating a region of the boundary subject that is present at a distance equal to the distance of the boundary portion among the distances between the imaging apparatus and the plurality of subjects, based on the distance data; and generate the boundary data based on the region data.

The boundary portion may be at least one of a range including a near point of the depth of field or a range including a far point of the depth of field.

The range including the near point of the depth of field may be a range extending from the near point of the depth of field to a far point side of the depth of field.

The range including the far point of the depth of field may be a range extending from the far point of the depth of field to a near point side of the depth of field.

The processor may be configured to: set a distance range including the distance of the boundary portion; acquire region data indicating the region of the boundary subject that is present at a distance falling within the distance range among the distances between the imaging apparatus and the plurality of subjects, based on the distance data; and generate the boundary data based on the region data.

A width of the boundary portion may vary depending on a depth of the depth of field.

The processor may be configured to increase the width of the boundary portion as the depth of the depth of field becomes deeper and decrease the width of the boundary portion as the depth of the depth of field becomes shallower.

A width of the boundary portion may vary depending on the number of pixels corresponding to the boundary portion among a plurality of pixels constituting a fourth image displayed on a fourth display based on the moving image data.

The imaging apparatus further comprises an imaging lens, in which an allowable confusion circle diameter of the image sensor may vary depending on at least one of an object distance, a focal length, or a stop value of the imaging lens.

The processor may be configured to acquire a first depth of field based on the object distance, the focal length, the stop value, and a default allowable confusion circle diameter, and in a case where a depth of the first depth of field is shallower than a first default depth, the allowable confusion circle diameter may be smaller than a first default value.

The processor may be configured to: generate, in a case where a display image is displayed on a fifth display, display image data representing the display image by including focusing position data, which indicates a region of an in-focus subject present at an object distance among the plurality of subjects, and the boundary data in the moving image data, based on the distance data; output the display image data to the fifth display; and output, in a case where a record image is displayed on the fifth display, the moving image data to the fifth display.

The processor may be configured to store the image data in a non-transitory storage medium.

The image sensor may include a plurality of phase difference pixels, and the processor may be configured to acquire the distance data based on phase difference pixel data output from the phase difference pixel.

The phase difference pixel may be a pixel for selectively outputting non-phase difference pixel data and the phase difference pixel data, the non-phase difference pixel data may be pixel data obtained by performing photoelectric conversion on an entire region of the phase difference pixel, and the phase difference pixel data may be pixel data obtained by performing the photoelectric conversion on a part of a region of the phase difference pixel.

An imaging method of the present disclosure comprises: acquiring distance data related to distances between an imaging apparatus and a plurality of subjects within an imaging area imaged by an image sensor that is included in the imaging apparatus; generating boundary data indicating a region of a boundary subject that is present at a distance of a boundary portion of a depth of field, based on the distance data; generating moving image data including the boundary data based on image data obtained by imaging with the image sensor; and outputting the moving image data.

A program of the present disclosure that causes a computer to execute a process comprises: acquiring distance data related to distances between an imaging apparatus and a plurality of subjects within an imaging area imaged by an image sensor that is included in the imaging apparatus; generating boundary data indicating a region of a boundary subject that is present at a distance of a boundary portion of a depth of field, based on the distance data; generating moving image data including the boundary data based on image data obtained by imaging with the image sensor; and outputting the moving image data.

BRIEF DESCRIPTION OF THE DRAWINGS

FIG. 6 is an explanatory diagram showing an example of a first operation example of the imaging apparatus according to the first embodiment.

FIG. 8 is an explanatory diagram showing an example of a second operation example of the imaging apparatus according to the first embodiment.

FIG. 12B is a flowchart showing an example of a flow of second processing of the moving image generation processing executed by the CPU according to the first embodiment.

FIG. 13 is an explanatory diagram showing an example of a first operation example of the imaging apparatus according to a second embodiment.

FIG. 14 is an explanatory diagram showing an example of a second operation example of the imaging apparatus according to the second embodiment.

FIG. 15 is an explanatory diagram showing an example of a third operation example of the imaging apparatus according to the second embodiment.

FIG. 16B is a flowchart showing an example of a flow of second processing of the moving image generation processing executed by the CPU according to the second embodiment.

FIG. 17 is an explanatory diagram showing an example of a first operation example of the imaging apparatus according to a third embodiment.

FIG. 18 is an explanatory diagram showing an example of a second operation example of the imaging apparatus according to the third embodiment.

FIG. 20 is an explanatory diagram showing an example of an operation example of the imaging apparatus according to a fourth embodiment.

FIG. 23 is an explanatory diagram showing an example of a first operation example of the imaging apparatus according to a fifth embodiment.

FIG. 25B is a flowchart showing an example of a flow of second processing of the moving image generation processing executed by the CPU according to the fifth embodiment.

DESCRIPTION OF THE PREFERRED EMBODIMENTS

Figure 1:
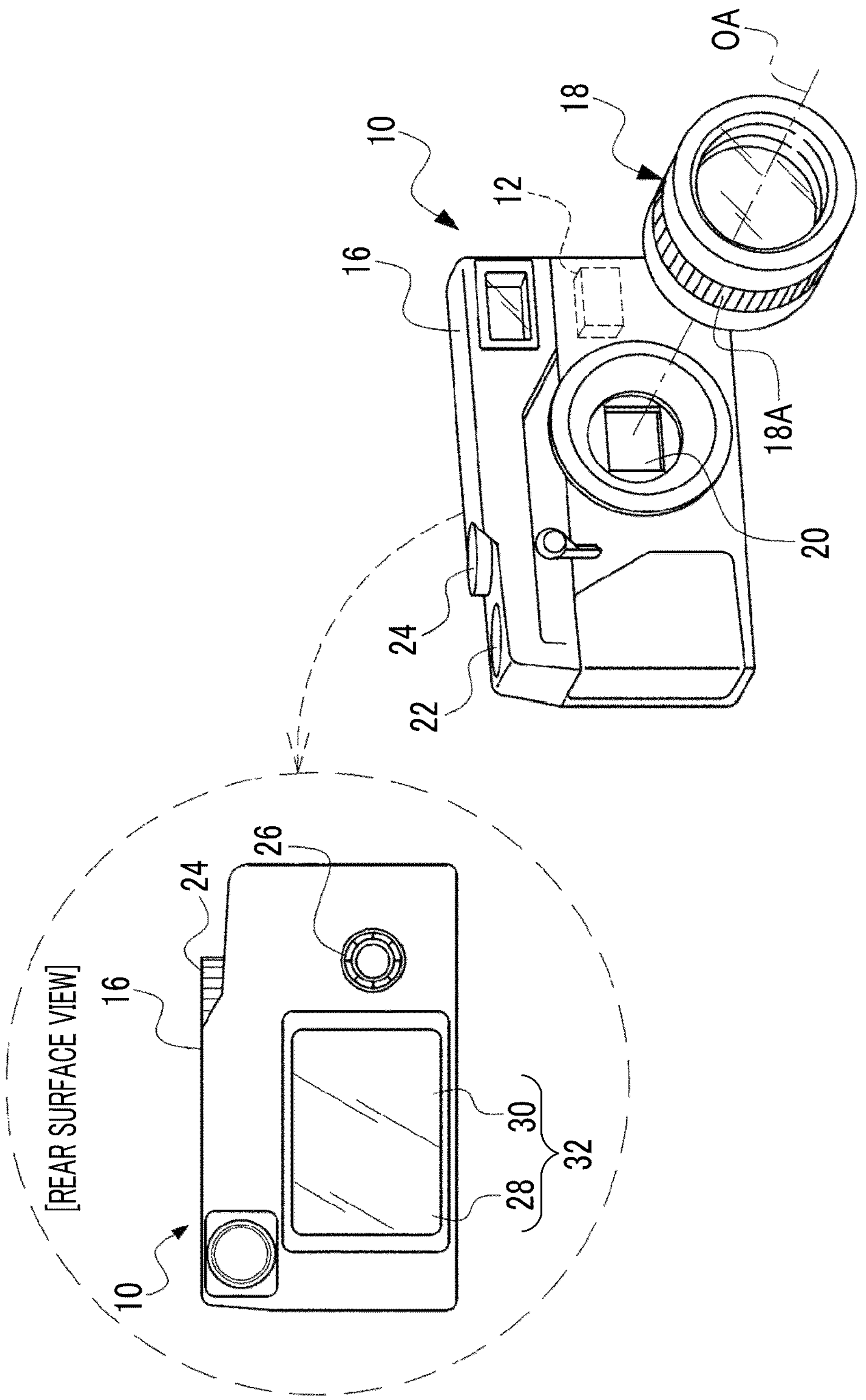
FIG. 1 is a schematic configuration diagram showing an example of a configuration of an imaging apparatus according to a first embodiment.

Hereinafter, an example of an imaging apparatus, an imaging method, and a program according to the present disclosed technology will be described with reference to the accompanying drawings.

First, the wording used in the following description will be described.

CPU refers to an abbreviation of "Central Processing Unit". GPU refers to an abbreviation of "Graphics Processing Unit". TPU refers to an abbreviation of "Tensor processing unit". NVM refers to an abbreviation of "Non-volatile memory". RAM refers to an abbreviation of "Random Access Memory". IC refers to an abbreviation of "Integrated Circuit". ASIC refers to an abbreviation of "Application Specific Integrated Circuit". PLD refers to an abbreviation of "Programmable Logic Device". FPGA refers to an abbreviation of "Field-Programmable Gate Array". SoC refers to an abbreviation of "System-on-a-chip". SSD refers to an abbreviation of "Solid State Drive". USB refers to an abbreviation of "Universal Serial Bus". HDD refers to an abbreviation of "Hard Disk Drive". EEPROM refers to an abbreviation of "Electrically Erasable and Programmable Read Only Memory". EL refers to an abbreviation of "Electro-Luminescence". OF refers to an abbreviation of "Interface". UI refers to an abbreviation of "User Interface". fps refers to an abbreviation of "frame per second". MF refers to an abbreviation of "Manual Focus". AF refers to an abbreviation of "Auto Focus". CMOS refers to an abbreviation of "Complementary Metal Oxide Semiconductor". CCD refers to an abbreviation of "Charge Coupled Device". A/D refers to an abbreviation of "Analog/Digital". PC refers to an abbreviation of "Personal Computer". LiDAR refers to an abbreviation of "Light Detection And Ranging". TOF refers to an abbreviation of "Time of Flight". EVF refers to an abbreviation of "Electronic View Finder".

In the present specification, "parallel" refers to "parallel" in the sense of including an error generally allowed in the technical field, to which the present disclosed technology belongs, and an error that does not go against the gist of the present disclosed technology, in addition to perfect parallel. Further, in the present specification, "orthogonal" refers to "orthogonal" in the sense of including an error that is generally allowed in the technical field, to which the present disclosed technology belongs, and an error that does not go against the gist of the present disclosed technology, in addition to perfect orthogonality. Further, in the description of the present specification, "coinciding with each other" refers to "coinciding with each other" in the sense of including an error generally allowed in the technical field, to which the present disclosed technology belongs, and an error that does not go against the gist of the present disclosed technology, in addition to perfect coincidence. Further, in the description of the present specification, "equal to each other" refers to "equal to each other" in the sense of including an error generally allowed in the technical field, to which the present disclosed technology belongs, and an error that does not go against the gist of the present disclosed technology, in addition to perfect equality.. Further, in the following, a numerical range represented by using "to" means a range including numerical values denoted before and after "to" as a lower limit value and an upper limit value.

First Embodiment

As an example shown in FIG. 1, the imaging apparatus 10 is an apparatus for imaging a subject (not shown) and includes a controller 12, an imaging apparatus main body 16, and an interchangeable lens 18. The imaging apparatus 10 is an example of an "imaging apparatus" according to the present disclosed technology, and the controller 12 is an example of a "computer" according to the present disclosed technology. The controller 12 is built into the imaging apparatus main body 16 and controls the entire imaging apparatus 10. The interchangeable lens 18 is interchangeably attached to the imaging apparatus main body 16. The interchangeable lens 18 is provided with a focus ring 18A. In a case where a user or the like of the imaging apparatus 10 (hereinafter, simply referred to as the "user") manually adjusts the focus on the subject through the imaging apparatus 10, the focus ring 18A is operated by the user or the like.

In the example shown in FIG. 1, a lens-interchangeable digital camera is shown as an example of the imaging apparatus 10. However, the present example is only an example, and the imaging apparatus 10 may be a digital camera with a fixed lens or may be a digital camera, which is built into various electronic devices such as a smart device, a wearable terminal, a cell observation device, an ophthalmologic observation device, or a surgical microscope.

An image sensor 20 is provided in the imaging apparatus main body 16. The image sensor 20 is an example of an "image sensor" according to the present disclosed technology. The image sensor 20 is a CMOS image sensor, for example. The image sensor 20 captures an imaging area including at least one subject. In a case where the interchangeable lens 18 is attached to the imaging apparatus main body 16, subject light indicating the subject is transmitted through the interchangeable lens 18 and imaged on the image sensor 20, and then image data indicating an image of the subject is generated by the image sensor 20.

In the first embodiment, although the CMOS image sensor is exemplified as the image sensor 20, the present disclosed technology is not limited to this, for example, the present disclosed technology is established even in a case where the image sensor 20 is another type of image sensor such as a CCD image sensor.

A release button 22 and a dial 24 are provided on an upper surface of the imaging apparatus main body 16. The dial 24 is operated in a case where an operation mode of an imaging system, an operation mode of a playback system, and the like are set, and by operating the dial 24, an imaging mode, a playback mode, and a setting mode are selectively set as the operation mode in the imaging apparatus 10. The imaging mode is an operation mode in which the imaging is performed with respect to the imaging apparatus 10. The playback mode is an operation mode for playing the image (for example, a still image and/or a moving image) obtained by the imaging for recording in the imaging mode. The setting mode is an operation mode for setting the imaging apparatus 10 in a case where various set values used in the control related to the imaging are set.

The release button 22 functions as an imaging preparation instruction unit and an imaging instruction unit, and is capable of detecting a two-step pressing operation of an imaging preparation instruction state and an imaging instruction state. The imaging preparation instruction state refers to a state in which the release button 22 is pressed, for example, from a standby position to an intermediate position (half pressed position), and the imaging instruction state refers to a state in which the release button 22 is pressed to a final pressed position (fully pressed position) beyond the intermediate position. In the following, the "state of being pressed from the standby position to the half pressed position" is referred to as a "half pressed state", and the "state of being pressed from the standby position to the fully pressed position" is referred to as a "fully pressed state". Depending on the configuration of the imaging apparatus 10, the imaging preparation instruction state may be a state in which the user's finger is in contact with the release button 22, and the imaging instruction state may be a state in which the operating user's finger is moved from the state of being in contact with the release button 22 to the state of being away from the release button 22.

An instruction key 26 and a touch panel display 32 are provided on a rear surface of the imaging apparatus main body 16. The touch panel display 32 includes a display 28 and a touch panel 30 (see also FIG. 2). Examples of the display 28 include an EL display (for example, an organic EL display or an inorganic EL display). The display 28 may not be an EL display but may be another type of display such as a liquid crystal display.

The display 28 displays image and/or character information and the like. The display 28 is used for imaging for a live view image, that is, for displaying a live view image obtained by performing the continuous imaging in a case where an operation mode of the imaging apparatus 10 is the imaging mode. Here, the "live view image" refers to a moving image for display based on the image data obtained by being imaged by the image sensor 20. The imaging, which is performed to obtain the live view image (hereinafter, also referred to as "imaging for a live view image"), is performed according to, for example, a frame rate of 60 fps. 60 fps is only an example, and a frame rate of fewer than 60 fps may be used, or a frame rate of more than 60 fps may be used.

The display 28 is also used for displaying a still image obtained by the imaging for a still image in a case where an instruction for performing the imaging for a still image is provided to the imaging apparatus 10 via the release button 22. Further, the display 28 is also used for displaying a playback image or the like in a case where the operation mode of the imaging apparatus 10 is the playback mode. Further, the display 28 is also used for displaying a menu screen where various menus can be selected and displaying a setting screen for setting the various set values used in control related to the imaging in a case where the operation mode of the imaging apparatus 10 is the setting mode.

The touch panel 30 is a transmissive touch panel and is superimposed on a surface of a display region of the display 28. The touch panel 30 receives the instruction from the user by detecting contact with an indicator such as a finger or a stylus pen. In the following, for convenience of explanation, the above-mentioned "fully pressed state" also includes a state in which the user turns on a softkey for starting the imaging via the touch panel 30.

In the first embodiment, although an out-cell type touch panel display in which the touch panel 30 is superimposed on the surface of the display region of the display 28 is exemplified as an example of the touch panel display 32, this is only an example. For example, as the touch panel display 32, an on-cell type or in-cell type touch panel display can be also applied.

The instruction key 26 receives various instructions. Here, the "various instructions" refer to, for example, various instructions such as an instruction for displaying the menu screen, an instruction for selecting one or a plurality of menus, an instruction for confirming a selected content, an instruction for erasing the selected content, zooming in, zooming out, frame forwarding, and the like. Further, these instructions may be provided by the touch panel 30.

Figure 2:
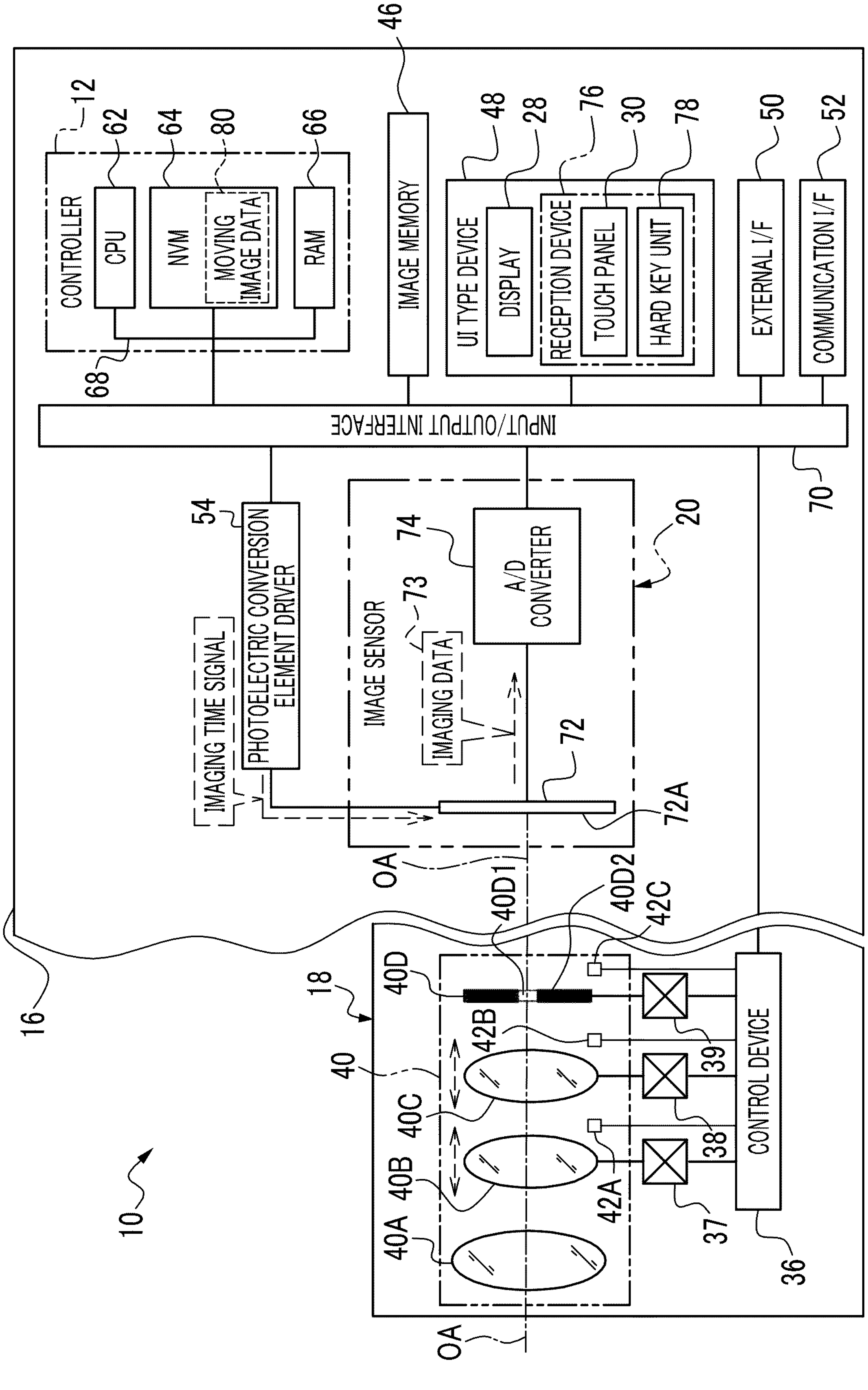
FIG. 2 is a schematic configuration diagram showing an example of hardware configurations of an optical system and an electrical system of the imaging apparatus according to the first embodiment.

As an example shown in FIG. 2, the image sensor 20 includes photoelectric conversion elements 72. The photoelectric conversion elements 72 have a light-receiving surface 72A. The photoelectric conversion elements 72 are disposed in the imaging apparatus main body 16 such that the center of the light-receiving surface 72A and an optical axis OA coincide with each other (see also FIG. 1). The photoelectric conversion elements 72 have a plurality of photosensitive pixels 72B (see FIG. 3) arranged in a matrix shape, and the light-receiving surface 72A is formed by the plurality of photosensitive pixels 72B. Each photosensitive pixel 72B has a micro lens 72C (see FIG. 3). The photosensitive pixel 72B is a physical pixel having a photodiode (not shown), which photoelectrically converts the received light and outputs an electric signal according to a light receiving amount.

Further, red (R), green (G), or blue (B) color filters (not shown) are arranged in a matrix shape in a default pattern arrangement (for example, Bayer arrangement, RGB stripe arrangement, R/G checkered arrangement, X-Trans (registered trademark) arrangement, honeycomb arrangement, or the like) on the plurality of photosensitive pixels 72B.

The interchangeable lens 18 includes an imaging lens 40. The imaging lens 40 has an objective lens 40A, a focus lens 40B, a zoom lens 40C, and a stop 40D. The objective lens 40A, the focus lens 40B, the zoom lens 40C, and the stop 40D are disposed in the order of the objective lens 40A, the focus lens 40B, the zoom lens 40C, and the stop 40D along the optical axis OA from the subject side (object side) to the imaging apparatus main body 16 side (image side). The imaging lens 40 is an example of an "imaging lens" according to the present disclosed technology.

Further, the interchangeable lens 18 includes a control device 36, a first actuator 37, a second actuator 38, a third actuator 39, a first position sensor 42A, a second position sensor 42B, and a stop amount sensor 42C. The control device 36 controls the entire interchangeable lens 18 according to the instruction from the imaging apparatus main body 16. The control device 36 is a device having a computer including, for example, a CPU, an NVM, a RAM, and the like. The NVM of the control device 36 is, for example, an EEPROM. However, this is only an example, and an HDD and/or SSD or the like may be applied as the NVM of the control device 36 instead of or together with the EEPROM. Further, the RAM of the control device 36 temporarily stores various types of information and is used as a work memory. In the control device 36, the CPU reads out a necessary program from the NVM and executes the read various programs on the RAM to control the entire interchangeable lens 18.

Although a device having a computer is exemplified here as an example of the control device 36, this is only an example, and a device including an ASIC, FPGA, and/or PLD may be applied. Further, as the control device 36, for example, a device implemented by a combination of a hardware configuration and a software configuration may be used.

The first actuator 37 includes a slide mechanism for focus (not shown) and a motor for focus (not shown). The focus lens 40B is attached to the slide mechanism for focus to be slidable along the optical axis OA. Further, the motor for focus is connected to the slide mechanism for focus, and the slide mechanism for focus operates by receiving the power of the motor for focus to move the focus lens 40B along the optical axis OA.

The second actuator 38 includes a slide mechanism for zoom (not shown) and a motor for zoom (not shown). The zoom lens 40C is attached to the slide mechanism for zoom to be slidable along the optical axis OA. Further, the motor for zoom is connected to the slide mechanism for zoom, and the slide mechanism for zoom operates by receiving the power of the motor for zoom to move the zoom lens 40C along the optical axis OA.

Here, although an example of the embodiment in which the slide mechanism for focus and the slide mechanism for zoom are provided separately has been described, this is only an example, and it may be an integrated type slide mechanism capable of realizing both focusing and zooming. Further, in this case, the power, which is generated by one motor, may be transmitted to the slide mechanism without using a motor for focus and a motor for zoom.

The third actuator 39 includes a power transmission mechanism (not shown) and a motor for stop (not shown). The stop 40D has an opening 40D1 and is a stop in which the size of the opening 40D1 is variable. The opening 40D1 is formed by a plurality of leaf blades 40D2, for example. The plurality of leaf blades 40D2 are connected to the power transmission mechanism. Further, the motor for stop is connected to the power transmission mechanism, and the power transmission mechanism transmits the power of the motor for stop to the plurality of leaf blades 40D2. The plurality of leaf blades 40D2 receives the power that is transmitted from the power transmission mechanism and changes the size of the opening 40D1 by being operated. By changing the size of the opening 40D1, the stop amount obtained by the stop 40D is changed, whereby the exposure is adjusted.

The motor for focus, the motor for zoom, and the motor for stop are connected to the control device 36, and the control device 36 controls each drive of the motor for focus, the motor for zoom, and the motor for stop. In the first embodiment, a stepping motor is adopted as an example of the motor for focus, the motor for zoom, and the motor for stop. Therefore, the motor for focus, the motor for zoom, and the motor for stop operate in synchronization with a pulse signal in response to a command from the control device 36. Although an example in which the motor for focus, the motor for zoom, and the motor for stop are provided in the interchangeable lens 18 has been described here, this is only an example, and at least one of the motor for focus, the motor for zoom, or the motor for stop may be provided in the imaging apparatus main body 16. The constituent and/or operation method of the interchangeable lens 18 can be changed as needed.

The first position sensor 42A detects a position of the focus lens 40B on the optical axis OA. An example of the first position sensor 42A includes a potential meter. A detection result by the first position sensor 42A is acquired by the control device 36. The position of the focus lens 40B on the optical axis OA is adjusted by the control device 36 based on the detection result by the first position sensor 42A.

The second position sensor 42B detects a position of the zoom lens 40C on the optical axis OA. An example of the second position sensor 42B includes a potential meter. A detection result by the second position sensor 42B is acquired by the control device 36.

The stop amount sensor 42C detects a size (that is, the stop amount) of the opening 40D1. An example of the stop amount sensor 42C includes a potential meter. A detection result by the stop amount sensor 42C is acquired by the control device 36.

In the imaging apparatus 10, in the case where the operation mode is the imaging mode, an MF mode and an AF mode are selectively set according to the instructions provided to the imaging apparatus main body 16. The MF mode is an operation mode for manually focusing. In the MF mode, for example, by operating the focus ring 18A or the like by the user, the focus lens 40B is moved along the optical axis OA with the movement amount according to the operation amount of the focus ring 18A or the like, thereby the position of the focus is adjusted. AF is performed in the AF mode. The AF refers to processing of adjusting the position of the focus according to a signal obtained from the image sensor 20. For example, in the AF mode, a distance between the imaging apparatus 10 and the subject is calculated by the imaging apparatus main body 16, and the focus lens 40B is moved along the optical axis OA to a position where the subject is in focus, whereby the position of the focus is adjusted.

The imaging apparatus main body 16 includes the image sensor 20, the controller 12, an image memory 46, a UI type device 48, an external I/F 50, a communication I/F 52, a photoelectric conversion element driver 54, and an input/output interface 70. Further, the image sensor 20 includes the photoelectric conversion elements 72 and an A/D converter 74.

The controller 12, the image memory 46, the UI type device 48, the external I/F 50, the communication I/F 52, the photoelectric conversion element driver 54, and the A/D converter 74 are connected to the input/output interface 70. Further, the control device 36 of the interchangeable lens 18 is also connected to the input/output interface 70.

The controller 12 controls the entire imaging apparatus 10. That is, in the example shown in FIG. 2, the image memory 46, the UI type device 48, the external I/F 50, the communication I/F 52, the photoelectric conversion element driver 54, and the control device 36 are controlled by the controller 12. The controller 12 includes a CPU 62, an NVM 64, and a RAM 66. The CPU 62 is an example of a "processor" according to the present disclosed technology, and the NVM 64 and/or the RAM 66 are an example of a "memory" according to the present disclosed technology.

The CPU 62, the NVM 64, and the RAM 66 are connected via a bus 68, and the bus 68 is connected to the input/output interface 70. In the example shown in FIG. 2, one bus is shown as the bus 68 for convenience of illustration, but the bus 68 may be a plurality of buses. The bus 68 may be a serial bus or may be a parallel bus including a data bus, an address bus, a control bus, and the like.

The NVM 64 is a non-transitory storage medium that stores various parameters and various programs. The various programs include a program 65 (see FIG. 5), which will be described later. For example, the NVM 64 is an EEPROM. However, this is only an example, and an HDD and/or SSD or the like may be applied as the NVM 64 instead of or together with the EEPROM. Further, the RAM 66 temporarily stores various types of information and is used as a work memory. The CPU 62 reads out a necessary program from the NVM 64 and executes the read program in the RAM 66. The CPU 62 performs image processing according to a program executed on the RAM 66.

The CPU 62 acquires the detection result by the first position sensor 42A from the control device 36 and adjusts the position of the focus lens 40B on the optical axis OA by controlling the control device 36 based on the detection result by the first position sensor 42A. Further, the CPU 62 acquires the detection result by the second position sensor 42B from the control device 36 and adjusts the position of the zoom lens 40C on the optical axis OA by controlling the control device 36 based on the detection result by the second position sensor 42B. Further, the CPU 62 acquires the detection result by the stop amount sensor 42C from the control device 36 and adjusts the size of the opening 40D1 by controlling the control device 36 based on the detection result by the stop amount sensor 42C.

The photoelectric conversion element driver 54 is connected to the photoelectric conversion elements 72. The photoelectric conversion element driver 54 supplies an imaging time signal, which defines a time at which the imaging is performed by the photoelectric conversion elements 72, to the photoelectric conversion elements 72 according to an instruction from the CPU 62. The photoelectric conversion elements 72 perform reset, exposure, and output of an electric signal according to the imaging time signal supplied from the photoelectric conversion element driver 54. Examples of the imaging time signal include a vertical synchronization signal, and a horizontal synchronization signal.

In a case where the interchangeable lens 18 is attached to the imaging apparatus main body 16, the subject light incident on the imaging lens 40 is imaged on the light-receiving surface 72A by the imaging lens 40. Under the control of the photoelectric conversion element driver 54, the photoelectric conversion elements 72 photoelectrically convert the subject light, which is received from the light-receiving surface 72A, and output the electric signal corresponding to the amount of light of the subject light to the A/D converter 74 as imaging data 73 indicating the subject light. Specifically, the A/D converter 74 reads out the imaging data 73 from the photoelectric conversion elements 72 in units of one frame and for each horizontal line by using an exposure sequential reading out method.

The A/D converter 74 digitizes the analog imaging data 73 that is read from the photoelectric conversion element 72. The imaging data 73, which is digitized by the A/D converter 74, is so-called RAW image data, and represents an image in which R pixels, G pixels, and B pixels are arranged in a mosaic shape. Further, in the first embodiment, as an example, the number of bits of each of the R pixel, the B pixel, and the G pixel included in the RAW image data, that is, the length of the bits is 14 bits.

The A/D converter 74 stores the imaging data 73 in the image memory 46 by outputting the digitized imaging data 73 to the image memory 46. The CPU 62 performs the image processing (for example, white balance processing, color correction, and/or the like) on the imaging data 73 in the image memory 46. The CPU 62 generates moving image data 80 based on the imaging data 73. The CPU 62 stores the generated moving image data 80 in the NVM 64. The NVM 64 is an example of a "non-transitory storage medium" according to the present disclosed technology.

The UI type device 48 includes a display 28. The CPU 62 displays an image on the display 28 based on the moving image data 80. Further, the CPU 62 displays various types of information on the display 28.

Further, the UI type device 48 includes a reception device 76 that receives an instruction from the user. The reception device 76 includes the touch panel 30 and a hard key unit 78. The hard key unit 78 is a plurality of hard keys including an instruction key 26 (see FIG. 1). The CPU 62 operates according to various instructions received by using the touch panel 30. Here, although the hard key unit 78 is included in the UI type device 48, the present disclosed technology is not limited to this, for example, the hard key unit 78 may be connected to the external I/F 50.

The external I/F 50 controls the exchange of various types of information between the imaging apparatus 10 and an apparatus existing outside the imaging apparatus 10 (hereinafter, also referred to as an "external apparatus"). Examples of the external I/F 50 include a USB interface. The external apparatus (not shown) such as a smart device, a personal computer, a server, a USB memory, a memory card, and/or a printer is directly or indirectly connected to the USB interface.

The communication I/F 52 is connected to a network (not shown). The communication I/F 52 controls the exchange of information between a communication device (not shown) such as a server on the network and the controller 12. For example, the communication I/F 52 transmits information in response to a request from the controller 12 to the communication device via the network. Further, the communication I/F 52 receives the information transmitted from the communication device and outputs the received information to the controller 12 via the input/output interface 70.

Figure 3:
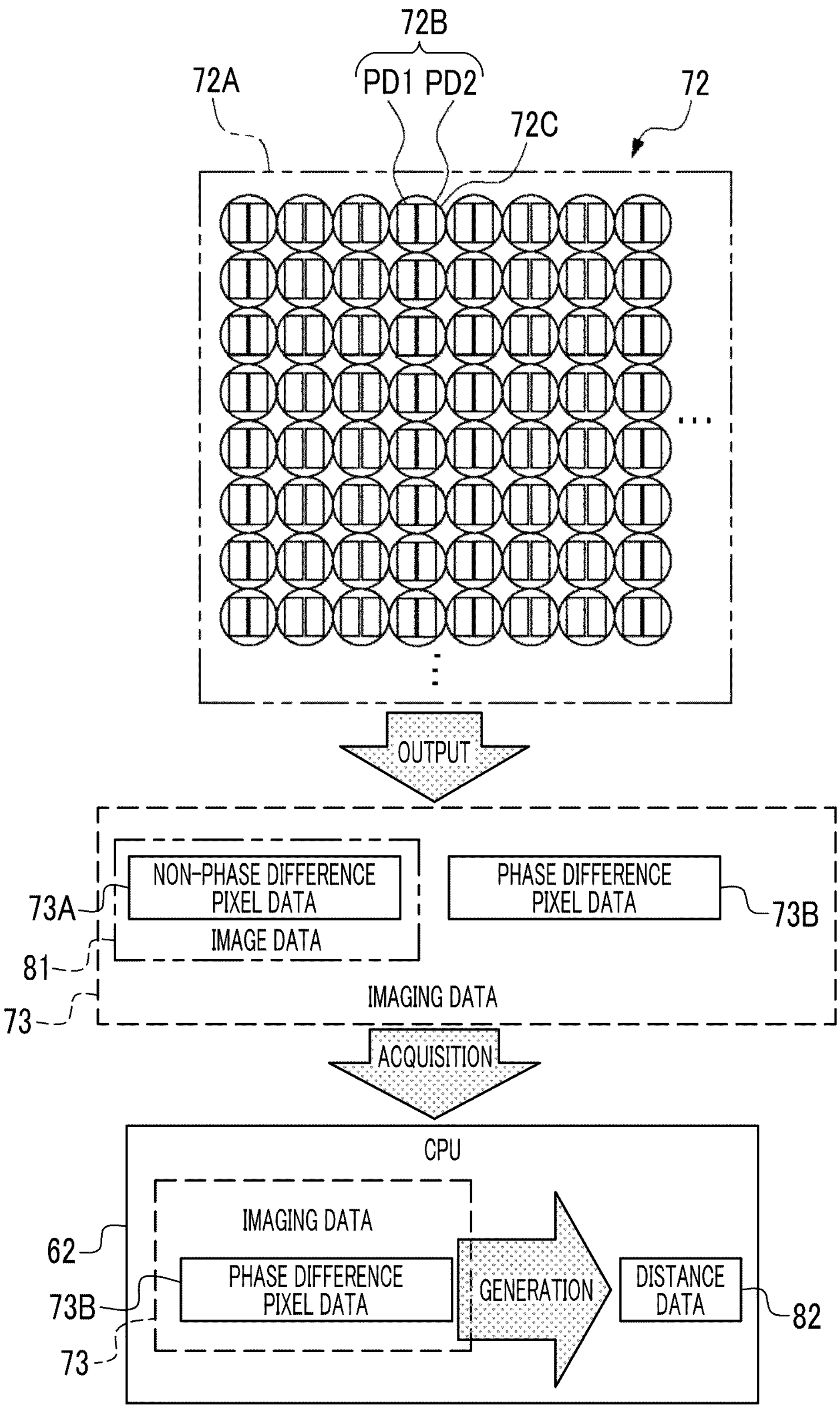
FIG. 3 is a schematic configuration diagram showing an example of a configuration of a photoelectric conversion element according to the first embodiment.

As an example shown in FIG. 3, the plurality of photosensitive pixels 72B are two-dimensionally arranged on the light-receiving surface 72A of the photoelectric conversion element 72. A color filter (not shown) and a micro lens 72C are disposed in each of the photosensitive pixels 72B. In FIG. 3, one direction that is parallel to the light-receiving surface 72A (for example, a row direction of the two-dimensionally arranged plurality of photosensitive pixels 72B) is defined as the X direction, and a direction that is orthogonal to the X direction (for example, a column direction of the two-dimensionally arranged plurality of photosensitive pixels 72B) is defined as the Y direction. The plurality of photosensitive pixels 72B are arranged along the X direction and the Y direction. Each photosensitive pixel 72B includes a pair of independent photodiodes PD1 and PD2. A first luminous flux (for example, a luminous flux passing through a first pupil portion region in the imaging lens 40 (see FIG. 2)), which is obtained by pupil-splitting a luminous flux (hereinafter also referred to as "subject luminous flux") indicating a subject transmitted through the imaging lens 40, is incident on the photodiode PD1, and a second luminous flux (for example, a luminous flux passing through a second pupil portion region in the imaging lens 40 (see FIG. 2)), which is obtained by pupil-splitting the subject luminous flux, is incident on the photodiode PD2. The photodiode PD1 performs photoelectric conversion with respect to the first luminous flux. The photodiode PD2 performs photoelectric conversion with respect to the second luminous flux.

As an example, the photoelectric conversion element 72 is an image plane phase difference type photoelectric conversion element in which a pair of photodiodes PD1 and PD2 is provided in one photosensitive pixel 72B. As an example, the photoelectric conversion element 72 also has a function of outputting data that is related to the imaging and the phase difference with all the photosensitive pixels 72B. The photoelectric conversion element 72 outputs a non-phase difference pixel data 73A by combining the pair of photodiodes PD1 and PD2 into one photosensitive pixel 72B. Further, the photoelectric conversion element 72 outputs phase difference pixel data 73B by detecting a signal from each of the pair of photodiodes PD1 and PD2. That is, all the photosensitive pixels 72B, which are provided in the photoelectric conversion element 72, are so-called phase difference pixels.

The photosensitive pixel 72B is a pixel for selectively outputting the non-phase difference pixel data 73A and the phase difference pixel data 73B. The non-phase difference pixel data 73A is pixel data obtained by performing the photoelectric conversion in the entire region of the photosensitive pixels 72B, and the phase difference pixel data 73B is pixel data obtained by performing the photoelectric conversion in a part of region of the photosensitive pixels 72B. Here, the "entire region of photosensitive pixels 72B" is a light-receiving region where the photodiode PD1 and the photodiode PD2 are combined. Further, a "part of region of photosensitive pixels 72B" is a light-receiving region of the photodiode PD1 or a light-receiving region of the photodiode PD2. The photosensitive pixel 72B is an example of a "phase difference pixel" according to the present disclosed technology.

The non-phase difference pixel data 73A can also be generated based on the phase difference pixel data 73B. For example, the non-phase difference pixel data 73A is generated by adding the phase difference pixel data 73B for each pair of pixel signals corresponding to the pair of photodiodes PD1 and PD2. Further, the phase difference pixel data 73B may include only data that is output from one of the pair of photodiodes PD1 or PD2. For example, in a case where the phase difference pixel data 73B includes only the data that is output from the photodiode PD1, it is possible to create data that is output from the photodiode PD2 by subtracting the phase difference pixel data 73B from the non-phase difference pixel data 73A for each pixel.

The imaging data 73 includes image data 81 and the phase difference pixel data 73B. The image data 81 is generated based on the non-phase difference pixel data 73A. For example, the image data 81 is obtained by performing A/D conversion on the analog non-phase difference pixel data 73A. That is, the image data 81 is data obtained by digitizing the non-phase difference pixel data 73A output from the photoelectric conversion element 72. The CPU 62 acquires the imaging data 73 digitized by the A/D converter 74 and acquires the distance data 82 based on the acquired imaging data 73. For example, the CPU 62 acquires the phase difference pixel data 73B from the imaging data 73 and generates the distance data 82 based on the acquired phase difference pixel data 73B. The distance data 82 is data related to distances between the imaging apparatus 10 and a plurality of subjects within the imaging area imaged by the image sensor 20. The distance data is data that represents a distance (that is, a distance between an object within the imaging area and the imaging apparatus 10) obtained for each photosensitive pixel 72B. The distance data is an example of "distance data" according to the present disclosed technology.

Figure 4:
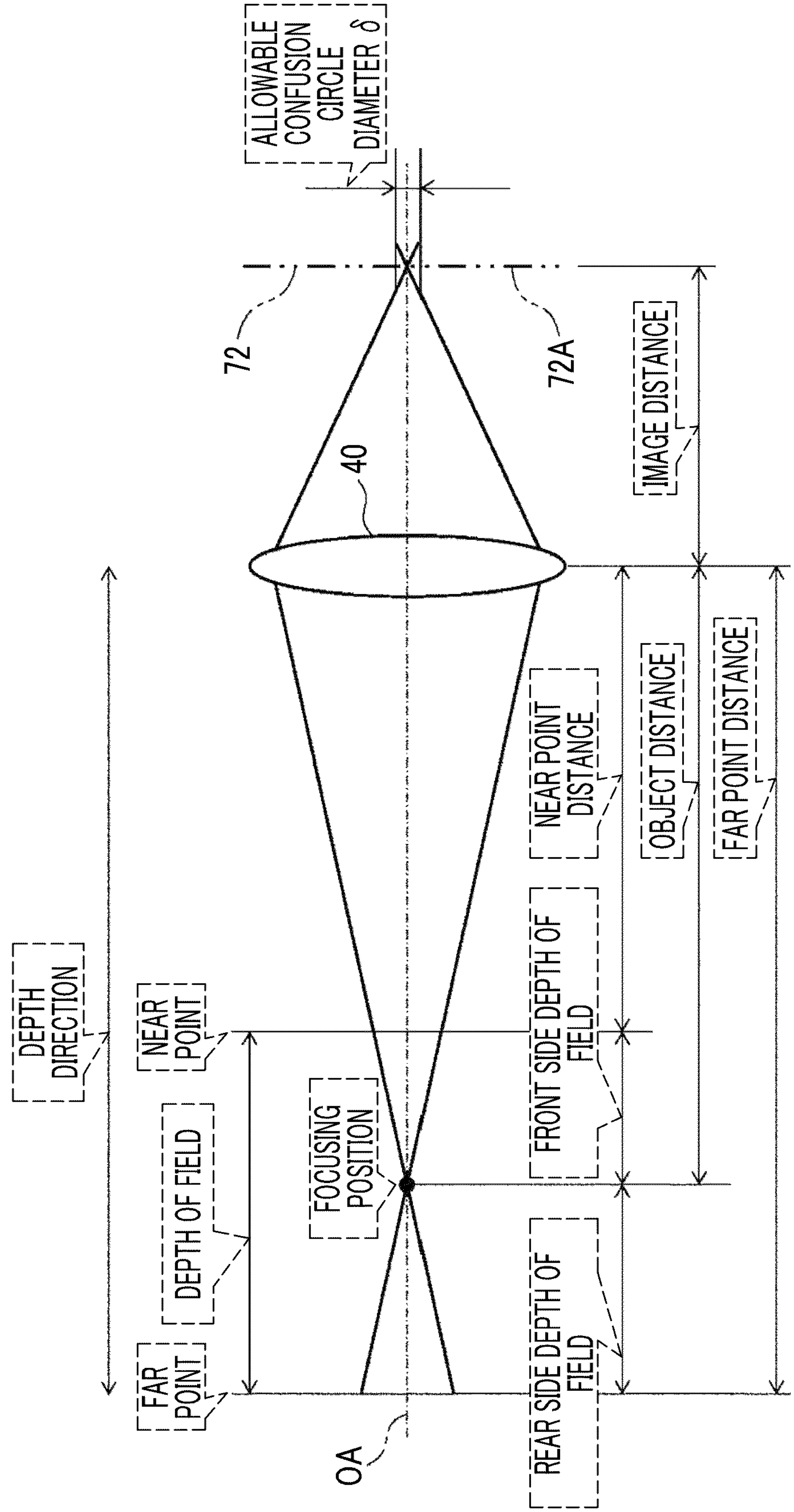
FIG. 4 is an explanatory diagram illustrating an example of a relationship between an imaging lens and a depth of field according to the first embodiment.

As an example, FIG. 4 shows an example of a relationship between the imaging lens 40 and the depth of field. In the example shown in FIG. 4, the imaging lens 40 is schematically shown as a single lens. An image distance is a distance along a depth direction from a main point of the imaging lens 40 to the light-receiving surface 72A of the photoelectric conversion element 72. The image distance is acquired based on the position of the focus lens 40B (see FIG. 2) detected by the first position sensor 42A (see FIG. 2) by using a default calculation expression or a data matching table. The depth direction is a direction parallel to the optical axis OA.

An object distance is a distance along the depth direction from the main point of the imaging lens 40 to a subject in an in-focus state. The subject in the in-focus state is positioned in a focusing position. The focusing position is a position that is most in focus. In a case where the object distance is denoted by "L", the object distance L is calculated by using the following Equation (1). Where, "t" is an image distance and is acquired based on a position detection result of the focus lens 40B by the first position sensor 42A as described above. Further, "f" is a focal length of the focus lens 40B and is a known fixed value. The focal length "f" is an example of a "focal length in an imaging lens" according to the present disclosed technology, and the object distance L is an example of an "object distance in an imaging lens" according to the present disclosed technology.

$$L = \frac{tf}{t - f} \tag{1}$$

The depth of field of the imaging apparatus 10 includes a front side depth of field and a rear side depth of field. In a case where the depth of field is denoted by "D", the depth of field D is calculated by using the following Equation (2). Further, in a case where the front side depth of field is denoted by "$D_1$", the front side depth of field $D_1$ is calculated by using the following Equation (3). Further, in a case where the rear side depth of field is denoted by $D_2$, the rear side depth of field $D_2$ is calculated by using the following Equation (4). Where, "F" is a stop value of the stop 40D (see FIG. 2) (that is, an F value), and "δ" is an allowable confusion circle diameter. The stop value F corresponds to the stop amount detected by the stop amount sensor 42C (see FIG. 2). The allowable confusion circle diameter δ is a known fixed value. The allowable confusion circle diameter δ is substantially 1 to 2 times an arrangement pitch of the photosensitive pixels 72B (see FIG. 3) arranged in the light-receiving surface 72A, and a blurriness of a size of substantially one pixel is allowed. The stop value F is an example of a "stop value in an imaging lens" according to the present disclosed technology, and the allowable confusion circle diameter δ is an example of an "allowable confusion circle diameter in an imaging lens" according to the present disclosed technology.

$$D = D_1 + D_2 \tag{2}$$

$$D_1 = \frac{\delta F L^2}{f^2 + \delta F L} \tag{3}$$

$$D_2 = \frac{\delta F L^2}{f^2 - \delta F L} \tag{4}$$

A near point distance is a distance along the depth direction from the main point of the imaging lens 40 to a near point of the depth of field. In a case where the near point distance is denoted by "$L_1$", the near point distance $L_1$ is calculated by using the following Equation (5). A far point distance is a distance along the depth direction from the main point of the imaging lens 40 to a far point of the depth of field. In a case where the far point distance is denoted by "$L_2$", the far point distance $L_2$ is calculated by using the following Equation (6).

$$L_1 = \frac{f^2(L - f)}{f^2 + \delta F(L - f)} + f \tag{5}$$

$$L_2 = \frac{f^2(L - f)}{f^2 - \delta F(L - f)} + f \tag{6}$$

Equations (1) to (6) are used in the moving image generation processing described below.

Figure 5:
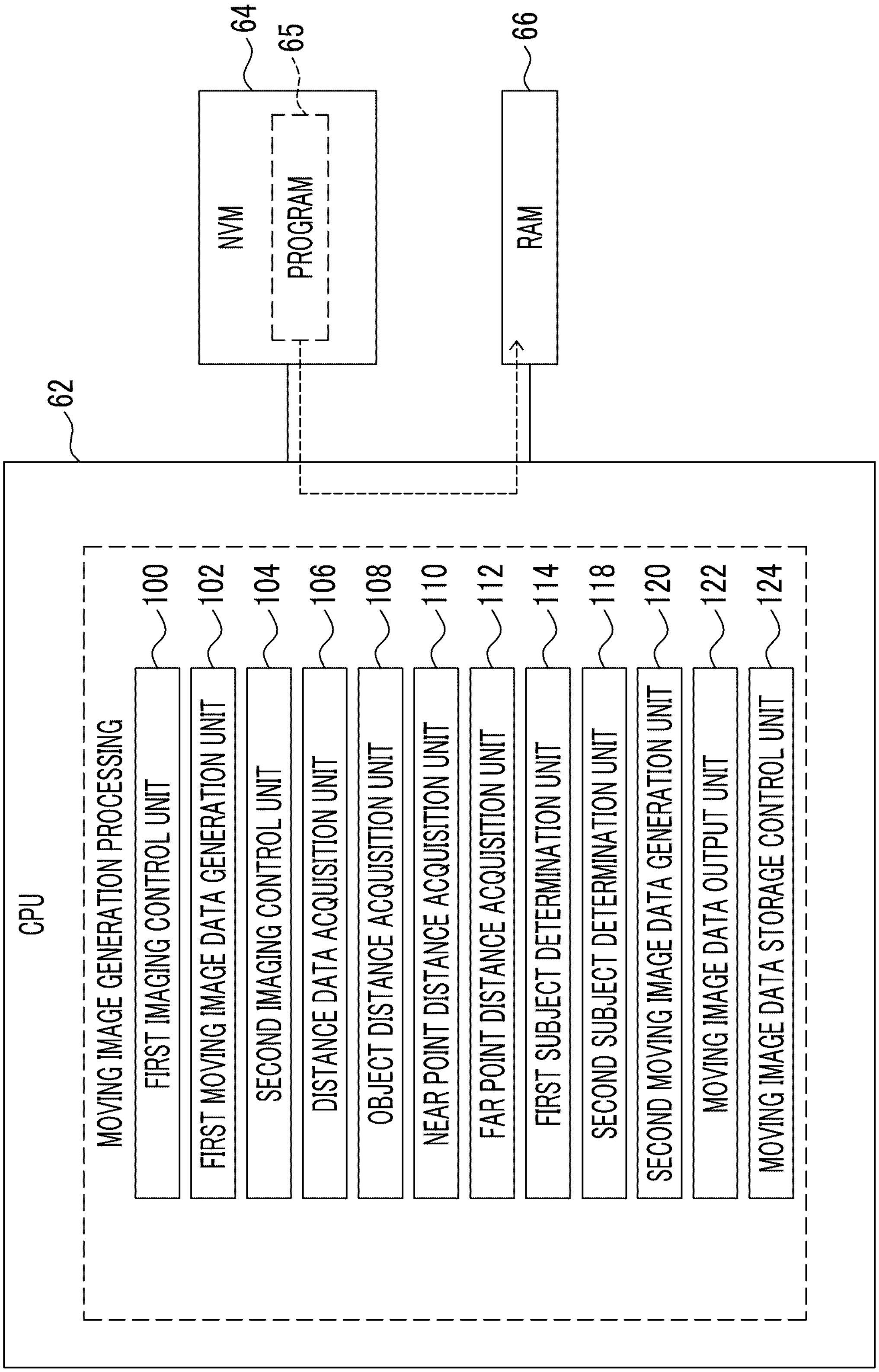
FIG. 5 is a block diagram showing an example of a functional configuration of a CPU according to the first embodiment.

As an example shown in FIG. 5, the program 65 is stored in the NVM 64. The program 65 is an example of a "program" according to the present disclosed technology. The CPU 62 reads out a program 65 from the NVM 64 and executes the read program 65 on the RAM 66. The CPU 62 performs moving image generation processing of generating the moving image data 80 (see FIG. 2) based on the imaging data 73 (see FIG. 2) according to the program 65 executed on the RAM 66. The moving image generation processing is realized by the CPU 62 operating as a first imaging control unit 100, a first moving image data generation unit 102, a second imaging control unit 104, a distance data acquisition unit 106, an object distance acquisition unit 108, a near point distance acquisition unit 110, a far point distance acquisition unit 112, a first subject determination unit 114, a second subject determination unit 118, a second moving image data generation unit 120, a moving image data output unit 122, and a moving image data storage control unit 124 according to the program 65.

As an example, FIG. 6 shows an example in which a first subject 90A, a second subject 90B, and a third subject 92 are present within the imaging area imaged by the image sensor 20. The first subject 90A, the second subject 90B, and the third subject 92 are, as an example, people. The first subject 90A, the second subject 90B, and the third subject 92 are examples of a "plurality of subjects" according to the present disclosed technology. The first subject 90A, the second subject 90B, and the third subject 92 are arranged in a shifted manner in the depth direction of the imaging apparatus 10. Further, the first subject 90A, the second subject 90B, and the third subject 92 are arranged in a shifted manner in a direction (that is, a left-right direction of the imaging apparatus 10) orthogonal to the depth direction of the imaging apparatus 10 in a plan view. Hereinafter, in a case where it is not necessary to distinguish among the first subject 90A, the second subject 90B, and the third subject 92, the first subject 90A, the second subject 90B, and the third subject 92 are respectively referred to as a subject.

A part of a face of the first subject 90A is present at the near point distance. That is, a part of the face of the first subject 90A is present on a near point of the depth of field away from the main point of the imaging lens 40 by the near point distance. Hereinafter, a part of the face of the first subject 90A present at the near point distance is referred to as a first boundary subject 91A. A part of a face of the second subject 90B is present at the far point distance. That is, a part of the face of the second subject 90B is present at a far point of the depth of field away from the main point of the imaging lens 40 by the far point distance. Hereinafter, a part of the face of the second subject 90B present at the far point distance is referred to as a second boundary subject 91B. The third subject 92 is present between the first subject 90A and the second subject 90B. A part of a face of the third subject 92 is present at the object distance. That is, a part of the face of the third subject 92 is present on the focusing position away from the main point of the imaging lens 40 by the object distance. Hereinafter, a part of the face of the third subject 92 present at the object distance is referred to as an in-focus subject 93. Further, hereinafter, in a case where it is not necessary to distinguish between the first boundary subject 91A and the second boundary subject 91B, the first boundary subject 91A and the second boundary subject 91B are referred to as a boundary subject 91.

The near point and far point of the depth of field are an example of a "boundary portion of the depth of field" according to the present disclosed technology. The near point of the depth of field is an example of a "first boundary portion positioned on a near point side of a depth of field" according to the present disclosed technology, and the far point of the depth of field is an example of a "second boundary portion positioned on a far point side of a depth of field" according to the present disclosed technology. The near point distance is an example of a "distance to a boundary portion" and a "distance of a first boundary portion" according to the present disclosed technology, and the far point distance is an example of a "distance of a boundary portion" and a "distance of a second boundary portion" according to the present disclosed technology. The first boundary subject 91A is an example of a "first boundary subject" according to the present disclosed technology, and the second boundary subject 91B is an example of a "second boundary subject" according to the present disclosed technology. The in-focus subject 93 is an example of an "in-focus subject" according to the present disclosed technology.

Hereinafter, based on the example shown in FIG. 6, operations of the first imaging control unit 100, the first moving image data generation unit 102, the second imaging control unit 104, the distance data acquisition unit 106, the object distance acquisition unit 108, the near point distance acquisition unit 110, the far point distance acquisition unit 112, the first subject determination unit 114, the second subject determination unit 118, the second moving image data generation unit 120, the moving image data output unit 122, and the moving image data storage control unit 124 will be described.

The first imaging control unit 100 performs control of causing the photoelectric conversion element 72 to output the non-phase difference pixel data 73A. Specifically, the first imaging control unit 100 outputs a first imaging command for outputting a first imaging time signal to the photoelectric conversion element 72 as the imaging time signal to the photoelectric conversion element driver 54. The first imaging time signal is an imaging time signal for causing the photoelectric conversion element 72 to output the non-phase difference pixel data 73A. Each photosensitive pixel 72B of the photoelectric conversion element 72 outputs non-phase difference pixel data 73A by performing the photoelectric conversion on the entire region of the photosensitive pixel 72B according to the first imaging time signal. The photoelectric conversion element 72 outputs the non-phase difference pixel data 73A output from each photosensitive pixel 72B to the A/D converter 74. The A/D converter 74 generates the image data 81 by digitizing the non-phase difference pixel data 73A output from each photosensitive pixel 72B.

The first moving image data generation unit 102 acquires the image data 81 from the A/D converter 74. The image data 81 is data that represents an image obtained by imaging the first subject 90A, the second subject 90B, and the third subject 92 by the image sensor 20. The image data 81 is an example of "image data" according to the present disclosed technology. Further, the first moving image data generation unit 102 generates first moving image data (that is, data for a moving image for one frame) based on the image data 81.

The second imaging control unit 104 performs control of causing the photoelectric conversion element 72 to output the phase difference pixel data 73B. Specifically, the second imaging control unit 104 outputs a second imaging command for outputting a second imaging time signal to the photoelectric conversion element 72 as the imaging time signal to the photoelectric conversion element driver 54. The second imaging time signal is an imaging time signal for causing the photoelectric conversion element 72 to output the phase difference pixel data 73B. Each photosensitive pixel 72B of the photoelectric conversion element 72 outputs phase difference pixel data 73B by performing the photoelectric conversion on a part of the region of the photosensitive pixel 72B according to the second imaging time signal. The photoelectric conversion element 72 outputs the phase difference pixel data 73B obtained from each photosensitive pixel 72B to the A/D converter 74. The A/D converter 74 digitizes the phase difference pixel data 73B and outputs the digitized phase difference pixel data 73B to the distance data acquisition unit 106.

The distance data acquisition unit 106 acquires the distance data 82. Specifically, the distance data acquisition unit 106 acquires the phase difference pixel data 73B from the A/D converter 74 and generates the distance data 82 (that is, data indicating the distance between the object within the imaging area and each photosensitive pixel 72B) corresponding to each photosensitive pixel 72B based on the acquired phase difference pixel data 73B.

The object distance acquisition unit 108 acquires the image distance t and the focal length f. Further, the object distance acquisition unit 108 acquires the object distance L by calculating the object distance L by using Equation (1) based on the image distance t and the focal length f. In this case, the object distance acquisition unit 108 acquires the image distance t based on the position of the focus lens 40B (see FIG. 2) detected by the first position sensor 42A. Further, the object distance acquisition unit 108 acquires, for example, the focal length f stored in advance in the NVM 64.

The near point distance acquisition unit 110 acquires the object distance L, the focal length f, the stop value F, and the allowable confusion circle diameter δ. Further, the near point distance acquisition unit 110 acquires the near point distance $L_1$ by calculating the near point distance $L_1$ by using Equation (5) based on the object distance L, the focal length f, the stop value F, and the allowable confusion circle diameter δ. In this case, the near point distance acquisition unit 110 acquires the object distance L, the focal length f, the stop value F, and the allowable confusion circle diameter δ in the following manner. That is, the near point distance acquisition unit 110 acquires the object distance L acquired by the object distance acquisition unit 108. Further, the near point distance acquisition unit 110 acquires, for example, the focal length f stored in advance in the NVM 64. Further, the near point distance acquisition unit 110 acquires the stop value F corresponding to the stop amount detected by the stop amount sensor 42C. For example, in a case where the allowable confusion circle diameter δ is assigned to the reception device 76 from the user, the near point distance acquisition unit 110 acquires the allowable confusion circle diameter δ received by the reception device 76.

The far point distance acquisition unit 112 acquires the object distance L, the focal length f, the stop value F, and the allowable confusion circle diameter δ. Further, the far point distance acquisition unit 112 acquires the far point distance $L_2$ by calculating the far point distance $L_2$ by using Equation (6) based on the object distance L, the focal length f, the stop value F, and the allowable confusion circle diameter δ. In this case, the far point distance acquisition unit 112 acquires the object distance L, the focal length f, the stop value F, and the allowable confusion circle diameter δ in the following manner. That is, the far point distance acquisition unit 112 acquires the object distance L acquired by the object distance acquisition unit 108. Further, the far point distance acquisition unit 112 acquires, for example, the focal length f stored in advance in the NVM 64. Further, the far point distance acquisition unit 112 acquires the stop value F corresponding to the stop amount detected by the stop amount sensor 42C. For example, in a case where the allowable confusion circle diameter δ is assigned to the reception device 76 from the user, the far point distance acquisition unit 112 acquires the allowable confusion circle diameter δ received by the reception device 76.

The near point distance acquisition unit 110 and the far point distance acquisition unit 112 may acquire the allowable confusion circle diameter δ from information stored in advance in, for example, the NVM 64.

The first subject determination unit 114 determines whether or not the first boundary subject 91A is present at the near point distance (in other words, whether or not the first boundary subject 91A is present on the near point) based on the distance data acquired by the distance data acquisition unit 106. Specifically, the first subject determination unit 114 compares a distance obtained for each photosensitive pixel 72B (see FIG. 3) with the near point distance based on the distance data and determines whether or not the distance obtained for each photosensitive pixel 72B includes a distance equal to the near point distance. The photosensitive pixel 72B, from which the distance equal to the near point distance is obtained, is the photosensitive pixel 72B corresponding to the first boundary subject 91A. Further, in a case where the distance obtained for each photosensitive pixel 72B includes the distance equal to the near point distance, the first subject determination unit 114 determines that the first boundary subject 91A is present at the near point distance. On the other hand, in a case where the distance obtained for each photosensitive pixel 72B does not include the distance equal to the near point distance, the first subject determination unit 114 determines that the first boundary subject 91A is not present at the near point distance.

As an example, in the example shown in FIG. 6, the first boundary subject 91A is present at the near point distance. In a case where the first boundary subject 91A is present at the near point distance, the first subject determination unit 114 determines that the first boundary subject 91A is present at the near point distance.

The second subject determination unit 118 determines whether or not the second boundary subject 91B is present at the far point distance (in other words, whether or not the second boundary subject 91B is present on the far point) based on the distance data acquired by the distance data acquisition unit 106. Specifically, the second subject determination unit 118 compares a distance obtained for each photosensitive pixel 72B (see FIG. 3) with the far point distance based on the distance data and determines whether or not the distance obtained for each photosensitive pixel 72B includes a distance equal to the far point distance. The photosensitive pixel 72B, from which the distance equal to the far point distance is obtained, is the photosensitive pixel 72B corresponding to the second boundary subject 91B. Further, in a case where the distance obtained for each photosensitive pixel 72B includes the distance equal to the far point distance, the second subject determination unit 118 determines that the second boundary subject 91B is present at the far point distance. On the other hand, in a case where the distance obtained for each photosensitive pixel 72B does not include the distance equal to the far point distance, the second subject determination unit 118 determines that the second boundary subject 91B is not present at the far point distance.

As an example, in the example shown in FIG. 6, the second boundary subject 91B is present at the far point distance. In a case where the second boundary subject 91B is present at the far point distance, the second subject determination unit 118 determines that the second boundary subject 91B is present at the far point distance.

The second moving image data generation unit 120 generates first boundary data indicating a region of the first boundary subject 91A present at the near point distance based on the distance data, in a case where the first subject determination unit 114 determines that the first boundary subject 91A is present at the near point distance. Specifically, the second moving image data generation unit 120 generates the first boundary data in the following manner.

That is, the second moving image data generation unit 120 acquires first region data indicating the region of the first boundary subject 91A that is present at the distance equal to the near point distance among the distances obtained for each photosensitive pixel 72B (see FIG. 3), based on the distance data. The first region data is represented by, for example, an address of the photosensitive pixel 72B. That is, the second moving image data generation unit 120 acquires, as the first region data, the address of the photosensitive pixel 72B from which the distance equal to the near point distance is obtained among the plurality of photosensitive pixels 72B, based on the distance data. The address of the photosensitive pixel 72B is coordinates defined for each photosensitive pixel 72B. The coordinates, which are defined for each photosensitive pixel 72B, refer to, for example, two-dimensional coordinates representing a longitudinal direction and a lateral direction (for example, a row direction and a column direction) of the photoelectric conversion element 72.

Subsequently, the second moving image data generation unit 120 generates the first boundary data based on the first region data. The first boundary data is data that represents, in a first manner, the region of the first boundary subject 91A (that is, the region indicated by the first region data) present at the near point distance, with respect to the image displayed on the display 28 based on the first moving image data. An example of the data that represents, in the first manner, the region of the first boundary subject 91A includes data used for first image processing of representing, in a manner distinguishable from other regions, the region of the first boundary subject 91A present at the near point distance, with respect to the image displayed on the display 28.

As an example, the first image processing is processing of assigning first default color to a pixel (that is, a pixel corresponding to the address of the photosensitive pixel 72B represented by the first region data) corresponding to the region of the first boundary subject 91A present at the near point distance among a plurality of pixels constituting the image displayed on the display 28. The processing of assigning the first default color is, for example, processing of replacing a signal value of a pixel with a value corresponding to the first default color. For example, in a case in which red is assigned to a pixel, a red (R) value, a green (G) value, and a blue (B) value of the pixel are set to 255, 0, and 0, respectively. The first default color may be achromatic color or may be chromatic color. The first default color is, for example, red, blue, yellow, or the like. The first boundary data is an example of "boundary data" and "first boundary data" according to the present disclosed technology. The first image processing is an example of "image processing" according to the present disclosed technology. The first region data is an example of "region data" according to the present disclosed technology.

Further, the second moving image data generation unit 120 generates second boundary data indicating a region of the second boundary subject 91B that is present at the far point distance based on the distance data, in a case where the second subject determination unit 118 determines that the second boundary subject 91B is present at the far point distance. Specifically, the second moving image data generation unit 120 generates the second boundary data in the following manner.

That is, the second moving image data generation unit 120 acquires second region data indicating the region of the second boundary subject 91B that is present at the distance equal to the far point distance among the distances obtained for each photosensitive pixel 72B (see FIG. 3), based on the distance data. The second region data is represented by, for example, an address of the photosensitive pixel 72B. That is, the second moving image data generation unit 120 acquires, as the second region data, the address of the photosensitive pixel 72B from which the distance equal to the far point distance is obtained among the plurality of photosensitive pixels 72B, based on the distance data.

Subsequently, the second moving image data generation unit 120 generates the second boundary data based on the second region data. The second boundary data is data that represents, in a second manner different from the first manner, the region of the second boundary subject 91B (that is, the region indicated by the second region data) present at the far point distance, with respect to the image displayed on the display 28 based on the first moving image data. An example of the data that represents, in the second manner different from the first manner, the region of the second boundary subject 91B includes data used for second image processing of representing, in a manner distinguishable from other regions, the region of the second boundary subject 91B present at the far point distance, with respect to the image displayed on the display 28 based on the first moving image data.

As an example, the second image processing is processing of assigning second default color to a pixel (that is, a pixel corresponding to the address of the photosensitive pixel 72B represented by the second region data) corresponding to the region of the second boundary subject 91B present at the far point distance among the plurality of pixels constituting the image displayed on the display 28. The second default color is color different from the first default color. The second default color may be achromatic color or may be chromatic color. The second default color is, for example, red, blue, yellow, or the like. Hereinafter, in a case where it is not necessary to distinguish between the first image processing and the second image processing, the first image processing and the second image processing are referred to as boundary data. Further, in a case where it is not necessary to distinguish between the first default color and the second default color, the first default color and the second default color are referred to as default color. The second boundary data is an example of "boundary data" and "second boundary data" according to the present disclosed technology. The second image processing is an example of "image processing" according to the present disclosed technology. The second region data is an example of "region data" according to the present disclosed technology.

Further, the second moving image data generation unit 120 generates the second moving image data including the first boundary data and the second boundary data based on the first moving image data, in a case where the first subject determination unit 114 determines that the first boundary subject 91A is present at the near point distance, and the second subject determination unit 118 determines that the second boundary subject 91B is present at the far point distance. Specifically, the second moving image data generation unit 120 performs the first image processing on the pixel corresponding to the region of the first boundary subject 91A that is present at the near point distance among the plurality of pixels constituting the image displayed on the display 28 based on the first moving image data. Similarly, the second moving image data generation unit 120 performs the second image processing on the pixel corresponding to the region of the second boundary subject 91B that is present at the far point distance among the plurality of pixels constituting the image displayed on the display 28 based on the first moving image data. As a result, the second moving image data generation unit 120 generates the second moving image data that represents an image where the first default color is assigned to the pixel corresponding to the region of the first boundary subject 91A present at the near point distance and the second default color is assigned to the pixel corresponding to the region of the second boundary subject 91B present at the far point distance.

The second moving image data generation unit 120 may generate the second moving image data stepwise in a case where the second moving image data including the first boundary data and the second boundary data is generated. That is, for example, the second moving image data generation unit 120 may generate temporary moving image data including the first boundary data based on the first moving image data, and then may generate the second moving image data including the second boundary data based on the temporary moving image data.

The second moving image data is an example of "moving image data" according to the present disclosed technology. Hereinafter, in a case where it is not necessary to distinguish between the first boundary data and the second boundary data, the first boundary data and the second boundary data are referred to as boundary data.

The moving image data output unit 122 outputs the second moving image data (that is, the second moving image data including the first boundary data and the second boundary data) generated by the second moving image data generation unit 120 to the display 28 as moving image data for display, in a case where the first subject determination unit 114 determines that the first boundary subject 91A is present at the near point distance, and the second subject determination unit 118 determines that the second boundary subject 91B is present at the far point distance. The display 28 displays the image based on the moving image data for display.

The moving image data storage control unit 124 stores the first moving image data generated by the first moving image data generation unit 102 in the NVM 64 as moving image data for recording. Here, although an example of the embodiment in which the moving image data for recording is stored in the NVM 64 has been described, the moving image data storage control unit 124 may store the moving image data for recording in a memory card, a USB memory, and/or the like that are connected to the external I/F 50 (see FIG. 2).

Figure 7:
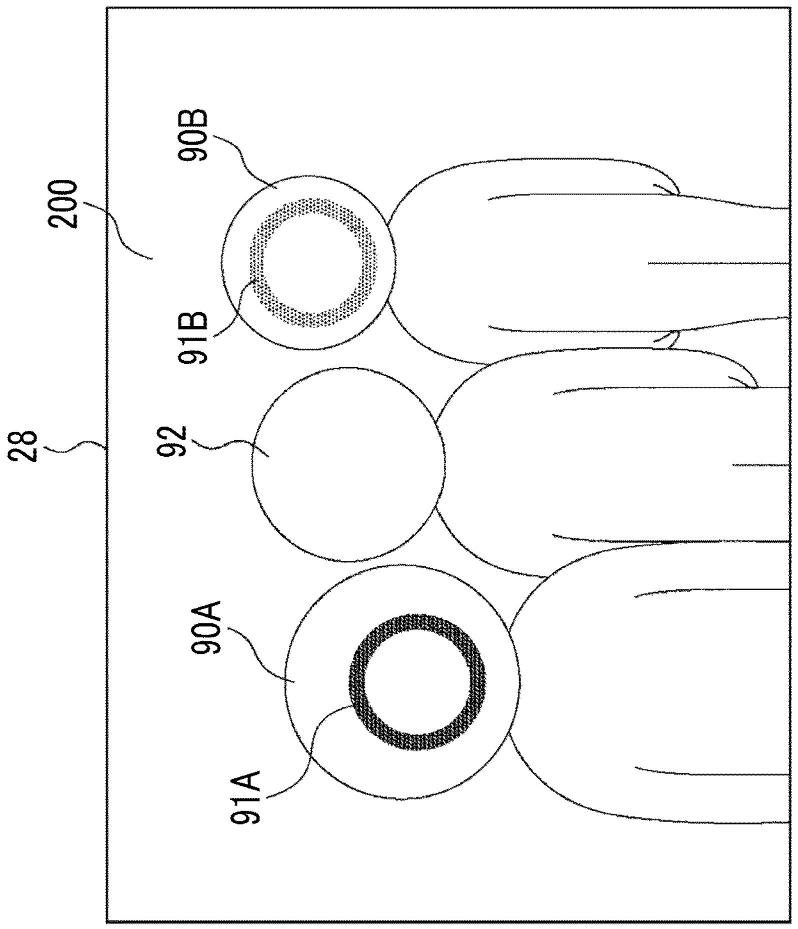
FIG. 7 is a front view showing an example of an image obtained by using the first operation example of the imaging apparatus according to the first embodiment.

As an example, FIG. 7 shows an image 200 displayed on the display 28 based on the second moving image data generated in the example shown in FIG. 6. In the image 200 shown in FIG. 7, the region of the first boundary subject 91A and regions other than the region of the first boundary subject 91A are represented in a manner of being distinguished from each other. Further, in the image 200 shown in FIG. 7, the region of the second boundary subject 91B and regions other than the region of the second boundary subject 91B are represented in a manner of being distinguished from each other. That is, as an example, in the image 200 shown in FIG. 7, the region of the first boundary subject 91A is represented with the first default color, and the region of the second boundary subject 91B is represented with the second default color. Further, in the example shown in FIG. 7, although annular-shaped regions are shown as the region of the first boundary subject 91A and the region of the second boundary subject 91B, this is only an example, and the regions may have another shape. Further, the region of the first boundary subject 91A and the region of the second boundary subject 91B may be regions having different shapes from each other. Further, the same pattern may be applied to the region of the first boundary subject 91A and the region of the second boundary subject 91B, or different patterns (for example, dots and meshes) may be applied thereto.

The display 28 is an example of a "first display", a "second display", a "third display", a "fourth display", and a "fifth display" according to the present disclosed technology. In the present disclosure, for convenience, the display 28 is represented as an example of the "first display", the "second display", the "third display", the "fourth display", and the "fifth display". The image 200 displayed on the display 28 is an example of a "first image", a "second image", and a "third image" according to the present disclosed technology. In the present disclosure, for convenience, the image 200 is represented as an example of the "first image", the "second image", and the "third image". The plurality of pixels constituting the image 200 displayed on the display 28 are examples of "first pixels" and "second pixels" according to the present disclosed technology. In the present disclosure, for convenience, the plurality of pixels constituting the image 200 displayed on the display 28 are represented as examples of the "first pixels" and the "second pixels".

As an example, FIG. 8 shows an example in which the first subject 90A and the third subject 92 are present within the imaging area imaged by the image sensor 20. In the example shown in FIG. 8, positions of the first subject 90A and the third subject 92 are the same as those in the example shown in FIG. 6.

Hereinafter, based on the example shown in FIG. 8, operations of the first imaging control unit 100, the first moving image data generation unit 102, the second imaging control unit 104, the distance data acquisition unit 106, the object distance acquisition unit 108, the near point distance acquisition unit 110, the far point distance acquisition unit 112, the first subject determination unit 114, the second subject determination unit 118, the second moving image data generation unit 120, the moving image data output unit 122, and the moving image data storage control unit 124 will be described.

The operations of the first imaging control unit 100, the first moving image data generation unit 102, the second imaging control unit 104, the distance data acquisition unit 106, the object distance acquisition unit 108, the near point distance acquisition unit 110, the far point distance acquisition unit 112, the first subject determination unit 114, and the moving image data storage control unit 124 are the same as those in the example shown in FIG. 6. In the example shown in FIG. 8, the operations of the second subject determination unit 118, the second moving image data generation unit 120, and the moving image data output unit 122 are different from those in the example shown in FIG. 6. Hereinafter, regarding the example shown in FIG. 8, the operations of the second subject determination unit 118, the second moving image data generation unit 120, and the moving image data output unit 122 will be described as a difference from the example shown in FIG. 6.

As an example, in the example shown in FIG. 8 the second boundary subject 91B (see FIG. 6) is not present at the far point distance. In a case where the second boundary subject 91B is not present at the far point distance, the second subject determination unit 118 determines that the second boundary subject 91B is not present at the far point distance.

The second moving image data generation unit 120 generates the second moving image data including the first boundary data based on the first moving image data, in a case where the first subject determination unit 114 determines that the first boundary subject 91A is present at the near point distance, and the second subject determination unit 118 determines that the second boundary subject 91B is not present at the far point distance. Specifically, the second moving image data generation unit 120 performs the first image processing on the pixel corresponding to the region of the first boundary subject 91A that is present at the near point distance among the plurality of pixels constituting the image displayed on the display 28 based on the first moving image data. As a result, the second moving image data generation unit 120 generates the second moving image data that represents an image where the first default color is assigned to the pixel corresponding to the region of the first boundary subject 91A present at the near point distance.

The moving image data output unit 122 outputs the second moving image data (that is, second moving image data including first boundary data) generated by the second moving image data generation unit 120 to the display 28 as moving image data for display (for example, data indicating the live view image), in a case where the first subject determination unit 114 determines that the first boundary subject 91A is present at the near point distance, and the second subject determination unit 118 determines that the second boundary subject 91B is not present at the far point distance. The display 28 displays the image (for example, the live view image) based on the moving image data for display.

Figure 9:
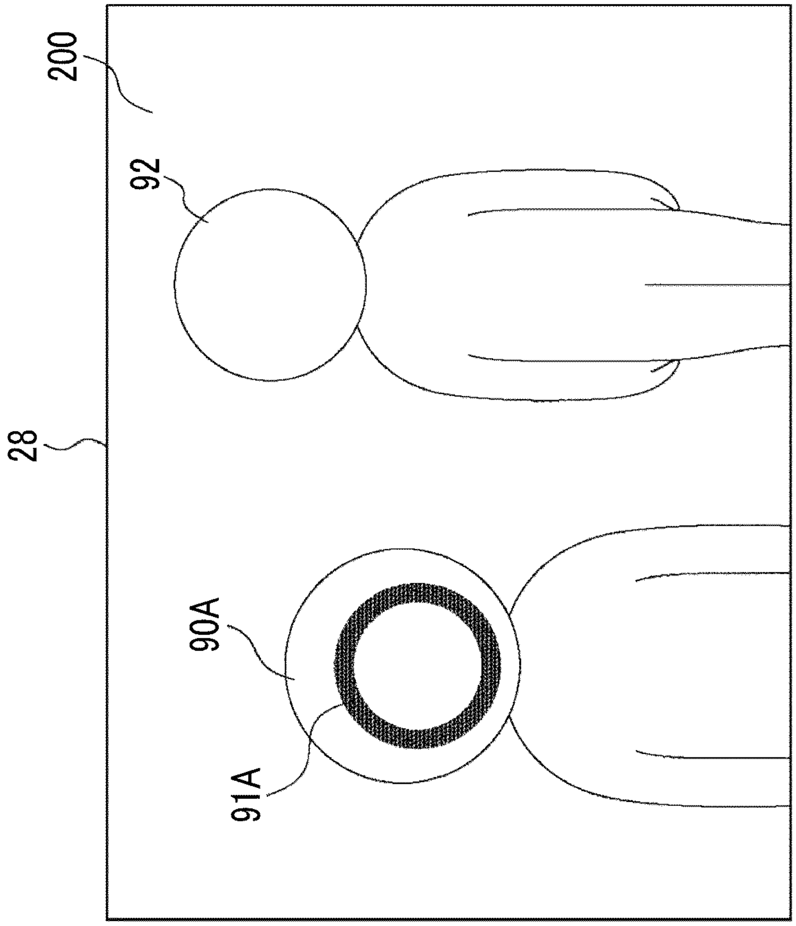
FIG. 9 is a front view showing an example of an image obtained by using the second operation example of the imaging apparatus according to the first embodiment.

As an example, FIG. 9 shows an image 200 displayed on the display 28 based on the second moving image data generated in the example shown in FIG. 8. In the image 200 shown in FIG. 9, the region of the first boundary subject 91A and regions other than the region of the first boundary subject 91A are represented in a manner of being distinguished from each other. That is, as an example, in the image 200 shown in FIG. 9, the region of the first boundary subject 91A is represented with the first default color.

Figure 10:
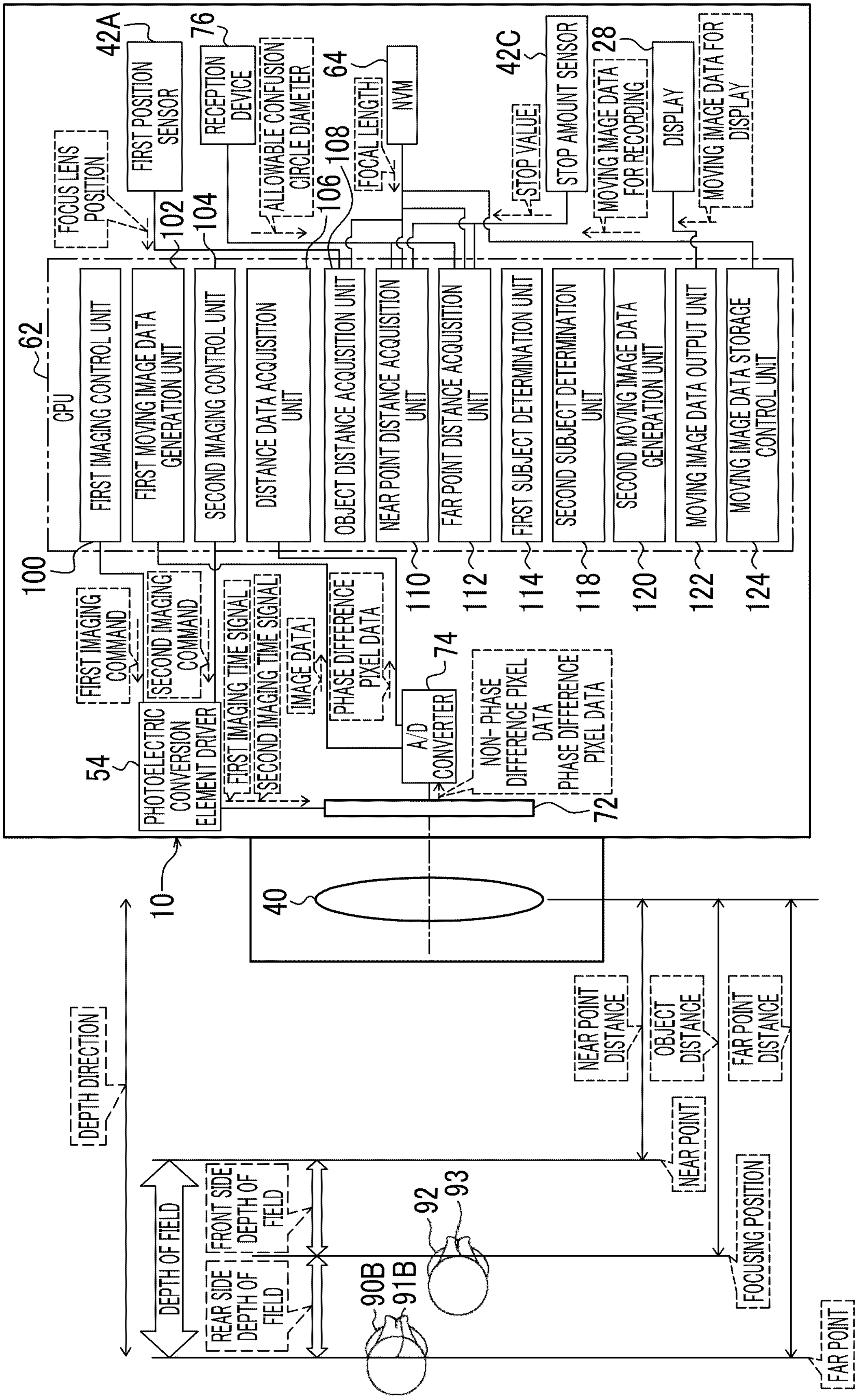
FIG. 10 is an explanatory diagram showing an example of a third operation example of the imaging apparatus according to the first embodiment.

As an example, FIG. 10 shows an example in which the second subject 90B and the third subject 92 are present within the imaging area imaged by the image sensor 20. In the example shown in FIG. 10, positions of the second subject 90B and the third subject 92 are the same as those in the example shown in FIG. 6.

Hereinafter, based on the example shown in FIG. 10, operations of the first imaging control unit 100, the first moving image data generation unit 102, the second imaging control unit 104, the distance data acquisition unit 106, the object distance acquisition unit 108, the near point distance acquisition unit 110, the far point distance acquisition unit 112, the first subject determination unit 114, the second subject determination unit 118, the second moving image data generation unit 120, the moving image data output unit 122, and the moving image data storage control unit 124 will be described.

The operations of the first imaging control unit 100, the first moving image data generation unit 102, the second imaging control unit 104, the distance data acquisition unit 106, the object distance acquisition unit 108, the near point distance acquisition unit 110, the far point distance acquisition unit 112, the second subject determination unit 118, and the moving image data storage control unit 124 are the same as those in the example shown in FIG. 6. In the example shown in FIG. 10, the operations of the first subject determination unit 114, the second moving image data generation unit 120, and the moving image data output unit 122 are different from those in the example shown in FIG. 6. Hereinafter, regarding the example shown in FIG. 10, the operations of the first subject determination unit 114, the second moving image data generation unit 120, and the moving image data output unit 122 will be described as a difference from the example shown in FIG. 6.

As an example, in the example shown in FIG. 10 the first boundary subject 91A (see FIG. 6) is not present at the near point distance. In a case where the first boundary subject 91A is not present at the near point distance, the first subject determination unit 114 determines that the first boundary subject 91A is not present at the near point distance.

The second moving image data generation unit 120 generates the second moving image data including the second boundary data based on the first moving image data in a case where the first subject determination unit 114 determines that the first boundary subject 91A is not present at the near point distance, and the second subject determination unit 118 determines that the second boundary subject 91B is present at the far point distance. Specifically, the second moving image data generation unit 120 performs the second image processing on the pixel corresponding to the region of the second boundary subject 91B that is present at the far point distance among the plurality of pixels constituting the image displayed on the display 28 based on the first moving image data. As a result, the second moving image data generation unit 120 generates the second moving image data that represents an image where the second default color is assigned to the pixel corresponding to the region of the second boundary subject 91B present at the far point distance.

The moving image data output unit 122 outputs the second moving image data (that is, the second moving image data including the second boundary data) generated by the second moving image data generation unit 120 to the display 28 as moving image data for display in a case where the first subject determination unit 114 determines that the first boundary subject 91A is not present at the near point distance, and the second subject determination unit 118 determines that the second boundary subject 91B is present at the far point distance. The display 28 displays the image based on the moving image data for display.

Figure 11:
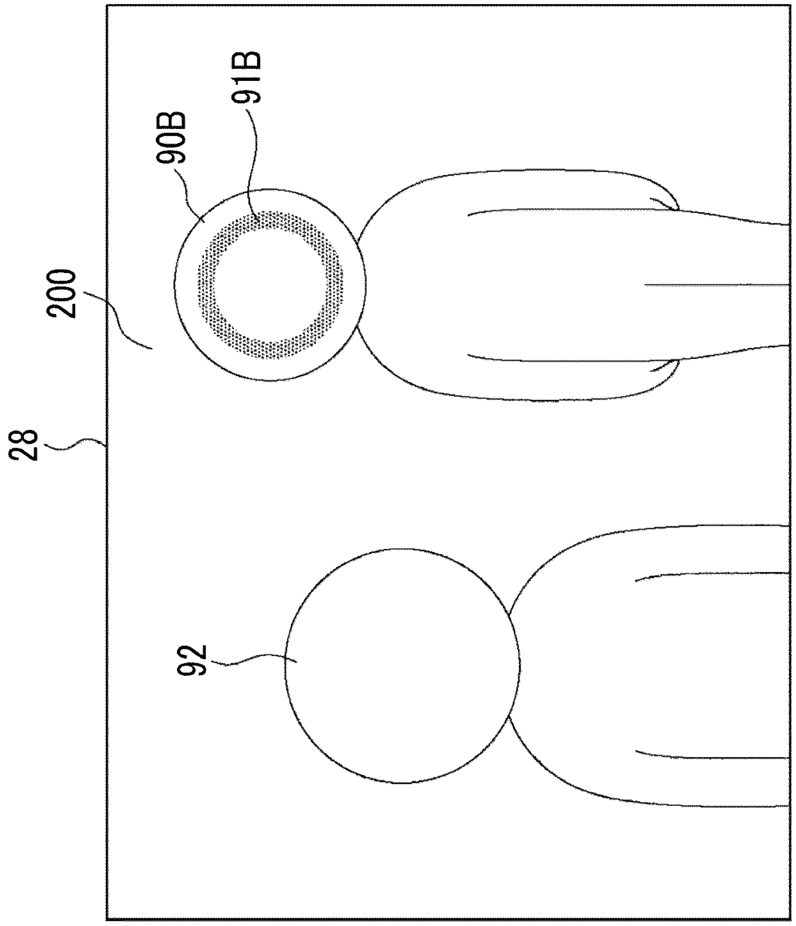
FIG. 11 is a front view showing an example of an image obtained by using the third operation example of the imaging apparatus according to the first embodiment.

As an example, FIG. 11 shows an image 200 displayed on the display 28 based on the second moving image data generated in the example shown in FIG. 10. In the image 200 shown in FIG. 11, the region of the second boundary subject 91B and regions other than the region of the second boundary subject 91B are represented in a manner of being distinguished from each other. That is, as an example, in the image 200 shown in FIG. 11, the region of the second boundary subject 91B is represented with the second default color.

Although not particularly shown in the figure, in a case where the first subject 90A and the second subject 90B are not present within the imaging area imaged by the image sensor 20, the first subject determination unit 114 determines that the first boundary subject 91A is not present at the near point distance, and the second subject determination unit 118 determines that the second boundary subject 91B is not present at the far point distance.

In a case where the first subject determination unit 114 determines that the first boundary subject 91A is not present at the near point distance, and the second subject determination unit 118 determines that the second boundary subject 91B is not present at the far point distance, the operation of the second moving image data generation unit 120 is skipped. That is, the moving image data output unit 122 performs processing without generating the second moving image data by the second moving image data generation unit 120.

The moving image data output unit 122 outputs the first moving image data generated by the first moving image data generation unit 102 to the display 28 as moving image data for display in a case where the first subject determination unit 114 determines that the first boundary subject 91A is not present at the near point distance, and the second subject determination unit 118 determines that the second boundary subject 91B is not present at the far point distance. The display 28 displays the image based on the moving image data for display. In this case, the first subject 90A and the second subject 90B are not represented as figures in the image displayed on the display 28.

Figure 12A:
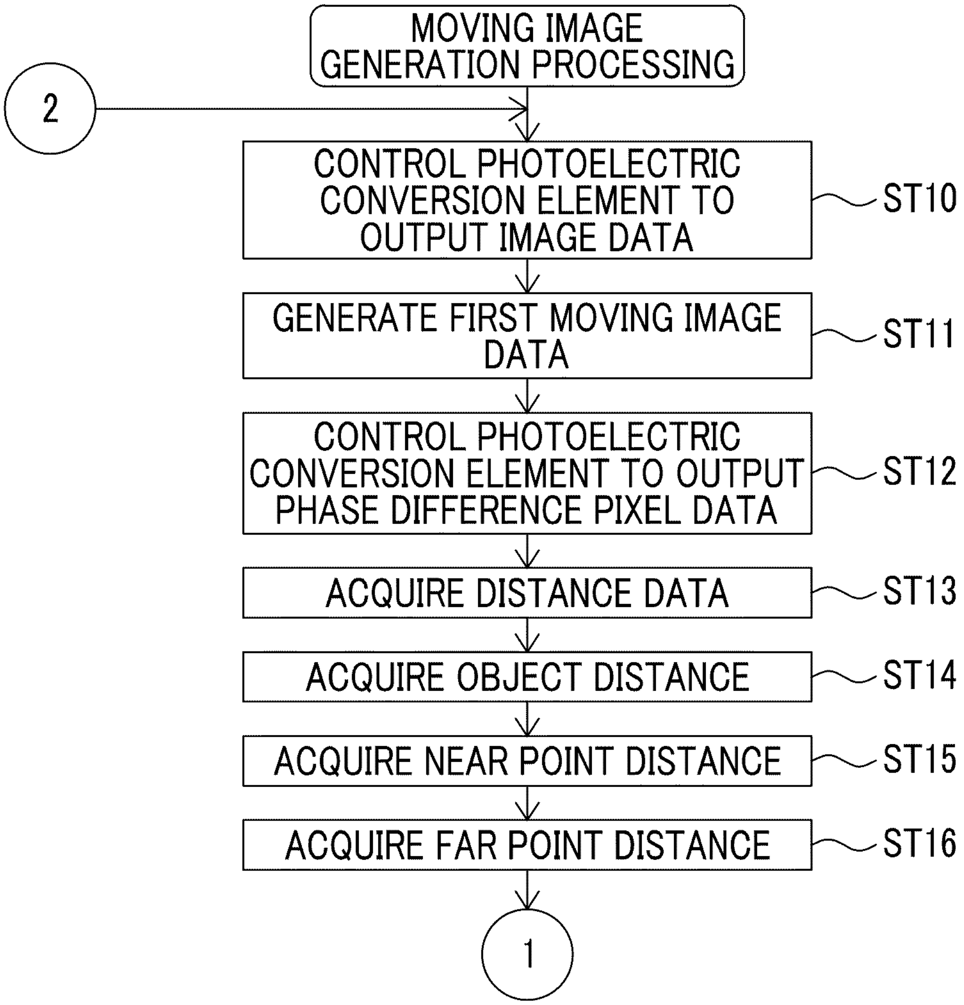
FIG. 12A is a flowchart showing an example of a flow of first processing of moving image generation processing executed by the CPU according to the first embodiment.

Next, an action of the imaging apparatus 10 according to the first embodiment will be described with reference to FIGS. 12A and 12B. FIGS. 12A and 12B show an example of a flow of the moving image generation processing according to the first embodiment. The moving image generation processing is executed in a case where the operation mode of the imaging apparatus 10 is the imaging mode.

In the moving image generation processing shown in FIG. 12A, first, in step ST10, the first imaging control unit 100 causes the photoelectric conversion element 72 to output the non-phase difference pixel data 73A. After the processing of step ST10 is executed, the moving image generation processing shifts to step ST11.

In step ST11, the first moving image data generation unit 102 acquires the image data 81. Further, the first moving image data generation unit 102 generates the first moving image data based on the image data 81. After the processing of step ST11 is executed, the moving image generation processing shifts to step ST12.

In step ST12, the second imaging control unit 104 causes the photoelectric conversion element 72 to output the phase difference pixel data 73B. After the processing of step ST12 is executed, the moving image generation processing shifts to step ST13.

In step ST13, the distance data acquisition unit 106 acquires the distance data. After the processing of step ST13 is executed, the moving image generation processing shifts to step ST14.

In Step ST14, the object distance acquisition unit 108 acquires the object distance L based on the image distance t and the focal length f. After the processing of step ST14 is executed, the moving image generation processing shifts to step ST15.

In step ST15, the near point distance acquisition unit 110 acquires the near point distance $L_1$ based on the object distance L, the focal length f, the stop value F, and the allowable confusion circle diameter δ. After the processing of step ST15 is executed, the moving image generation processing shifts to step ST16.

In step ST16, the far point distance acquisition unit 112 acquires the far point distance $L_2$ based on the object distance L, the focal length f, the stop value F, and the allowable confusion circle diameter δ. After the processing of step ST16 is executed, the moving image generation processing shifts to step ST17 shown in FIG. 12B.

In step ST17, the first subject determination unit 114 determines whether or not the first boundary subject 91A is present at the near point distance based on the distance data acquired in step ST13 (see FIG. 12A). In step ST17, in a case where the first boundary subject 91A is not present at the near point distance, the determination is set as negative, and the moving image generation processing shifts to step ST23. In step ST17, in a case where the first boundary subject 91A is present at the near point distance, the determination is set as positive, and the moving image generation processing shifts to step ST18.

In step ST18, the second subject determination unit 118 determines whether or not the second boundary subject 91B is present at the far point distance based on the distance data acquired in step ST13. In step ST18, in a case where the second boundary subject 91B is not present at the far point distance, the determination is set as negative, and the moving image generation processing shifts to step ST22. In step ST18, in a case where the second boundary subject 91B is present at the far point distance, the determination is set as positive, and the moving image generation processing shifts to step ST19.

In step ST19, the second moving image data generation unit 120 generates the first boundary data indicating the region of the first boundary subject 91A that is present at the near point distance based on the distance data acquired in step ST13. Further, the second moving image data generation unit 120 generates the second boundary data indicating the region of the second boundary subject 91B that is present at the far point distance based on the distance data acquired in step ST13. Further, the second moving image data generation unit 120 generates the second moving image data including the first boundary data and the second boundary data based on the first moving image data. After the processing of step ST19 is executed, the moving image generation processing shifts to step ST20.

In step ST20, the moving image data output unit 122 outputs the second moving image data (that is, the second moving image data including the first boundary data and the second boundary data) generated in step ST19 to the display 28 as the moving image data for display. After the processing of step ST20 is executed, the moving image generation processing shifts to step ST27.

In step ST21, the second moving image data generation unit 120 generates the first boundary data indicating the region of the first boundary subject 91A that is present at the near point distance based on the distance data acquired in step ST13. Further, the second moving image data generation unit 120 generates the second moving image data including the first boundary data based on the first moving image data. After the processing of step ST21 is executed, the moving image generation processing shifts to step ST22.

In step ST22, the moving image data output unit 122 outputs the second moving image data (that is, the second moving image data including the first boundary data) generated in step ST18 to the display 28 as the moving image data for display. After the processing of step ST22 is executed, the moving image generation processing shifts to step ST27.

In step ST23, the second subject determination unit 118 determines whether or not the second boundary subject 91B is present at the far point distance based on the distance data acquired in step ST13. In step ST23, in a case where the second boundary subject 91B is not present at the far point distance, the determination is set as negative, and the moving image generation processing shifts to step ST26. In step ST23, in a case where the second boundary subject 91B is present at the far point distance, the determination is set as positive, and the moving image generation processing shifts to step ST24.

In step ST24, the second moving image data generation unit 120 generates the second boundary data indicating the region of the second boundary subject 91B that is present at the far point distance based on the distance data acquired in step ST13. Further, the second moving image data generation unit 120 generates the second moving image data including the second boundary data based on the first moving image data. After the processing of step ST24 is executed, the moving image generation processing shifts to step ST25.

In step ST25, the moving image data output unit 122 outputs the second moving image data (that is, the second moving image data including the second boundary data) generated in step ST24 to the display 28 as the moving image data for display. After the processing of step ST25 is executed, the moving image generation processing shifts to step ST27.

In step ST26, the moving image data output unit 122 outputs the first moving image data generated in step ST11 to the display 28 as the moving image data for display. After the processing of step ST26 is executed, the moving image generation processing shifts to step ST27.

In step ST27, the moving image data storage control unit 124 stores the first moving image data generated in step ST11 in the NVM 64 as the moving image data for recording. After the processing of step ST27 is executed, the moving image generation processing shifts to step ST28.

In step ST28, the CPU 62 determines whether or not a condition for ending the moving image generation processing is established. Examples of the condition for ending the moving image generation processing include a condition for switching the operation mode of the imaging apparatus 10 from the imaging mode to the playback mode or the setting mode. In step ST28, in a case where the condition for ending the moving image generation processing is not established, the determination is set as negative, and the moving image generation processing shifts to step ST10 shown in FIG. 12A. In step ST28, in a case where the condition for ending the moving image generation processing is established, the determination is set as positive, and the moving image generation processing is ended. The imaging method described as the action of the imaging apparatus 10 described above is an example of an "imaging method" according to the present disclosed technology.

As described above, in the imaging apparatus 10 according to the first embodiment, for example, in a case where the first subject 90A, the second subject 90B, and the third subject 92 are present within the imaging area, the CPU 62 acquires the distance data related to the distances between the imaging apparatus 10 and the plurality of subjects. The CPU 62 generates the first boundary data indicating the region of the first boundary subject 91A that is present at the near point distance, based on the distance data. Similarly, the CPU 62 generates second boundary data indicating the region of the second boundary subject 91B that is present at the far point distance, based on the distance data. Further, the CPU 62 generates the second moving image data including the first boundary data and the second boundary data, based on the first moving image data. Then, the CPU 62 outputs the second moving image data including the first boundary data and the second boundary data to the display 28 as the moving image data for display. Therefore, for example, the user can understand a position of the near point and a position of the far point of the depth of field by checking a position of the pixel where the first default color is assigned and a position of the pixel where the second default color is assigned in the image displayed on the display 28.

Further, in the imaging apparatus 10 according to the first embodiment, for example, in a case where the first subject 90A and the third subject 92 are present within the imaging area, the CPU 62 acquires the distance data related to the distances between the imaging apparatus 10 and the plurality of subjects. The CPU 62 generates the first boundary data indicating the region of the first boundary subject 91A that is present at the near point distance, based on the distance data. Further, the CPU 62 generates the second moving image data including the first boundary data based on the first moving image data obtained by imaging with the image sensor 20. Then, the CPU 62 outputs the second moving image data including the first boundary data to the display 28 as the moving image data for display. Therefore, for example, the user can understand the position of the near point of the depth of field by checking the position of the pixel where the first default color is assigned in the image displayed on the display 28.

Further, in the imaging apparatus 10 according to the first embodiment, for example, in a case where the second subject 90B and the third subject 92 are present within the imaging area, the CPU 62 acquires the distance data related to the distances between the imaging apparatus 10 and the plurality of subjects. Further, the CPU 62 generates second boundary data indicating the region of the second boundary subject 91B that is present at the far point distance, based on the distance data. Further, the CPU 62 generates the second moving image data including the second boundary data based on the first moving image data obtained by imaging with the image sensor 20. Then, the CPU 62 outputs the second moving image data including the second boundary data to the display 28 as the moving image data for display. Therefore, for example, the user can understand the position of the far point of the depth of field by checking the position of the pixel where the second default color is assigned in the image displayed on the display 28.

Further, in the imaging apparatus 10 according to the first embodiment, focusing position data indicating the region of the in-focus subject 93 present at the object distance is not included in the moving image data for display. Therefore, for example, the user can easily check the expression and/or movement of the in-focus subject 93 based on the image displayed on the display 28 as compared with the case where the region of the in-focus subject 93 and regions other than the region of the in-focus subject 93 are displayed on the display 28 in a manner of being distinguished from each other based on the focusing position data.

Further, the moving image data for display is data for displaying the image, which is represented in a manner in which the region of the boundary subject 91 and regions other than the region of the boundary subject 91 are distinguished from each other, on the display 28. Therefore, for example, the user can discriminate between the region of the boundary subject 91 and regions other than the region of the boundary subject 91 based on the image displayed on the display 28.

Further, the boundary data is data used for the image processing of indicating the region of the boundary subject 91 with respect to the image displayed on the display 28 based on the first moving image data. Therefore, the user can discriminate the region of the boundary subject 91 based on the image in which the image processing is performed.

Further, the image processing is processing of assigning the default color to the pixel corresponding to the region of the boundary subject 91 among the plurality of pixels constituting the image displayed on the display 28. Therefore, the user can discriminate the region of the boundary subject 91 based on the pixel in which the default color is assigned.

Further, in the imaging apparatus 10 according to the first embodiment, for example, in a case where the first subject 90A, the second subject 90B, and the third subject 92 are present within the imaging area, the CPU 62 generates second moving image data including the first boundary data and the second boundary data. The first boundary data is data indicating the region of the first boundary subject 91A that is present at the near point distance, and the second boundary data is data indicating the region of the second boundary subject 91B that is present at the far point distance. Then, the CPU 62 outputs the second moving image data including the first boundary data and the second boundary data to the display 28 as the moving image data for display. Therefore, for example, the user can understand a position of the near point and a position of the far point of the depth of field by checking a position of the pixel where the first default color is assigned and a position of the pixel where the second default color is assigned in the image displayed on the display 28.

Further, the first boundary data is data that represents, in the first manner, the region of the first boundary subject 91A, with respect to the image displayed on the display 28, and the second boundary data is data that represents, in the second manner different from the first manner, the region of the second boundary subject 91B, with respect to the image displayed on the display 28. Therefore, for example, the user can easily discriminate between the first boundary subject 91A and the second boundary subject 91B as compared with the case where the first boundary subject 91A and the second boundary subject 91B are represented in the same manner with respect to the image displayed on the display 28.

Further, the CPU 62 acquires the first region data indicating the region of the first boundary subject 91A that is present at the distance equal to the near point distance among the distances between the imaging apparatus 10 and the plurality of subjects, based on the distance data. The CPU 62 generates the first boundary data that represents, in the first manner, the region of the first boundary subject 91A present at the near point distance, based on the first region data. Therefore, the first boundary data can be generated based on the distance data.

Similarly, the CPU 62 acquires the second region data indicating the region of the second boundary subject 91B that is present at the distance equal to the far point distance among the distances between the imaging apparatus 10 and the plurality of subjects, based on the distance data. The CPU 62 generates the second boundary data that represents, in the second manner, the region of the second boundary subject 91B present at the far point distance, based on the second region data. Therefore, the second boundary data can be generated based on the distance data.

Further, the CPU 62 stores the first moving image data in the NVM 64 as the moving image data for recording. Therefore, in a case where the image is displayed on the display 28 based on the moving image data for recording stored in the NVM 64, it is possible to avoid representing the region of the first boundary subject 91A and/or the region of the second boundary subject 91B in the image in a state of being colored.

Further, the photoelectric conversion element 72, which is included in the image sensor 20, includes the plurality of photosensitive pixels 72B, and the CPU 62 acquires the distance data based on the phase difference pixel data 73B output from the photosensitive pixel 72B. Therefore, a distance sensor other than the image sensor 20 can be eliminated.

Further, the photosensitive pixel 72B is a pixel for selectively outputting the non-phase difference pixel data 73A and the phase difference pixel data 73B. The non-phase difference pixel data 73A is pixel data obtained by performing the photoelectric conversion in the entire region of the photosensitive pixels 72B, and the phase difference pixel data 73B is pixel data obtained by performing the photoelectric conversion in a part of region of the photosensitive pixels 72B. Therefore, the image data 81 and the distance data 82 can be acquired from the imaging data 73.

In the first embodiment, although the first image processing, which is executed by the second moving image data generation unit 120, is processing of assigning the first default color to the pixel corresponding to the region of the first boundary subject 91A present at the near point distance among the plurality of pixels, the first image processing may be processing of assigning first default luminance to the pixel corresponding to the region of the first boundary subject 91A among the plurality of pixels. The first default luminance may be luminance for making luminance of the region of the first boundary subject 91A higher than luminance of the regions other than the region of the first boundary subject 91A or may be luminance for making the luminance of the region of the first boundary subject 91A lower than the luminance of the regions other than the region of the first boundary subject 91A.

Similarly, in the first embodiment, although the second image processing, which is executed by the second moving image data generation unit 120, is processing of assigning the second default color to the pixel corresponding to the region of the second boundary subject 91B present at the far point distance among the plurality of pixels, the second image processing may be processing of assigning second default luminance to the pixel corresponding to the region of the second boundary subject 91B among the plurality of pixels. The second default luminance may be luminance for making luminance of the region of the second boundary subject 91B higher than luminance of the regions other than the region of the second boundary subject 91B or may be luminance for making the luminance of the region of the second boundary subject 91B lower than the luminance of the regions other than the region of the second boundary subject 91B.

Further, the first default luminance may be luminance different from the second default luminance. The first default luminance and the second default luminance are an example of "default luminance" according to the present disclosed technology.

Further, the first image processing may be processing of assigning a first mark, which indicates the region of the first boundary subject 91A, to the image displayed on the display 28. Similarly, the second image processing may be processing of assigning a second mark, which indicates the region of the second boundary subject 91B, to the image displayed on the display 28. Example of the first mark and the second mark include an arrow and/or a frame. A form of the first mark may be different from a form of the second mark. The first mark and the second mark are an example of a "mark" according to the present disclosed technology.

Further, the first image processing may be processing of superimposing a first distance image (that is, a distance image indicating the region of the first boundary subject 91A) generated based on the distance data on the image displayed on the display 28. Similarly, the second image processing may be processing of superimposing a second distance image (that is, a distance image indicating the region of the second boundary subject 91B) generated based on the distance data on the image displayed on the display 28. Examples of the first distance image and the second distance image include an image (for example, a shaded image, a dot image, a contour image, a contour line image, and/or the like) in which the distance data 82 is converted into a heat map. An aspect of the first distance image may be different from an aspect of the second distance image. The first distance image and the second distance image are an example of a "distance image" according to the present disclosed technology.

Further, in the first embodiment, although the red (R) value, the green (G) value, and the blue (B) value of the pixel are changed as an example of the first image processing of assigning the first default color, a luminance (Y) value, a blue difference (Cb) value, and a red difference (Cr) value of the pixel may be changed as an example of the first image processing of assigning the first default color. As an example of this case, for example, an example is given in which the luminance (Y) value of pixel, the blue difference (Cb) value, and the red difference (Cr) value are set to 128, 128, and 0, respectively.

Similarly, in the first embodiment, although the red (R) value, the green (G) value, and the blue (B) value of the pixel are changed as an example of the second image processing of assigning the second default color, the luminance (Y) value, the blue difference (Cb) value, and the red difference (Cr) value of the pixel may be changed as an example of the second image processing of assigning the second default color.

Further, the first image processing may be processing of assigning a first hatching, which indicates the region of the first boundary subject 91A, to the image displayed on the display 28. Similarly, the second image processing may be processing of assigning a second hatching, which indicates the region of the second boundary subject 91B, to the image displayed on the display 28. An aspect of the first hatching may be different from an aspect of the second hatching.

Further, in a case where a pixel before the first default color is assigned and the first default color are the same color, the second moving image data generation unit 120 may set the first default color to color different from that of the pixel before the first default color is assigned. Similarly, in a case where a pixel before the second default color is assigned and the second default color are the same color, the second moving image data generation unit 120 may set the second default color to color different from that of the pixel before the second default color is assigned.

Further, in the first embodiment, the moving image data storage control unit 124 stores the first moving image data generated by the first moving image data generation unit 102 in the NVM 64 as moving image data for recording. However, for example, in a case where the first subject 90A, the second subject 90B, and the third subject 92 are present within the imaging area, the moving image data storage control unit 124 may store the second moving image data (that is, the second moving image data including the first boundary data and the second boundary data), which is generated by the second moving image data generation unit 120, in the NVM 64 as the moving image data for recording.

Further, for example, in a case where the first subject 90A and the third subject 92 are present within the imaging area, the moving image data storage control unit 124 may store the second moving image data (that is, the second moving image data including the first boundary data), which is generated by the second moving image data generation unit 120, in the NVM 64 as the moving image data for recording.

Further, for example, in a case where the second subject 90B and the third subject 92 are present within the imaging area, the moving image data storage control unit 124 may store the second moving image data (that is, the second moving image data including the second boundary data), which is generated by the second moving image data generation unit 120, in the NVM 64 as the moving image data for recording.

Further, in the first embodiment, although the distance is acquired for a subject corresponding to each of the photosensitive pixels 72B included in the photoelectric conversion element 72, the CPU 62 does not necessarily need to acquire the distance from the subjects corresponding to all the photosensitive pixels 72B. That is, the photosensitive pixels 72B for acquiring the distance may be thinned out.

Further, in the first embodiment, although the photoelectric conversion element 72 is an image plane phase difference type photoelectric conversion element in which a pair of photodiodes PD1 and PD2 is provided in one pixel and all the photosensitive pixels 72B have a function of outputting data related to imaging and phase difference, all the photosensitive pixels 72B are not limited to having the function of outputting data related to imaging and a phase difference. The photoelectric conversion element 72 may include a photosensitive pixel 72B that does not have a function of outputting data related to the imaging and a phase difference. Further, the photoelectric conversion element 72 is not limited to an image plane phase difference type photoelectric conversion element in which the pair of photodiodes PD1 and PD2 is provided in one pixel, the photoelectric conversion element 72 may include imaging photosensitive pixels 72B for acquiring the non-phase difference pixel data 73A and phase difference detection photosensitive pixels 72B for acquiring the phase difference pixel data 73B. In this case, the phase difference pixel is provided with a light shielding member to light-receive on one of the first pupil portion region and the second pupil portion region.

Further, in the first embodiment, although the distance data is acquired by the phase difference type photoelectric conversion element 72, it is not limited to the phase difference type, and the distance data may be acquired by using a TOF type photoelectric conversion element, or the distance data may be acquired by using a stereo camera or a depth sensor. Examples of the method of acquiring the distance data using the TOF type photoelectric conversion element include a method using LiDAR. The distance data may be acquired in accordance with the frame rate of the image sensor 20 or may be acquired at a time interval longer or shorter than a time interval defined by the frame rate of the image sensor 20.

Second Embodiment

As an example shown in FIG. 13, in a second embodiment, the configuration of the imaging apparatus 10 is changed as follows with respect to the first embodiment.

That is, the CPU 62 operates as a first distance range setting unit 130 and a second distance range setting unit 132 in addition to the first imaging control unit 100, the first moving image data generation unit 102, the second imaging control unit 104, the distance data acquisition unit 106, the object distance acquisition unit 108, the near point distance acquisition unit 110, the far point distance acquisition unit 112, the first subject determination unit 114, the second subject determination unit 118, the second moving image data generation unit 120, the moving image data output unit 122, and the moving image data storage control unit 124.

The operations of the first imaging control unit 100, the first moving image data generation unit 102, the second imaging control unit 104, the distance data acquisition unit 106, the object distance acquisition unit 108, the near point distance acquisition unit 110, the far point distance acquisition unit 112, the moving image data output unit 122, and the moving image data storage control unit 124 are the same as those in the first embodiment. In the second embodiment, the operations of the first subject determination unit 114, the second subject determination unit 118, and the second moving image data generation unit 120 are different from those in the first embodiment.

Hereinafter, regarding the imaging apparatus 10 according to the second embodiment, the operations of the first distance range setting unit 130, the second distance range setting unit 132, the first subject determination unit 114, the second subject determination unit 118, and the second moving image data generation unit 120 will be described as a difference from the imaging apparatus 10 according to the first embodiment.

The first distance range setting unit 130 sets a first distance range that includes the near point and a first boundary point based on the near point distance acquired by the near point distance acquisition unit 110. The first distance range is a range between the near point and the first boundary point. The first boundary point is positioned on a far point side with respect to the near point. That is, the first distance range is a range extending from the near point to the far point side. The first distance range is a distance range in which the near point distance is set as a lower limit and a first boundary point distance is set as an upper limit. The first boundary point distance is a distance along the depth direction from the main point of the imaging lens 40 to the first boundary point. A width of the first distance range (that is, a difference between the first boundary point distance and the near point distance) may be a predetermined fixed value or may be a designated value assigned to the reception device 76 from the user. The first distance range is an example of a "boundary portion", a "first boundary portion", and a "distance range" according to the present disclosed technology.

A part of the face of the first subject 90A is present within the first distance range. That is, a part of the face of the first subject 90A is present between the near point and the first boundary point. Hereinafter, a part of the face of the first subject 90A, which is present within the first distance range, is referred to as the first boundary subject 91A.

The second distance range setting unit 132 sets a second distance range that includes the far point and a second boundary point based on the far point distance acquired by the far point distance acquisition unit 112. The second distance range is a range between the far point and the second boundary point. The second boundary point is positioned on a near point side with respect to the far point. That is, the second distance range is a range extending from the far point to the near point side. The second distance range is a distance range in which a second boundary point distance is set as a lower limit and the far point distance is set as an upper limit. The second boundary point distance is a distance along the depth direction from the main point of the imaging lens 40 to the second boundary point. A width of the second distance range (that is, a difference between the far point distance and the second boundary point distance) may be a predetermined fixed value or may be a designated value assigned to the reception device 76 from the user. The second distance range is an example of a "boundary portion", a "second boundary portion", and a "distance range" according to the present disclosed technology.

A part of the face of the second subject 90B is present within the second distance range. That is, a part of the face of the second subject 90B is present between the second boundary point and the far point. Hereinafter, a part of the face of the second subject 90B, which is present within the second distance range, is referred to as the second boundary subject 91B.

The first subject determination unit 114 determines whether or not the first boundary subject 91A is present within the first distance range (in other words, whether or not the first boundary subject 91A is present between the near point and the first boundary point) based on the first distance range set by the first distance range setting unit 130. Specifically, based on the first distance range, the first subject determination unit 114 compares the distance obtained for each photosensitive pixel 72B (see FIG. 3) with the first distance range and determines whether or not the distance obtained for each photosensitive pixel 72B includes a distance that falls within the first distance range. That is, in a case where the distance obtained for each photosensitive pixel 72B (see FIG. 3) is denoted by "d", the near point distance is denoted by "$L_1$", and the width of the first distance range is denoted by "$R_1$", the first subject determination unit 114 determines whether or not the distance obtained for each photosensitive pixel 72B includes the distance d that satisfies the following Equation (7).

$$L_1 \leq d \leq L_1 + R_1 \quad (7)$$

The photosensitive pixel 72B, from which the distance that falls within the first distance range is obtained, is the photosensitive pixel 72B corresponding to the first boundary subject 91A. Further, in a case where the distance obtained for each photosensitive pixel 72B includes the distance that falls within the first distance range, the first subject determination unit 114 determines that the first boundary subject 91A is present at the first distance range. On the other hand, in a case where the distance obtained for each photosensitive pixel 72B does not include the distance that falls within the first distance range, the first subject determination unit 114 determines that the first boundary subject 91A is not present at the near point distance.

As an example, in the example shown in FIG. 13, the first boundary subject 91A is present within the first distance range. In a case where the first boundary subject 91A is present within the first distance range, the first subject determination unit 114 determines that the first boundary subject 91A is present within the first distance range.

The second subject determination unit 118 determines whether or not the second boundary subject 91B is present within the second distance range (in other words, whether or not the second boundary subject 91B is present between the second boundary point and the far point) based on the distance data acquired by the distance data acquisition unit 106. Specifically, based on the distance data, the second subject determination unit 118 compares the distance obtained for each photosensitive pixel 72B (see FIG. 3) with the second distance range and determines whether or not the distance obtained for each photosensitive pixel 72B includes a distance that falls within the second distance range. That is, in a case where the distance obtained for each photosensitive pixel 72B (see FIG. 3) is denoted by "d", the far point distance is denoted by "$L_2$", and the width of the second distance range is denoted by "$R_2$", the second subject determination unit 118 determines whether or not the distance obtained for each photosensitive pixel 72B includes the distance d that satisfies the following Equation (8).

$$L_2 - R_2 \leq d \leq L_2 \quad (8)$$

The photosensitive pixel 72B, from which the distance that falls within the second distance range is obtained, is the photosensitive pixel 72B corresponding to the second boundary subject 91B. Further, in a case where the distance obtained for each photosensitive pixel 72B includes the distance that falls within the second distance range, the second subject determination unit 118 determines that the second boundary subject 91B is present at the second distance range. On the other hand, in a case where the distance obtained for each photosensitive pixel 72B does not include the distance that falls within the second distance range, the second subject determination unit 118 determines that the second boundary subject 91B is not present within the second distance range.

As an example, in the example shown in FIG. 13, the second boundary subject 91B is present within the second distance range. In a case where the second boundary subject 91B is present within the second distance range, the second subject determination unit 118 determines that the second boundary subject 91B is present within the second distance range.

The second moving image data generation unit 120 generates first boundary data indicating a region of the first boundary subject 91A present within the first distance range based on the distance data, in a case where the first subject determination unit 114 determines that the first boundary subject 91A is present within the first distance range. Specifically, the second moving image data generation unit 120 generates the first boundary data in the following manner.

That is, the second moving image data generation unit 120 acquires first region data indicating the region of the first boundary subject 91A that is present at the distance that falls within the first distance range among the distances obtained for each photosensitive pixel 72B (see FIG. 3), based on the distance data. The first region data is represented by, for example, an address of the photosensitive pixel 72B. That is, the second moving image data generation unit 120 acquires, as the first region data, the address of the photosensitive pixel 72B from which the distance that falls within the first distance range among the plurality of photosensitive pixels 72B, based on the distance data. The address of the photosensitive pixel 72B is coordinates defined for each photosensitive pixel 72B and is coordinates representing the longitudinal direction and the lateral direction of the photoelectric conversion element 72.

Subsequently, the second moving image data generation unit 120 generates the first boundary data based on the first region data. The first boundary data is data that represents, in the first manner, the region of the first boundary subject 91A (that is, the region indicated by the first region data) present within the first distance range, with respect to the image displayed on the display 28 based on the first moving image data. As an example of the data that represents, in the first manner, the region of the first boundary subject 91A, the first boundary data is data used for the first image processing of representing the region of the first boundary subject 91A present within the first distance range, with respect to the image displayed on the display 28.

As an example, the first image processing is processing of assigning first default color to a pixel (that is, a pixel corresponding to the address of the photosensitive pixel 72B represented by the first region data) corresponding to the region of the first boundary subject 91A present within the first distance range among a plurality of pixels constituting the image displayed on the display 28. The processing of assigning the first default color is the same as that of the first embodiment. The first boundary data is an example of "boundary data" and "first boundary data" according to the present disclosed technology. The first image processing is an example of "image processing" according to the present disclosed technology.

Further, The second moving image data generation unit 120 generates the second boundary data indicating the region of the second boundary subject 91B that is present within the second distance range based on the distance data, in a case where the second subject determination unit 118 determines that the second boundary subject 91B is present within the second distance range. Specifically, the second moving image data generation unit 120 generates the second boundary data in the following manner.

That is, the second moving image data generation unit 120 acquires the second region data indicating the region of the second boundary subject 91B that is present at the distance that falls within the second distance range among the distances obtained for each photosensitive pixel 72B (see FIG. 3), based on the distance data. The second region data is represented by, for example, an address of the photosensitive pixel 72B. That is, the second moving image data generation unit 120 acquires, as the second region data, the address of the photosensitive pixel 72B from which the distance that falls within the second distance range among the plurality of photosensitive pixels 72B, based on the distance data.

Subsequently, the second moving image data generation unit 120 generates the second boundary data based on the second region data. The second boundary data is data that represents, in the second manner different from the first manner, the region of the second boundary subject 91B (that is, the region indicated by the second region data) present within the second distance range, with respect to the image displayed on the display 28 based on the first moving image data. As an example of the data that represents, in the second manner, the region of the second boundary subject 91B, the second boundary data is data used for the second image processing of representing the region of the second boundary subject 91B present within the second distance range, with respect to the image displayed on the display 28 based on the first moving image data.

As an example, the second image processing is processing of assigning the second default color to the pixel (that is, the pixel corresponding to the address of the photosensitive pixel 72B represented by the second region data) corresponding to the region of the second boundary subject 91B present within the second distance range among the plurality of pixels constituting the image displayed on the display 28. The processing of assigning the second default color is the same as that of the first embodiment. The second boundary data is an example of "boundary data" and "second boundary data" according to the present disclosed technology. The second image processing is an example of "image processing" according to the present disclosed technology.

The second moving image data generation unit 120 generates the second moving image data including the first boundary data and the second boundary data based on the first moving image data in a case where the first subject determination unit 114 determines that the first boundary subject 91A is present within the first distance range, and the second subject determination unit 118 determines that the second boundary subject 91B is present within the second distance range. Specifically, the second moving image data generation unit 120 performs the first image processing on the pixel corresponding to the region of the first boundary subject 91A that is present within the first distance range among the plurality of pixels constituting the image displayed on the display 28 based on the first moving image data. Similarly, the second moving image data generation unit 120 performs the second image processing on the pixel corresponding to the region of the second boundary subject 91B that is present within the second distance range among the plurality of pixels constituting the image displayed on the display 28 based on the first moving image data. As a result, the second moving image data generation unit 120 generates the second moving image data that represents an image where the first default color is assigned to the pixel corresponding to the region of the first boundary subject 91A present within the first distance range and the second default color is assigned to the pixel corresponding to the region of the second boundary subject 91B present within the second distance range.

The moving image data output unit 122 outputs the second moving image data (that is, the second moving image data including the first boundary data and the second boundary data) generated by the second moving image data generation unit 120 to the display 28 as moving image data for display in a case where the first subject determination unit 114 determines that the first boundary subject 91A is present within the first distance range, and the second subject determination unit 118 determines that the second boundary subject 91B is present within the second distance range. The display 28 displays the image based on the moving image data for display. In this case, the image 200, which is displayed on the display 28 based on the moving image data, is the same as that in the example shown in FIG. 7 in the first embodiment.

As an example, FIG. 14 shows an example in which the first subject 90A and the third subject 92 are present within the imaging area imaged by the image sensor 20. The positions of the first subject 90A and the third subject 92 are the same as those in the example shown in FIG. 13.

Hereinafter, based on the example shown in FIG. 14, operations of the first imaging control unit 100, the first moving image data generation unit 102, the second imaging control unit 104, the distance data acquisition unit 106, the object distance acquisition unit 108, the near point distance acquisition unit 110, the far point distance acquisition unit 112, the first distance range setting unit 130, the second distance range setting unit 132, the first subject determination unit 114, the second subject determination unit 118, the second moving image data generation unit 120, and the moving image data output unit 122 will be described.

The operations of the first imaging control unit 100, the first moving image data generation unit 102, the second imaging control unit 104, the distance data acquisition unit 106, the object distance acquisition unit 108, the near point distance acquisition unit 110, the far point distance acquisition unit 112, the first subject determination unit 114, the second moving image data generation unit 120, and the moving image data storage control unit 124 are the same as those in the example shown in FIG. 13. In the example shown in FIG. 14, the operations of the second subject determination unit 118, the second moving image data generation unit 120, and the moving image data output unit 122 are different from those in the example shown in FIG. 13. Hereinafter, regarding the example shown in FIG. 14, the operations of the second subject determination unit 118, the second moving image data generation unit 120, and the moving image data output unit 122 will be described as a difference from the example shown in FIG. 13.

As an example, in the example shown in FIG. 14, the second boundary subject 91B (see FIG. 13) is not present within the second distance range. In a case where the second boundary subject 91B is not present within the second distance range, the second subject determination unit 118 determines that the second boundary subject 91B is not present within the second distance range.

The second moving image data generation unit 120 generates the second moving image data including the first boundary data based on the first moving image data in a case where the first subject determination unit 114 determines that the first boundary subject 91A is present within the first distance range, and the second subject determination unit 118 determines that the second boundary subject 91B is not present within the second distance range. Specifically, the second moving image data generation unit 120 performs the first image processing on the pixel corresponding to the region of the first boundary subject 91A that is present within the first distance range among the plurality of pixels constituting the image displayed on the display 28 based on the first moving image data. As a result, the second moving image data generation unit 120 generates the second moving image data that represents an image where the first default color is assigned to the pixel corresponding to the region of the first boundary subject 91A present within the first distance range.

The moving image data output unit 122 outputs the second moving image data (that is, the second moving image data including the first boundary data) generated by the second moving image data generation unit 120 to the display 28 as the moving image data for display in a case where the first subject determination unit 114 determines that the first boundary subject 91A is present within the first distance range, and the second subject determination unit 118 determines that the second boundary subject 91B is not present within the second distance range. The display 28 displays the image based on the moving image data for display. In this case, the image 200, which is displayed on the display 28 based on the moving image data, is the same as that in the example shown in FIG. 9 in the first embodiment.

As an example, FIG. 15 shows an example in which the second subject 90B and the third subject 92 are present within the imaging area imaged by the image sensor 20. The positions of the second subject 90B and the third subject 92 are the same as those in the example shown in FIG. 13.

Hereinafter, based on the example shown in FIG. 15, operations of the first imaging control unit 100, the first moving image data generation unit 102, the second imaging control unit 104, the distance data acquisition unit 106, the object distance acquisition unit 108, the near point distance acquisition unit 110, the far point distance acquisition unit 112, the first distance range setting unit 130, the second distance range setting unit 132, the first subject determination unit 114, the second subject determination unit 118, the second moving image data generation unit 120, and the moving image data output unit 122 will be described.

The operations of the first imaging control unit 100, the first moving image data generation unit 102, the second imaging control unit 104, the distance data acquisition unit 106, the object distance acquisition unit 108, the near point distance acquisition unit 110, the far point distance acquisition unit 112, the second moving image data generation unit 120, the second subject determination unit 118, and the moving image data storage control unit 124 are the same as those in the example shown in FIG. 13. In the example shown in FIG. 15, the operations of the first subject determination unit 114, the second moving image data generation unit 120, and the moving image data output unit 122 are different from those in the example shown in FIG. 13. Hereinafter, regarding the example shown in FIG. 15, the operations of the first subject determination unit 114, the second moving image data generation unit 120, and the moving image data output unit 122 will be described as a difference from the example shown in FIG. 13.

As an example, in the example shown in FIG. 15, the first boundary subject 91A (see FIG. 13) is not present within the first distance range. In a case where the first boundary subject 91A is not present within the first distance range, the first subject determination unit 114 determines that the first boundary subject 91A is not present within the first distance range.

The second moving image data generation unit 120 generates the second moving image data including the second boundary data based on the first moving image data in a case where the first subject determination unit 114 determines that the first boundary subject 91A is not present within the first distance range, and the second subject determination unit 118 determines that the second boundary subject 91B is present within the second distance range. Specifically, the second moving image data generation unit 120 performs the second image processing on the pixel corresponding to the region of the second boundary subject 91B that is present within the second distance range among the plurality of pixels constituting the image displayed on the display 28 based on the first moving image data. As a result, the second moving image data generation unit 120 generates the second moving image data that represents an image where the second default color is assigned to the pixel corresponding to the region of the second boundary subject 91B present within the second distance range.

The moving image data output unit 122 outputs the second moving image data (that is, the second moving image data including the second boundary data) generated by the second moving image data generation unit 120 to the display 28 as the moving image data for display in a case where the first subject determination unit 114 determines that the first boundary subject 91A is not present within the first distance range, and the second subject determination unit 118 determines that the second boundary subject 91B is present within the second distance range. The display 28 displays the image based on the moving image data for display. In this case, the image 200, which is displayed on the display 28 based on the moving image data, is the same as that in the example shown in FIG. 11 in the first embodiment.

Although not particularly shown in the figure, in a case where the first subject 90A and the second subject 90B are not present within the imaging area imaged by the image sensor 20, the first subject determination unit 114 determines that the first boundary subject 91A is not present within the first distance range, and the second subject determination unit 118 determines that the second boundary subject 91B is not present within the second distance range.

In a case where the first subject determination unit 114 determines that the first boundary subject 91A is not present within the first distance range, and the second subject determination unit 118 determines that the second boundary subject 91B is not present within the second distance range, the operation of the second moving image data generation unit 120 is skipped. That is, the moving image data output unit 122 performs processing without generating the second moving image data by the second moving image data generation unit 120.

The moving image data output unit 122 outputs the first moving image data generated by the first moving image data generation unit 102 to the display 28 as the moving image data for display in a case where the first subject determination unit 114 determines that the first boundary subject 91A is not present within the first distance range, and the second subject determination unit 118 determines that the second boundary subject 91B is not present within the second distance range. The display 28 displays the image based on the moving image data for display. In this case, the first subject 90A and the second subject 90B are not represented as figures in the image displayed on the display 28.

Figure 16A:
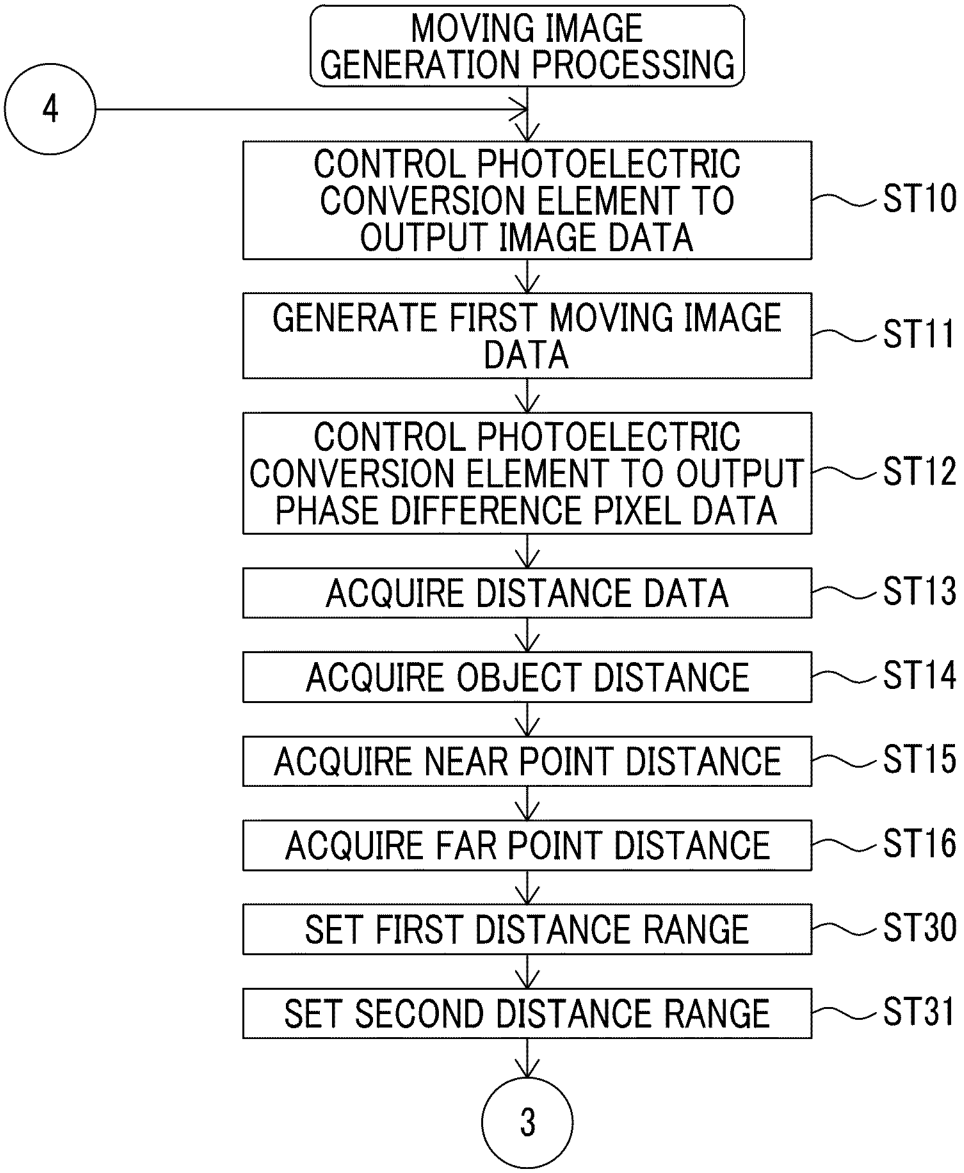
FIG. 16A is a flowchart showing an example of a flow of first processing of the moving image generation processing executed by the CPU according to the second embodiment.

Next, an action of the imaging apparatus 10 according to the second embodiment will be described with reference to FIGS. 16A and 16B. FIGS. 16A and 16B show an example of a flow of the moving image generation processing according to the second embodiment.

In the moving image generation processing according to the second embodiment, step ST10 to step ST16 are the same as those in the first embodiment. In the moving image generation processing shown in FIG. 16A, after the processing of step ST16 is executed, the processing shifts to step ST30.

In step ST30, the first distance range setting unit 130 sets the first distance range including the near point based on the near point distance acquired in step ST15. After the processing of step ST30 is executed, the moving image generation processing shifts to step ST31.

In Step ST31, the second distance range setting unit 132 sets the second distance range including the far point based on the far point distance acquired in step ST16. After the processing of step ST31 is executed, the moving image generation processing shifts to step ST17 shown in FIG. 16B.

In step ST17, the first subject determination unit 114 determines whether or not the first boundary subject 91A is present within the first distance range based on the first distance range set in step ST30 (see FIG. 16A). In step ST17, in a case where the first boundary subject 91A is not present within the first distance range, the determination is set as negative, and the moving image generation processing shifts to step ST23. In step ST17, in a case where the first boundary subject 91A is present within the first distance range, the determination is set as positive, and the moving image generation processing shifts to step ST18.

In step ST18, the second subject determination unit 118 determines whether or not the second boundary subject 91B is present within the second distance range based on the distance data acquired in step ST13. In step ST18, in a case where the second boundary subject 91B is not present within the second distance range, the determination is set as negative, and the moving image generation processing shifts to step ST21. In step ST18, in a case where the second boundary subject 91B is present within the second distance range, the determination is set as positive, and the moving image generation processing shifts to step ST19.

In step ST19, the second moving image data generation unit 120 generates the first boundary data indicating the region of the first boundary subject 91A that is present within the first distance range based on the distance data acquired in step ST13. Further, the second moving image data generation unit 120 generates the second boundary data indicating the region of the second boundary subject 91B that is present within the second distance range based on the distance data acquired in step ST13. Further, the second moving image data generation unit 120 generates the second moving image data including the first boundary data and the second boundary data based on the first moving image data. After the processing of step ST19 is executed, the moving image generation processing shifts to step ST20.

In the moving image generation processing according to the second embodiment, step ST20 is the same as that in the first embodiment.

In step ST21, the second moving image data generation unit 120 generates the first boundary data indicating the region of the first boundary subject 91A that is present within the first distance range based on the distance data acquired in step ST13. Further, the second moving image data generation unit 120 generates the second moving image data including the first boundary data based on the first moving image data. After the processing of step ST21 is executed, the moving image generation processing shifts to step ST22.

In the moving image generation processing according to the second embodiment, step ST22 is the same as that in the first embodiment.

In step ST23, the second subject determination unit 118 determines whether or not the second boundary subject 91B is present within the second distance range based on the distance data acquired in step ST13. In step ST23, in a case where the second boundary subject 91B is not present within the second distance range, the determination is set as negative, and the moving image generation processing shifts to step ST26. In step ST23, in a case where the second boundary subject 91B is present within the second distance range, the determination is set as positive, and the moving image generation processing shifts to step ST24.

In step ST24, the second moving image data generation unit 120 generates the second boundary data indicating the region of the second boundary subject 91B that is present within the second distance range based on the distance data acquired in step ST13. Further, the second moving image data generation unit 120 generates the second moving image data including the second boundary data based on the first moving image data. After the processing of step ST24 is executed, the moving image generation processing shifts to step ST25.

In the moving image generation processing according to the second embodiment, step ST25 to step ST28 are the same as those in the first embodiment.

As described above, in the imaging apparatus 10 according to the second embodiment, the CPU 62 sets the first distance range that includes the near point. Further, the CPU 62 generates first boundary data indicating the region of the first boundary subject 91A that is present within the first distance range, in a case where the first boundary subject 91A is present within the first distance range. Thereafter, the CPU 62 outputs the moving image data for display, which includes the first boundary data, to the display 28. Therefore, for example, even in a case where shaking occurs in the subject and/or the imaging apparatus 10, the first default color can be stably assigned to the pixel corresponding to the region of the first boundary subject 91A among the plurality of pixels constituting the image displayed on the display 28 as compared with the case where the first boundary data, which indicates the region of the first boundary subject 91A present at the near point distance, is generated. That is, even in a case where shaking occurs in the subject and/or the imaging apparatus 10, the fact that the pixel to which the first default color is assigned is interrupted and/or the fact that the pixel to which the first default color is assigned appears or disappears can be suppressed.

Similarly, in the imaging apparatus 10 according to the second embodiment, the CPU 62 sets the second distance range that includes the far point. Further, the CPU 62 generates second boundary data indicating the region of the second boundary subject 91B that is present in the second distance range, in a case where the second boundary subject 91B is present within the second distance range. Thereafter, the CPU 62 outputs the moving image data for display, which includes the second boundary data, to the display 28. Therefore, for example, even in a case where shaking occurs in the subject and/or the imaging apparatus 10, the second default color can be stably assigned to the pixel corresponding to the region of the second boundary subject 91B among the plurality of pixels constituting the image displayed on the display 28 as compared with the case where the second boundary data, which indicates the region of the second boundary subject 91B present at the far point distance, is generated. That is, even in a case where shaking occurs in the subject and/or the imaging apparatus 10, the fact that the pixel to which the second default color is assigned is interrupted and/or the fact that the pixel to which the second default color is assigned appears or disappears can be suppressed.

Further, the first distance range is a range extending from the near point of the depth of field to the far point side of the depth of field. Therefore, for example, even in a case where the first subject 90A is moved from the near point to the far point side, the fact that the pixel to which the first default color is assigned disappears immediately can be suppressed as compared with the case where the first boundary data, which indicates the region of the first boundary subject 91A present at the near point distance, is generated.

Further, the second distance range is a range extending from the far point of the depth of field to the near point side of the depth of field. Therefore, for example, even in a case where the second subject 90B is moved from the far point to the near point side, the fact that the pixel to which the second default color is assigned disappears immediately can be suppressed as compared with the case where the second boundary data, which indicates the region of the second boundary subject 91B present at the far point distance, is generated.

Further, the CPU 62 acquires the first region data indicating the region of the first boundary subject 91A that is present at the distance that falls within the first distance range among the distances between the imaging apparatus 10 and the plurality of subjects, based on the distance data. The CPU 62 generates the first boundary data that represents, in the first manner, the region of the first boundary subject 91A present within the first distance range, based on the first region data. Therefore, the first boundary data can be generated based on the distance data.

Similarly, the CPU 62 acquires the second region data indicating the region of the second boundary subject 91B that is present at the distance that falls within the second distance range among the distances between the imaging apparatus 10 and the plurality of subjects, based on the distance data. The CPU 62 generates the second boundary data that represents, in the second manner, the region of the second boundary subject 91B present within the second distance range, based on the second region data. Therefore, the second boundary data can be generated based on the distance data.

In the imaging apparatus 10 according to the second embodiment, the width of the first distance range and the width of the second distance range may be the same.

Third Embodiment

As an example shown in FIGS. 17 and 18, in a third embodiment, the configuration of the imaging apparatus 10 is changed as follows with respect to the second embodiment.

That is, the CPU 62 operates as a front side depth of field acquisition unit 140 and a rear side depth of field acquisition unit 142 in addition to the first imaging control unit 100, the first moving image data generation unit 102, the second imaging control unit 104, the distance data acquisition unit 106, the object distance acquisition unit 108, the near point distance acquisition unit 110, the far point distance acquisition unit 112, the first distance range setting unit 130, the second distance range setting unit 132, the first subject determination unit 114, the second subject determination unit 118, the second moving image data generation unit 120, and the moving image data output unit 122.

The operations of the first imaging control unit 100, the first moving image data generation unit 102, the second imaging control unit 104, the distance data acquisition unit 106, the object distance acquisition unit 108, the near point distance acquisition unit 110, the far point distance acquisition unit 112, the first subject determination unit 114, the second subject determination unit 118, the second moving image data generation unit 120, the moving image data output unit 122, and the moving image data storage control unit 124 are the same as those in the second embodiment. In the third embodiment, the operations of the first distance range setting unit 130 and the second distance range setting unit 132 are different from those in the second embodiment.

Hereinafter, regarding the imaging apparatus 10 according to the third embodiment, the operations of the first distance range setting unit 130, the second distance range setting unit 132, the front side depth of field acquisition unit 140, and the rear side depth of field acquisition unit 142 will be described as a difference from the imaging apparatus 10 according to the second embodiment. The example shown in FIG. 18 is an example in which the depth of the depth of field is deeper as compared with the example shown in FIG. 17.

The front side depth of field acquisition unit 140 acquires the object distance L, the focal length f, the stop value F, and the allowable confusion circle diameter δ. The front side depth of field acquisition unit 140 acquires the front side depth of field $D_1$ by calculating the front side depth of field $D_1$ using Equation (3) based on the object distance L, the focal length f, the stop value F, and the allowable confusion circle diameter δ. In this case, the front side depth of field acquisition unit 140 acquires the object distance L, the focal length f, the stop value F, and the allowable confusion circle diameter δ in the following manner. That is, the front side depth of field acquisition unit 140 acquires the object distance L acquired by the object distance acquisition unit 108. Further, the front side depth of field acquisition unit 140 acquires, for example, the focal length f stored in advance in the NVM 64. Further, the front side depth of field acquisition unit 140 acquires the stop value F corresponding to the stop amount detected by the stop amount sensor 42C. For example, the front side depth of field acquisition unit 140 acquires the allowable confusion circle diameter δ received by the reception device 76, in a case where the allowable confusion circle diameter δ is assigned to the reception device 76 from the user.

The rear side depth of field acquisition unit 142 acquires the object distance L, the focal length f, the stop value F, and the allowable confusion circle diameter δ. The rear side depth of field acquisition unit 142 acquires the rear side depth of field $D_2$ by calculating the rear side depth of field $D_2$ using Equation (4) based on the object distance L, the focal length f, the stop value F, and the allowable confusion circle diameter δ. In this case, the rear side depth of field acquisition unit 142 acquires the object distance L, the focal length f, the stop value F, and the allowable confusion circle diameter δ in the following manner. That is, the rear side depth of field acquisition unit 142 acquires the object distance L acquired by the object distance acquisition unit 108. Further, the rear side depth of field acquisition unit 142 acquires, for example, the focal length f stored in advance in the NVM 64. Further, the rear side depth of field acquisition unit 142 acquires the stop value F corresponding to the stop amount detected by the stop amount sensor 42C. For example, the rear side depth of field acquisition unit 142 acquires the allowable confusion circle diameter δ received by the reception device 76, in a case where the allowable confusion circle diameter δ is assigned to the reception device 76 from the user.

In a case where the front side depth of field is denoted by "$D_1$", the width of the first distance range is denoted by "$R_1$", and a first coefficient is denoted by "$P_1$", the first distance range setting unit 130 calculates the width $R_1$ of the first distance range by using the following Equation (9) based on the front side depth of field $D_1$ calculated by the front side depth of field acquisition unit 140. The first coefficient $P_1$ is a coefficient for defining a ratio of the width $R_1$ of the first distance range to the front side depth of field $D_1$. The first coefficient $P_1$ is set, for example, in a range of 0.05 to 0.15, and preferably set to substantially 0.10. The first coefficient $P_1$ may be stored in advance, for example, in the NVM 64 or may be provided to the reception device 76 by the user.

$$R_1=D_1\times P_1 \tag{9}$$

As an example shown in FIGS. 17 and 18, the front side depth of field becomes deeper as the depth of the depth of field becomes deeper, and the front side depth of field becomes shallower as the depth of the depth of field becomes shallower. By using Equation (9), the first distance range setting unit 130 increases the width $R_1$ of the first distance range as the front side depth of field $D_1$ becomes deeper, and decreases the width $R_1$ of the first distance range as the front side depth of field $D_1$ becomes shallower.

Further, in a case where the first boundary point distance is denoted by "$L_{p1}$" and the near point distance is denoted by "$L_1$", the first distance range setting unit 130 calculates the first boundary point distance Lo by using the following Equation (10).

$$L_{P1}=L_1+R_1 \tag{10}$$

The first distance range setting unit 130 sets a first distance range in which the near point distance $L_1$ is set as a lower limit and the first boundary point distance $L_{p1}$ is set as an upper limit.

In a case where the rear side depth of field is denoted by "$D_2$", the width of the second distance range is denoted by "$R_2$", and a second coefficient is denoted by "$P_2$", the second distance range setting unit 132 calculates the width $R_2$ of the second distance range by using the following Equation (11) based on the rear side depth of field $D_2$ calculated by the rear side depth of field acquisition unit 142. The second coefficient $P_2$ is a coefficient for defining a ratio of the width $R_2$ of the second distance range to the rear side depth of field $D_2$. The second coefficient $P_2$ is set, for example, in a range of 0.05 to 0.15, and preferably set to substantially 0.10. The second coefficient $P_2$ may be stored in advance, for example, in the NVM 64 or may be provided to the reception device 76 by the user.

$$R_2=D_2\times P_2 \tag{11}$$

As an example shown in FIGS. 17 and 18, the rear side depth of field becomes deeper as the depth of the depth of field becomes deeper, and the front side depth of field becomes shallower as the depth of the depth of field becomes shallower. By using Equation (11), the second distance range setting unit 132 increases the width of the second distance range as the rear side depth of field $D_2$ becomes deeper, and decreases the width of the second distance range as the rear side depth of field $D_2$ becomes shallower.

Further, in a case where the second boundary point distance is denoted by "$L_{p2}$" and the far point distance is denoted by "$L_2$", the second distance range setting unit 132 calculates the second boundary point distance $L_{p2}$ by using the following Equation (12).

$$L_{P2}=D_2+R_2 \tag{12}$$

Thereafter, the second distance range setting unit 132 sets a second distance range in which the second boundary point distance $L_{p2}$ is set as a lower limit and the far point distance $L_2$ is set as an upper limit.

Figure 19:
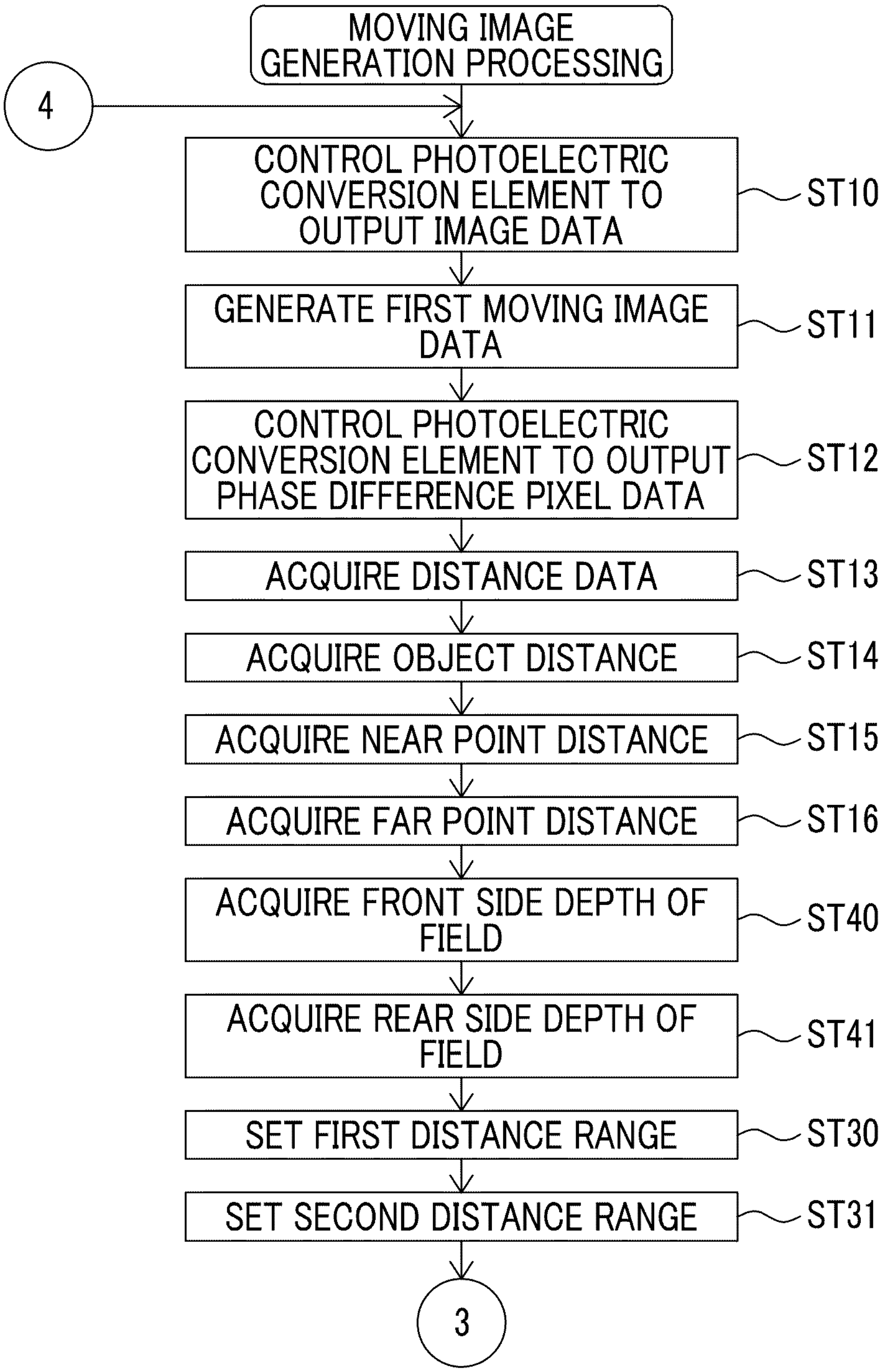
FIG. 19 is a flowchart showing an example of a part of a flow of the moving image generation processing executed by the CPU according to the third embodiment.

Next, an action of the imaging apparatus 10 according to the third embodiment will be described with reference to FIG. 19. FIG. 19 shows an example of a part of a flow of the moving image generation processing according to the third embodiment.

In the moving image generation processing according to the third embodiment, step ST10 to step ST16 are the same as those in the second embodiment. In the moving image generation processing shown in FIG. 19, after the processing of step ST16 is executed, the processing shifts to step ST40.

In step ST40, the front side depth of field acquisition unit 140 acquires the front side depth of field $D_1$ based on the object distance L, the focal length f, the stop value F, and the allowable confusion circle diameter δ. After the processing of step ST40 is executed, the moving image generation processing shifts to step ST41.

In step ST41, the rear side depth of field acquisition unit 142 acquires the rear side depth of field $D_2$ based on the object distance L, the focal length f, the stop value F, and the allowable confusion circle diameter δ. After the processing of step ST41 is executed, the moving image generation processing shifts to step ST30.

In step ST30, the first distance range setting unit 130 sets the first distance range based on the front side depth of field acquired in step ST40. In this case, the first distance range setting unit 130 increases the width of the first distance range as the front side depth of field becomes deeper, and decreases the width of the first distance range as the front side depth of field becomes shallower based on the first coefficient for defining the ratio of the width of the first distance range to the front side depth of field. After the processing of step ST30 is executed, the moving image generation processing shifts to step ST31.

In step ST31, the second distance range setting unit 132 sets the second distance range based on the rear side depth of field acquired in step ST41. In this case, the second distance range setting unit 132 increases the width of the second distance range as the rear side depth of field becomes deeper, and decreases the width of the second distance range as the rear side depth of field becomes shallower based on the second coefficient for defining the ratio of the width of the second distance range to the rear side depth of field. After the processing of step ST31 is executed, the moving image generation processing shifts to step ST17 shown in FIG. 16B.

In the moving image generation processing according to the third embodiment, step ST17 to step ST28 (see FIG. 16B) are the same as those in the second embodiment.

As described above, in the imaging apparatus 10 according to the third embodiment, the CPU 62 changes the width of the first distance range and/or the width of the second distance range according to the depth of the depth of field. That is, the width of the first distance range and/or the width of the second distance range varies depending on the depth of the depth of field. Therefore, for example, even in a case where the front side depth of field and/or the rear side depth of field are changed due to adjustment of the position and/or the stop amount of the focus lens 40B, the default color can be assigned to a pixel corresponding to a region (for example, a range of blurriness from substantially 0.9 times to 1.0 times the pixel) of the boundary subject within a range of the same degree of blurriness.

Further, the CPU 62 increases the width of the first distance range as the depth of the front side depth of field becomes deeper, and decreases the width of the first distance range as the depth of the front side depth of field becomes shallower. Therefore, for example, even in a case where the depth of the front side depth of field is changed, the visibility of the position of the near point of the depth of field can be improved as compared with the case where the width of the first distance range is constant.

Similarly, the CPU 62 increases the width of the second distance range as the depth of the rear side depth of field becomes deeper, and decreases the width of the second distance range as the depth of the rear side depth of field becomes shallower. Therefore, for example, even in a case where the depth of the rear side depth of field is changed, the visibility of the position of the far point of the depth of field can be improved as compared with the case where the width of the second distance range is constant.

The CPU 62 may change the width of the first distance range depending on the number of pixels corresponding to the first distance range among the plurality of pixels constituting the image displayed on the display 28. For example, the CPU 62 may increase the width of the first distance range as the number of pixels corresponding to the first distance range is reduced. In this case, the width of the first distance range varies depending on the number of pixels corresponding to the first distance range. Therefore, for example, even in a case where the number of pixels corresponding to the first distance range is changed, the visibility of the position of the near point of the depth of field can be improved as compared with the case where the width of the first distance range is constant.

Similarly, the CPU 62 may change the width of the second distance range depending on the number of pixels corresponding to the second distance range among the plurality of pixels constituting the image displayed on the display 28. For example, the CPU 62 may increase the width of the second distance range as the number of pixels corresponding to the second distance range is reduced. In this case, the width of the second distance range varies depending on the number of pixels corresponding to the second distance range. Therefore, for example, even in a case where the number of pixels corresponding to the second distance range is changed, the visibility of the position of the far point of the depth of field can be improved as compared with the case where the width of the second distance range is constant.

Further, the CPU 62 may change the width of the first distance range according to the object distance. For example, the CPU 62 may increase the first distance range as the object distance becomes longer and may decrease the first distance range as the object distance becomes shorter. In this case, for example, even in a case where the object distance is changed, the visibility of the position of the near point of the depth of field can be improved as compared with the case where the width of the first distance range is constant.

Similarly, the CPU 62 may change the width of the second distance range according to the object distance. For example, the CPU 62 may increase the second distance range as the object distance becomes longer and may decrease the second distance range as the object distance becomes shorter. In this case, for example, even in a case where the object distance is changed, the visibility of the position of the far point of the depth of field can be improved as compared with the case where the width of the second distance range is constant.

Further, the CPU 62 may change the width of the first distance range and/or the width of the second distance range according to at least one of the focal length or the stop value.

Fourth Embodiment

As an example shown in FIG. 20, in a fourth embodiment, the configuration of the imaging apparatus 10 is changed as follows with respect to the first embodiment.

That is, the CPU 62 operates as a depth of field acquisition unit 150 and an allowable confusion circle diameter acquisition unit 152 in addition to the first imaging control unit 100, the first moving image data generation unit 102, the second imaging control unit 104, the distance data acquisition unit 106, the object distance acquisition unit 108, the near point distance acquisition unit 110, the far point distance acquisition unit 112, the first subject determination unit 114, the second subject determination unit 118, the second moving image data generation unit 120, the moving image data output unit 122, and the moving image data storage control unit 124.

The operations of the first imaging control unit 100, the first moving image data generation unit 102, the second imaging control unit 104, the distance data acquisition unit 106, the object distance acquisition unit 108, the near point distance acquisition unit 110, the far point distance acquisition unit 112, the first subject determination unit 114, the second subject determination unit 118, the second moving image data generation unit 120, the moving image data output unit 122, and the moving image data storage control unit 124 are the same as those in the first embodiment.

Hereinafter, regarding the imaging apparatus 10 according to the fourth embodiment, the operations of the depth of field acquisition unit 150 and the allowable confusion circle diameter acquisition unit 152 will be described as a difference from the imaging apparatus 10 according to the first embodiment.

The depth of field acquisition unit 150 acquires the object distance L, the focal length f, the stop value F, and a default allowable confusion circle diameter $\delta_a$. The depth of field acquisition unit 150 acquires a first rear side depth of field $D_{2a}$ by calculating the first rear side depth of field $D_{2a}$ using Equation (13) based on the object distance L, the focal length f, the stop value F, and the default allowable confusion circle diameter $\delta_a$. The first rear side depth of field $D_{2a}$ is an example of a "first depth of field" according to the present disclosed technology.

$$D_{2a} = \frac{\delta_a F L^2}{f^2 - \delta_a F L} \tag{13}$$

In this case, the depth of field acquisition unit 150 acquires the object distance L, the focal length f, the stop value F, and the default allowable confusion circle diameter $\delta_a$ in the following manner. That is, the depth of field acquisition unit 150 acquires the object distance L acquired by the object distance acquisition unit 108. Further, the depth of field acquisition unit 150 acquires, for example, the focal length f stored in advance in the NVM 64. Further, the depth of field acquisition unit 150 acquires the stop value F corresponding to the stop amount detected by the stop amount sensor 42C. For example, in a case where the default allowable confusion circle diameter $\delta_a$ is assigned to the reception device 76 from the user, the depth of field acquisition unit 150 acquires the default allowable confusion circle diameter $\delta_a$ received by the reception device 76. The default allowable confusion circle diameter is an example of a "default allowable confusion circle diameter" according to the present disclosed technology.

Figure 21:
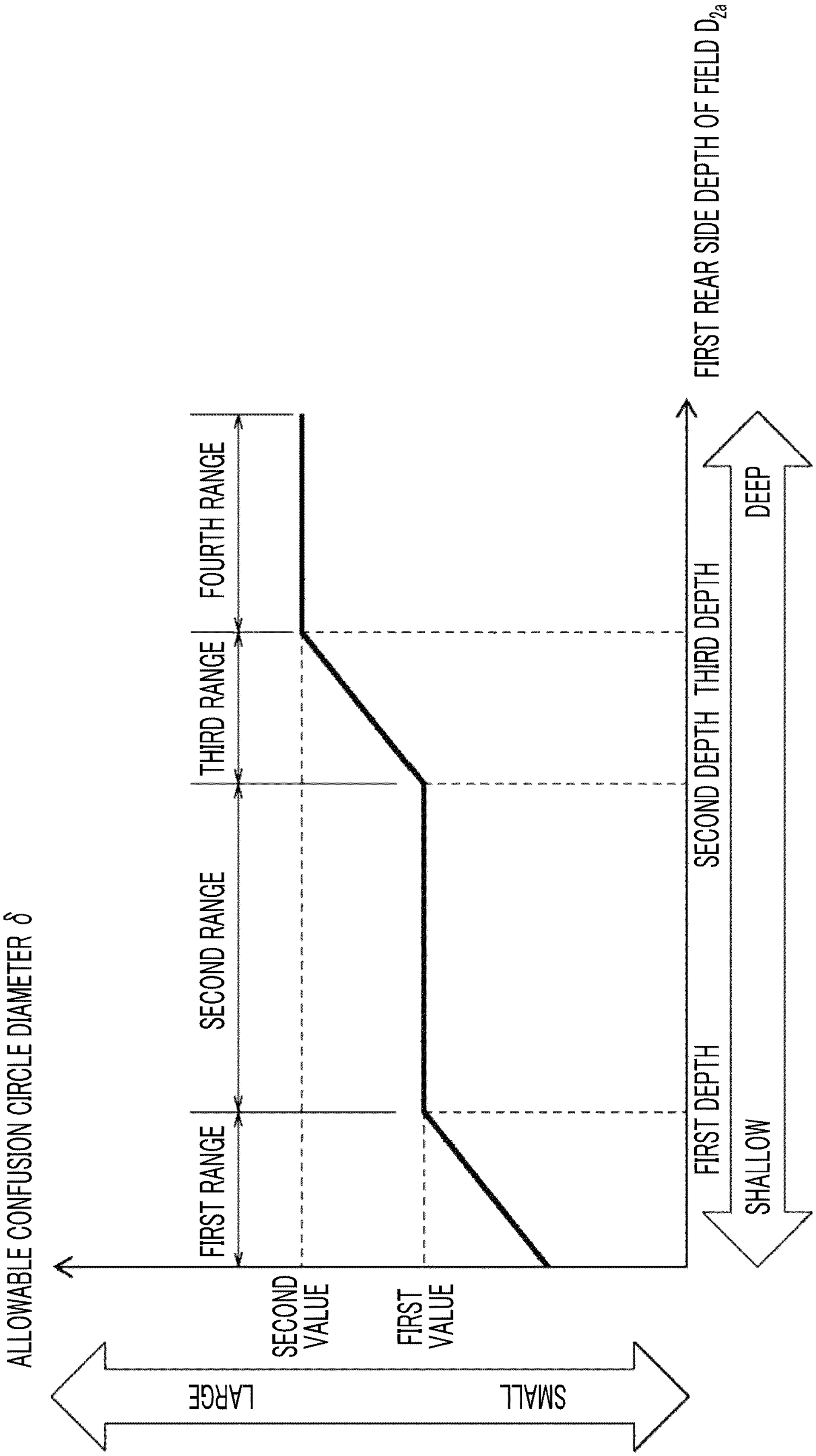
FIG. 21 is an explanatory diagram showing an example of a relationship between a first rear side depth of field and an allowable confusion circle diameter according to the fourth embodiment.

As an example, FIG. 21 shows the allowable confusion circle diameter δ corresponding to the first rear side depth of field $D_{2a}$. In a relationship between the first rear side depth of field $D_{2a}$ and the allowable confusion circle diameter δ shown in FIG. 21, the first rear side depth of field $D_{2a}$ is divided into a first range, a second range, a third range, and a fourth range. The first range is a range shallower than a first depth. The second range is a range equal to or deeper than the first depth and shallower than a second depth. The third range is a range equal to or deeper than the second depth and shallower than a third depth. The fourth range is a range equal to or deeper than the third depth. The first depth is an example of a "first default depth" according to the present disclosed technology.

In the first range, the allowable confusion circle diameter δ becomes smaller as the first rear side depth of field $D_{2a}$ becomes shallower. That is, in a case where the first rear side depth of field $D_{2a}$ is shallower than the first depth, the allowable confusion circle diameter δ is smaller than a first value. In the second range, the allowable confusion circle diameter δ is constant with the first value. That is, in a case where the first rear side depth of field $D_{2a}$ is the depth of the second range, the allowable confusion circle diameter δ is the first value. The value is an example of a "first default value" according to the present disclosed technology. In the third range, the allowable confusion circle diameter δ becomes larger as the first rear side depth of field $D_{2a}$ becomes deeper. That is, in a case where the first rear side depth of field $D_{2a}$ is the depth of the third range, the allowable confusion circle diameter δ is equal to or greater than the first value and less than the second value. In the fourth range, the allowable confusion circle diameter δ is constant with the second value. That is, in a case where the first rear side depth of field $D_{2a}$ is the depth of the fourth range, the allowable confusion circle diameter δ is the second value. The relationship between the first rear side depth of field $D_{2a}$ and the allowable confusion circle diameter δ shown in FIG. 21 is stored in the NVM 64 shown in FIG. 20 as relationship data.

The allowable confusion circle diameter acquisition unit 152 acquires the allowable confusion circle diameter δ by extracting the allowable confusion circle diameter δ corresponding to the first rear side depth of field $D_{2a}$, based on the relationship data.

Figure 22:
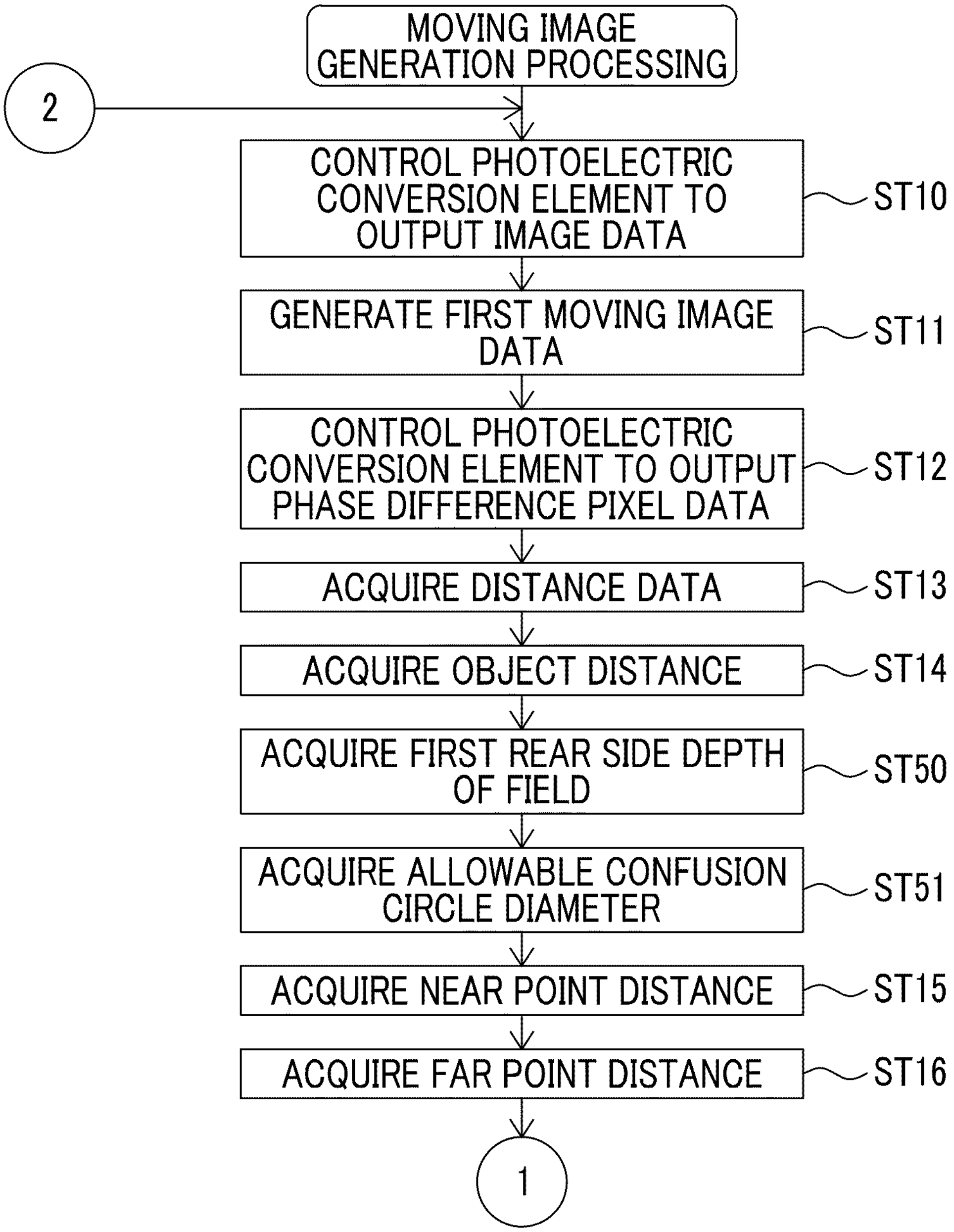
FIG. 22 is a flowchart showing an example of a part of a flow of the moving image generation processing executed by the CPU according to the fourth embodiment.

Next, an action of the imaging apparatus 10 according to the fourth embodiment will be described with reference to FIG. 22. FIG. 22 shows an example of a part of a flow of the moving image generation processing according to the fourth embodiment.

In the moving image generation processing according to the fourth embodiment, step ST10 to step ST14 are the same as those in the first embodiment. In the moving image generation processing shown in FIG. 22, after the processing of step ST14 is executed, the processing shifts to step ST50.

In step ST50, the depth of field acquisition unit 150 acquires the first rear side depth of field $D_{2a}$ based on the object distance L, the focal length f, the stop value F, and the default allowable confusion circle diameter $\delta_a$. After the processing of step ST50 is executed, the moving image generation processing shifts to step ST51.

In step ST51, the allowable confusion circle diameter acquisition unit 152 acquires the allowable confusion circle diameter δ corresponding to the first rear side depth of field $D_{2a}$, based on the relationship data. After the processing of step ST51 is executed, the moving image generation processing shifts to step ST15.

In the moving image generation processing according to the fourth embodiment, step ST15 to step ST16 are the same as those in the first embodiment. After the processing of step ST16 is executed, the moving image generation processing shifts to step ST17 shown in FIG. 12B. In the moving image generation processing according to the fourth embodiment, step ST17 to step ST28 (see FIG. 12B) are the same as those in the first embodiment.

As described above, in the imaging apparatus 10 according to the fourth embodiment, the CPU 62 changes the allowable confusion circle diameter δ according to the object distance L, the focal length f, and the stop value F in the imaging lens 40. That is, allowable confusion circle diameter δ varies depending on at least one of the object distance L, the focal length f, or the stop value F in the imaging lens. Therefore, it is possible to adjust to the blurriness amount in accordance with the object distance L, the focal length f, and the stop value F.

Further, the CPU 62 acquires the first rear side depth of field $D_{2a}$ based on the object distance L, the focal length f, the stop value F, and the default allowable confusion circle diameter $\delta_a$. In a case where the depth of the first rear side depth of field $D_{2a}$ is shallower than the first depth, the CPU 62 sets the allowable confusion circle diameter δ to a value smaller than the first value. Therefore, for example, the blurriness amount can be limited to a range in which the user does not feel the blurriness as compared with the case where the allowable confusion circle diameter δ is constant.

In the imaging apparatus 10 according to the fourth embodiment, the CPU 62 may change the allowable confusion circle diameter δ according to at least one of the object distance L, the focal length f, or the stop value F in the imaging lens 40.

Further, in the imaging apparatus 10 according to the fourth embodiment, the relationship between the first rear side depth of field $D_{2a}$ and the allowable confusion circle diameter δ is set in advance as the relationship data. The CPU 62 sets an allowable confusion circle diameter δ by using the first rear side depth of field $D_{2a}$ based on the relationship data. However, similar to the relationship between the first rear side depth of field $D_{2a}$ and the allowable confusion circle diameter δ, a relationship between the first front side depth of field $D_{1a}$ and the allowable confusion circle diameter δ may be set in advance as the relationship data. The CPU 62 may set the allowable confusion circle diameter δ by using the first front side depth of field $D_{1a}$ based on the relationship data. In this case also, for example, the blurriness amount can be limited to a range in which the user does not feel the blurriness as compared with the case where the allowable confusion circle diameter δ is constant.

Further, in a case where an average of the first rear side depth of field $D_{2a}$ and the first front side depth of field $D_{1a}$ is defined as an average depth of field, a relationship between the average depth of field and the allowable confusion circle diameter δ may be set in advance as the relationship data. The CPU 62 may set allowable confusion circle diameter δ by using the average depth of field based on the relationship data. In this case also, for example, the blurriness amount can be limited to a range in which the user does not feel the blurriness as compared with the case where the allowable confusion circle diameter δ is constant.

Fifth Embodiment

As an example shown in FIG. 23, in a fifth embodiment, the configuration of the imaging apparatus 10 is changed as follows with respect to the first embodiment.

That is, the CPU 62 operates as an operation mode determination unit 160 in addition to the first imaging control unit 100, the first moving image data generation unit 102, the second imaging control unit 104, the distance data acquisition unit 106, the object distance acquisition unit 108, the near point distance acquisition unit 110, the far point distance acquisition unit 112, the first subject determination unit 114, the second subject determination unit 118, the second moving image data generation unit 120, the moving image data output unit 122, and the moving image data storage control unit 124.

The operations of the first imaging control unit 100, the first moving image data generation unit 102, the second imaging control unit 104, the distance data acquisition unit 106, the object distance acquisition unit 108, the near point distance acquisition unit 110, the far point distance acquisition unit 112, the first subject determination unit 114, the second subject determination unit 118, and the moving image data storage control unit 124 are the same as those in the first embodiment. In the fifth embodiment, the operations of the second moving image data generation unit 120 and the moving image data output unit 122 are different from those in the first embodiment.

Hereinafter, regarding the imaging apparatus 10 according to the fifth embodiment, the operations of the operation mode determination unit 160, the second moving image data generation unit 120, and the moving image data output unit 122 will be described as a difference from the imaging apparatus 10 according to the first embodiment.

The operation mode determination unit 160 determines whether the operation mode of the imaging apparatus 10 is a live view image display mode or a moving image recording mode. The live view image display mode is a mode in which a live view image is displayed on the display 28 based on the moving image data. The moving image recording mode is a mode in which an image is displayed on the display 28 based on the moving image data and moving image recording data is stored in the NVM 64.

The second moving image data generation unit 120 generates the focusing position data indicating the region of the in-focus subject 93 that is present at the object distance based on the distance data, in a case where the operation mode determination unit 160 determines that the operation mode of the imaging apparatus 10 is the live view image display mode. Specifically, the second moving image data generation unit 120 generates the focusing position data in the following manner.

That is, the second moving image data generation unit 120 acquires focus region data indicating the region of the in-focus subject 93 that is present at the distance equal to the object distance among the distances obtained for each photosensitive pixel 72B (see FIG. 3), based on the distance data. The focus region data is represented by, for example, an address of the photosensitive pixel 72B. That is, the second moving image data generation unit 120 acquires, as the focus region data, the address of the photosensitive pixel 72B from which the distance equal to the object distance is obtained among the plurality of photosensitive pixels 72B, based on the distance data. The address of the photosensitive pixel 72B is coordinates defined for each photosensitive pixel 72B and is coordinates representing the longitudinal direction and the lateral direction of the photoelectric conversion element 72.

Subsequently, the second moving image data generation unit 120 generates the focusing position data based on the focus region data. The focusing position data is data that represents, in a third manner different from the first manner and the second manner, the region of the in-focus subject 93 (that is, the region indicated by third region data) present at the object distance, with respect to the image displayed on the display 28 based on the first moving image data. For example, the focusing position data is data used for third image processing of indicating the region of the in-focus subject 93 present at the object distance, with respect to the image displayed on the display 28.

As an example, the third image processing is processing of assigning third default color to a pixel (that is, a pixel corresponding to the address of the photosensitive pixel 72B represented by the focus region data) corresponding to the region of the in-focus subject 93 present at the object distance among the plurality of pixels constituting the image displayed on the display 28. The processing of assigning the third default color is, for example, processing of replacing a signal value of a pixel with a value corresponding to the third default color. The third default color is color different from the first default color and the second default color. The third default color may be achromatic color or may be chromatic color. The third default color is, for example, red, blue, yellow, or the like. The focusing position data is one example of "focusing position data" according to the present disclosed technology. The second image processing is an example of "image processing" according to the present disclosed technology.

As an example, as shown in FIG. 23, in a case where the first subject determination unit 114 determines that the first boundary subject 91A is present at the near point distance, the second subject determination unit 118 determines that the second boundary subject 91B is present at the far point distance, and the operation mode determination unit 160 determines that the operation mode of the imaging apparatus 10 is the live view image display mode, by the fact that the first boundary subject 91A and the second boundary subject 91B are present, the second moving image data generation unit 120 generates the second moving image data including the first boundary data, the second boundary data, and the focusing position data, based on the first moving image data.

Specifically, the second moving image data generation unit 120 performs the first image processing on the pixel corresponding to the region of the first boundary subject 91A that is present at the near point distance among the plurality of pixels constituting the image displayed on the display 28 based on the first moving image data. Similarly, the second moving image data generation unit 120 performs the second image processing on the pixel corresponding to the region of the second boundary subject 91B that is present at the far point distance among the plurality of pixels constituting the image displayed on the display 28 based on the first moving image data. Further, the second moving image data generation unit 120 performs the third image processing on the pixel corresponding to the region of the in-focus subject 93 that is present at the object distance among the plurality of pixels constituting the image displayed on the display 28 based on the first moving image data. As a result, the second moving image data generation unit 120 generates the second moving image data that represents an image where the first default color is assigned to the pixel corresponding to the region of the first boundary subject 91A present at the near point distance, the second default color is assigned to the pixel corresponding to the region of the second boundary subject 91B present at the far point distance, and the third default color is assigned to the pixel corresponding to the region of the in-focus subject 93 present at the object distance.

The moving image data output unit 122 outputs the second moving image data (that is, the second moving image data including the first boundary data, the second boundary data, and the focusing position data) generated by the second moving image data generation unit 120 to the display 28 as the moving image data for display, in a case where the first subject determination unit 114 determines that the first boundary subject 91A is present at the near point distance, the second subject determination unit 118 determines that the second boundary subject 91B is present at the far point distance, and the operation mode determination unit 160 determines that the operation mode of the imaging apparatus 10 is the live view image display mode. The display 28 displays the image based on the moving image data for display. In this case, the image, which is displayed on the display 28, is the live view image.

Figure 24:
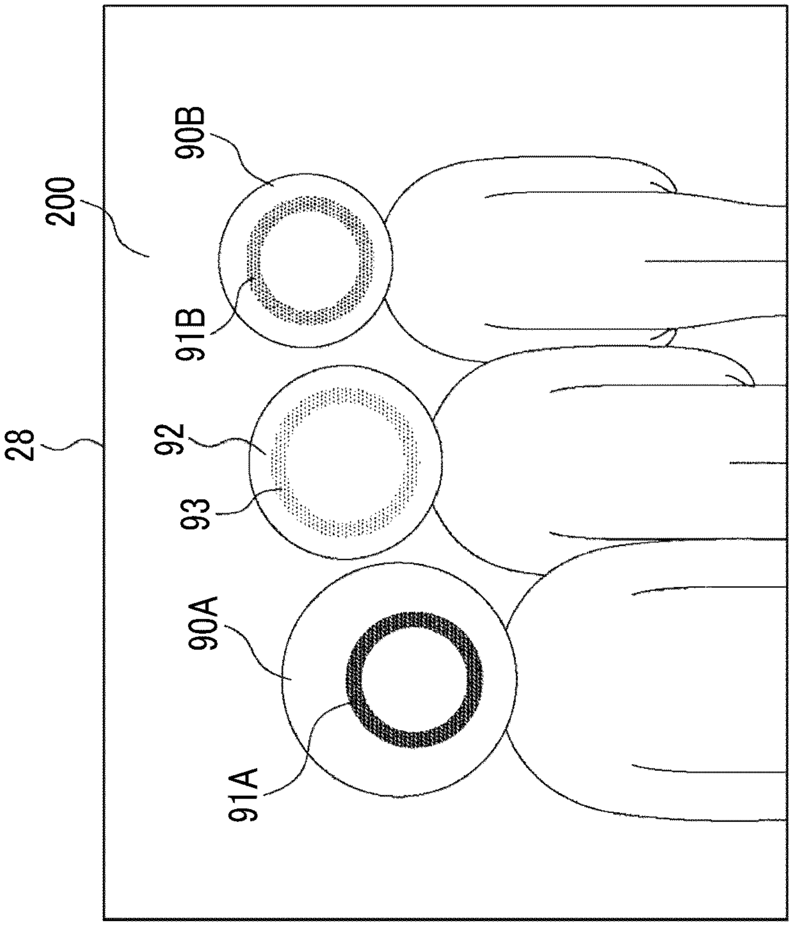
FIG. 24 is a front view showing an example of an image obtained by using the first operation example of the imaging apparatus according to the fifth embodiment.

As an example, FIG. 24 shows an image 200 displayed on the display 28 based on the second moving image data generated in the example shown in FIG. 23. In the image 200 shown in FIG. 24, the region of the in-focus subject 93 and regions other than the region of the in-focus subject 93 are represented in a manner of being distinguished from each other. Further, in the image 200 shown in FIG. 24, the region of the in-focus subject 93 is represented in a manner in which the region of the in-focus subject 93 is distinguished from the region of the first boundary subject 91A and the region of the second boundary subject 91B. That is, as an example, in the image 200 shown in FIG. 24, the region of the first boundary subject 91A is represented with the first default color, the region of the second boundary subject 91B is represented with the second default color, and the region of the in-focus subject 93 is represented with the third default color.

In a case where the first subject determination unit 114 determines that the first boundary subject 91A is present at the near point distance, the second subject determination unit 118 determines that the second boundary subject 91B is present at the far point distance, and the operation mode determination unit 160 determines that the operation mode of the imaging apparatus 10 is the moving image recording mode, the second moving image data generation unit 120 generates the second moving image data including the first boundary data and the second boundary data based on the first moving image data.

The moving image data output unit 122 outputs the second moving image data (that is, the second moving image data including the first boundary data and the second boundary data) generated by the second moving image data generation unit 120 to the display 28 as the moving image data for display, in a case where the first subject determination unit 114 determines that the first boundary subject 91A is present at the near point distance, the second subject determination unit 118 determines that the second boundary subject 91B is present at the far point distance, and the operation mode determination unit 160 determines that the operation mode of the imaging apparatus 10 is the moving image recording mode.

Further, in a case where the first subject determination unit 114 determines that the first boundary subject 91A is present at the near point distance, the second subject determination unit 118 determines that the second boundary subject 91B is not present at the far point distance, and the operation mode determination unit 160 determines that the operation mode of the imaging apparatus 10 is the live view image display mode, the second moving image data generation unit 120 generates the second moving image data including the first boundary data and the focusing position data based on the first moving image data.

The moving image data output unit 122 outputs the second moving image data (that is, the second moving image data including the first boundary data and the focusing position data) generated by the second moving image data generation unit 120 to the display 28 as the moving image data for display, in a case where the first subject determination unit 114 determines that the first boundary subject 91A is present at the near point distance, the second subject determination unit 118 determines that the second boundary subject 91B is not present at the far point distance, and the operation mode determination unit 160 determines that the operation mode of the imaging apparatus 10 is the live view image display mode.

Further, in a case where the first subject determination unit 114 determines that the first boundary subject 91A is present at the near point distance, the second subject determination unit 118 determines that the second boundary subject 91B is not present at the far point distance, and the operation mode determination unit 160 determines that the operation mode of the imaging apparatus 10 is the moving image recording mode, the second moving image data generation unit 120 generates the second moving image data including the first boundary data based on the first moving image data.

The moving image data output unit 122 outputs the second moving image data (that is, the second moving image data including the first boundary data) generated by the second moving image data generation unit 120 to the display 28 as the moving image data for display, in a case where the first subject determination unit 114 determines that the first boundary subject 91A is present at the near point distance, the second subject determination unit 118 determines that the second boundary subject 91B is not present at the far point distance, and the operation mode determination unit 160 determines that the operation mode of the imaging apparatus 10 is the moving image recording mode.

Further, in a case where the first subject determination unit 114 determines that the first boundary subject 91A is not present at the near point distance, the second subject determination unit 118 determines that the second boundary subject 91B is present at the far point distance, and the operation mode determination unit 160 determines that the operation mode of the imaging apparatus 10 is the live view image display mode, the second moving image data generation unit 120 generates the second moving image data including the second boundary data and the focusing position data based on the first moving image data.

The moving image data output unit 122 outputs the second moving image data (that is, the second moving image data including the second boundary data and the focusing position data) generated by the second moving image data generation unit 120 to the display 28 as the moving image data for display, in a case where the first subject determination unit 114 determines that the first boundary subject 91A is not present at the near point distance, the second subject determination unit 118 determines that the second boundary subject 91B is present at the far point distance, and the operation mode determination unit 160 determines that the operation mode of the imaging apparatus 10 is the live view image display mode.

Further, in a case where the first subject determination unit 114 determines that the first boundary subject 91A is not present at the near point distance, the second subject determination unit 118 determines that the second boundary subject 91B is present at the far point distance, and the operation mode determination unit 160 determines that the operation mode of the imaging apparatus 10 is the moving image recording mode, the second moving image data generation unit 120 generates the second moving image data including the second boundary data based on the first moving image data.

The moving image data output unit 122 outputs the second moving image data (that is, the second moving image data including the second boundary data) generated by the second moving image data generation unit 120 to the display 28 as the moving image data for display, in a case where the first subject determination unit 114 determines that the first boundary subject 91A is not present at the near point distance, the second subject determination unit 118 determines that the second boundary subject 91B is present at the far point distance, and the operation mode determination unit 160 determines that the operation mode of the imaging apparatus 10 is the moving image recording mode.

Further, in a case where the first subject determination unit 114 determines that the first boundary subject 91A is not present at the near point distance, the second subject determination unit 118 determines that the second boundary subject 91B is not present at the far point distance, and the operation mode determination unit 160 determines that the operation mode of the imaging apparatus 10 is the live view image display mode, the second moving image data generation unit 120 generates the second moving image data including the focusing position data based on the first moving image data.

The moving image data output unit 122 outputs the second moving image data (that is, the second moving image data including the focusing position data) generated by the second moving image data generation unit 120 to the display 28 as the moving image data for display, in a case where the first subject determination unit 114 determines that the first boundary subject 91A is not present at the near point distance, the second subject determination unit 118 determines that the second boundary subject 91B is not present at the far point distance, and the operation mode determination unit 160 determines that the operation mode of the imaging apparatus 10 is the live view image display mode.

Further, in a case where the first subject determination unit 114 determines that the first boundary subject 91A is not present at the near point distance, the second subject determination unit 118 determines that the second boundary subject 91B is not present at the far point distance, and the operation mode determination unit 160 determines that the operation mode of the imaging apparatus 10 is the moving image recording mode, the moving image data output unit 122 outputs the first moving image data to the display 28 as the moving image data for display.

In a case where the operation mode determination unit 160 determines that the operation mode of the imaging apparatus 10 is the moving image recording mode, the image, which is displayed on the display 28 based on the second moving image data, is a record image (for example, a postview image).

The live view image is an example of a "display image" according to the present disclosed technology. The record image is an example of a "record image" according to the present disclosed technology. The focusing position data is one example of "focusing position data" according to the present disclosed technology. The second moving image data including the focusing position data is an example of "display image data" according to the present disclosed technology.

Figure 25A:
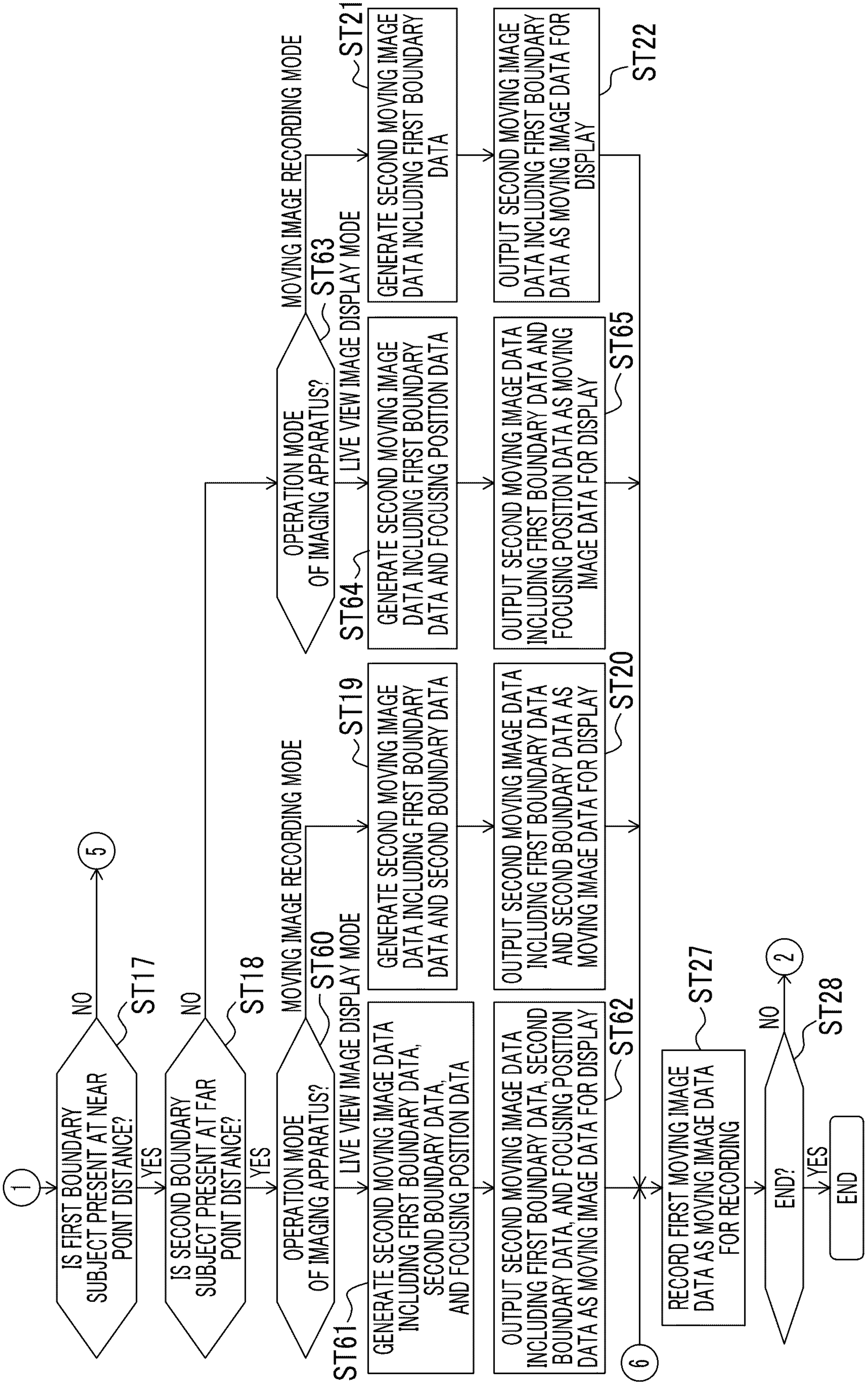
FIG. 25A is a flowchart showing an example of a flow of first processing of the moving image generation processing executed by the CPU according to the fifth embodiment.

Next, an action of the imaging apparatus 10 according to the fifth embodiment will be described with reference to FIGS. 25A and 25B. FIGS. 25A and 25B show an example of a part of a flow of the moving image generation processing according to the fifth embodiment.

In the moving image generation processing according to the fifth embodiment, step ST10 to step ST16 (see FIG. 12A) and step ST17 to step ST18 shown in FIG. 25A are the same as those in the first embodiment. In the moving image generation processing shown in FIG. 25A, after the processing of step ST18 is executed, the processing shifts to step ST60.

In step ST60, the operation mode determination unit 160 determines whether the operation mode of the imaging apparatus 10 is a live view image display mode or a moving image recording mode. In step ST60, in a case where the operation mode of the imaging apparatus 10 is the live view image display mode, the moving image generation processing shifts to step ST61. In step ST60, in a case where the operation mode of the imaging apparatus 10 is the moving image recording mode, the moving image generation processing shifts to step ST19. Step ST19 and step ST20 shown in FIG. 25A are the same as those in the first embodiment.

In step ST61, the second moving image data generation unit 120 generates the focusing position data indicating the region of the in-focus subject 93 that is present at the object distance, based on the distance data acquired in step ST13 (see FIG. 12A). Further, the second moving image data generation unit 120 generates the second moving image data including the first boundary data, the second boundary data, and the focusing position data based on the first moving image data. After the processing of step ST61 is executed, the moving image generation processing shifts to step ST62.

In step ST62, the moving image data output unit 122 outputs the second moving image data (that is, the second moving image data including the first boundary data, the second boundary data, and the focusing position data) generated in step ST61 to the display 28 as the moving image data for display. After the processing of step ST62 is executed, the moving image generation processing shifts to step ST27.

In the moving image generation processing shown in FIG. 25A, in a case where the determination is set as negative in the processing of step ST18, the processing shifts to step ST63.

In step ST63, the operation mode determination unit 160 determines whether the operation mode of the imaging apparatus 10 is a live view image display mode or a moving image recording mode. In step ST63, in a case where the operation mode of the imaging apparatus 10 is the live view image display mode, the moving image generation processing shifts to step ST64. In step ST63, in a case where the operation mode of the imaging apparatus 10 is the moving image recording mode, the moving image generation processing shifts to step ST21. Step ST21 and step ST22 shown in FIG. 25A are the same as those in the first embodiment.

In step ST64, the second moving image data generation unit 120 generates the focusing position data indicating the region of the in-focus subject 93 that is present at the object distance, based on the distance data acquired in step ST13. Further, the second moving image data generation unit 120 generates the second moving image data including the first boundary data and the focusing position data based on the first moving image data. After the processing of step ST64 is executed, the moving image generation processing shifts to step ST65.

In step ST65, the moving image data output unit 122 outputs the second moving image data (that is, the second moving image data including the first boundary data and the focusing position data) generated in step ST64 to the display 28 as the moving image data for display. After the processing of step ST65 is executed, the moving image generation processing shifts to step ST27.

In the moving image generation processing shown in FIG. 25A, in a case where the determination is set as negative in the processing of step ST17, the processing shifts to step ST23 shown in FIG. 25B. Step ST23 shown in FIG. 25B is the same as that in the first embodiment. In the moving image generation processing shown in FIG. 25B, after the processing of step ST23 is executed, the processing shifts to step ST66.

In step ST66, the operation mode determination unit 160 determines whether the operation mode of the imaging apparatus 10 is a live view image display mode or a moving image recording mode. In step ST66, in a case where the operation mode of the imaging apparatus 10 is the live view image display mode, the moving image generation processing shifts to step ST67. In step ST66, in a case where the operation mode of the imaging apparatus 10 is the moving image recording mode, the moving image generation processing shifts to step ST24. Step ST24 and step ST25 shown in FIG. 25B are the same as those in the first embodiment.

In step ST67, the second moving image data generation unit 120 generates the focusing position data indicating the region of the in-focus subject 93 that is present at the object distance, based on the distance data acquired in step ST13 (see FIG. 12A). Further, the second moving image data generation unit 120 generates the second moving image data including the second boundary data and the focusing position data based on the first moving image data. After the processing of step ST67 is executed, the moving image generation processing shifts to step ST68.

In step ST68, the moving image data output unit 122 outputs the second moving image data (that is, the second moving image data including the second boundary data and the focusing position data) generated in step ST67 to the display 28 as the moving image data for display. After the processing of step ST68 is executed, the moving image generation processing shifts to step ST27 shown in FIG. 25A.

In the moving image generation processing shown in FIG. 25B, in a case where the determination is set as negative in the processing of step ST23, the processing shifts to step ST69.

In step ST69, the operation mode determination unit 160 determines whether the operation mode of the imaging apparatus 10 is a live view image display mode or a moving image recording mode. In step ST69, in a case where the operation mode of the imaging apparatus 10 is the live view image display mode, the moving image generation processing shifts to step ST70. In step ST69, in a case where the operation mode of the imaging apparatus 10 is the moving image recording mode, the moving image generation processing shifts to step ST26. Step ST26 shown in FIG. 25B is the same as that in the first embodiment.

In step ST70, the second moving image data generation unit 120 generates the focusing position data indicating the region of the in-focus subject 93 that is present at the object distance, based on the distance data acquired in step ST13. Further, the second moving image data generation unit 120 generates the second moving image data including the focusing position data based on the first moving image data. After the processing of step ST70 is executed, the moving image generation processing shifts to step ST71.

In step ST71, the moving image data output unit 122 outputs the second moving image data (that is, the second moving image data including the focusing position data) generated in step ST70 to the display 28 as the moving image data for display. After the processing of step ST71 is executed, the moving image generation processing shifts to step ST27 shown in FIG. 25A.

In the moving image generation processing according to the fifth embodiment, step ST27 to step ST28 shown in FIG. 25A are the same as those in the first embodiment.

As described above, in the imaging apparatus 10 according to the fifth embodiment, in a case where the display image is displayed on the display 28, the CPU 62 generates display image data representing the display image by including the focusing position data, which indicates the region of the in-focus subject 93, in the moving image data, based on the distance data. Further, the CPU 62 outputs the display image data to the display 28. Therefore, in a case where the display image is displayed on the display 28, for example, the user can understand the focusing position by checking the position of the pixel where the third default color is assigned in the image displayed on the display 28. On the other hand, in a case where the record image is displayed on the display 28, the CPU 62 outputs the first moving image data to the display 28. Therefore, in a case where the record image is displayed on the display 28, it is possible to avoid representing the region of the in-focus subject 93 in the image in a state of being colored.

In the fifth embodiment, the second moving image data generation unit 120 may generate the second moving image data stepwise in a case where the second moving image data including the first boundary data, the second boundary data, and the focusing position data is generated. That is, for example, the second moving image data generation unit 120 may generate first temporary moving image data including the first boundary data based on the first moving image data, generate second temporary moving image data including the second boundary data based on the first temporary moving image data, and generate the second moving image data including the focusing position data based on the second temporary moving image data.

Although the first to fifth embodiments have been described above, the above-described embodiments and the modification examples can be combined with each other as long as no inconsistency occurs. Further, in a case where the above-described embodiments and the modification examples are combined and there are a plurality of overlapping steps, priorities may be given to the plurality of steps according to various conditions and the like.

Further, in each of the above embodiments, the moving image data for display is output to the display 28 of the imaging apparatus 10. However, the moving image data for display may be output to, for example, an EVF. Further, the moving image data for display may be output to an external display device provided outside the imaging apparatus 10.

Further, in each of the above embodiments, although the CPU 62 is exemplified, at least one other CPU, at least one GPU, and/or at least one TPU may be used instead of the CPU 62 or together with the CPU 62.

Further, in each of the above embodiments, although an example of the embodiment in which the program 65 is stored in the NVM 64 has been described, the present disclosed technology is not limited to this. For example, the program 65 may be stored in a portable non-temporary computer-readable storage medium such as an SSD or a USB memory (hereinafter, simply referred to as a "non-transitory storage medium"). The program 65 stored in the non-transitory storage medium is installed in the controller 12 of the imaging apparatus 10. The CPU 62 executes the moving image generation processing according to the program 65.

Further, the program 65 may be stored in the storage device such as another computer or a server device connected to the imaging apparatus 10 via the network, the program 65 may be downloaded in response to the request of the imaging apparatus 10, and the program 65 may be installed in the controller 12.

It is not necessary to store all of the programs 65 in the storage device such as another computer or a server device connected to the imaging apparatus 10, or the NVM 64, and a part of the program 65 may be stored.

Further, although the imaging apparatus 10 shown in FIGS. 1 and 2 has a built-in controller 12, the present disclosed technology is not limited to this, for example, the controller 12 may be provided outside the imaging apparatus 10.

Further, in each of the above embodiments, although the controller 12, which includes the CPU 62, NVM 64, and RAM 66, is exemplified, the present disclosed technology is not limited to this, and a device including an ASIC, FPGA, and/or PLD may be applied instead of the controller 12. Further, instead of the controller 12, a combination of a hardware configuration and a software configuration may be used.

Further, as a hardware resource for executing the moving image generation processing described in each of the embodiments, the following various processors can be used. Examples of the processor include software, that is, a CPU, which is a general-purpose processor that functions as a hardware resource for executing the moving image generation processing by executing a program. Further, examples of the processor include a dedicated electric circuit, which is a processor having a circuit configuration specially designed for executing specification processing such as FPGA, PLD, or ASIC. A memory is built-in or connected to any processor, and each processor executes the moving image generation processing by using the memory.

The hardware resource for executing the moving image generation processing may be configured with one of these various types of processors or may be configured with a combination (for example, a combination of a plurality of FPGAs or a combination of a CPU and an FPGA) of two or more processors of the same type or different types. Further, the hardware resource for executing the moving image generation processing may be one processor.

As an example of configuring with one processor, first, one processor is configured with a combination of one or more CPUs and software, and there is an embodiment in which this processor functions as a hardware resource for executing the moving image generation processing. Secondly, as typified by SoC, there is an embodiment in which a processor that implements the functions of the entire system including a plurality of hardware resources for executing the moving image generation processing with one IC chip is used. As described above, the moving image generation processing is implemented by using one or more of the above-mentioned various types of processors as a hardware resource.

Further, as the hardware-like structure of these various types of processors, more specifically, an electric circuit in which circuit elements such as semiconductor elements are combined can be used. Further, the above-mentioned moving image generation processing is only an example. Therefore, it goes without saying that unnecessary steps may be deleted, new steps may be added, or the processing order may be changed within a range that does not deviate from the purpose.

The contents described above and the contents shown in the illustration are detailed explanations of the parts related to the present disclosed technology and are only an example of the present disclosed technology. For example, the description related to the configuration, function, action, and effect described above is an example related to the configuration, function, action, and effect of a portion according to the present disclosed technology. Therefore, it goes without saying that unnecessary parts may be deleted, new elements may be added, or replacements may be made to the contents described above and the contents shown in the illustration, within the range that does not deviate from the purpose of the present disclosed technology. Further, in order to avoid complications and facilitate understanding of the parts of the present disclosed technology, in the contents described above and the contents shown in the illustration, the descriptions related to the common technical knowledge or the like that do not require special explanation in order to enable the implementation of the present disclosed technology are omitted.

In the present specification, "A and/or B" is synonymous with "at least one of A or B." That is, "A and/or B" means that it may be only A, it may be only B, or it may be a combination of A and B. Further, in the present specification, in a case where three or more matters are connected and expressed by "and/or", the same concept as "A and/or B" is applied.

All documents, patent applications, and technical standards described in the present specification are incorporated in the present specification by reference to the same extent in a case where it is specifically and individually described that the individual documents, the patent applications, and the technical standards are incorporated by reference.

What is claimed is:

1. An imaging apparatus comprising:

an image sensor; and a processor, wherein the processor is configured to:

acquire distance data related to distances between the imaging apparatus and a plurality of subjects within an imaging area imaged by the image sensor;

generate boundary data indicating a region of a boundary subject that is present at a distance of a boundary portion of a depth of field, based on the distance data;

generate moving image data including the boundary data based on image data obtained by imaging with the image sensor; and output the moving image data.

2. The imaging apparatus according to claim 1, wherein the processor is configured to output the moving image data as data for displaying, on a first display, a first image represented in a manner in which the region of the boundary subject and regions other than the region of the boundary subject are distinguished from each other.

3. The imaging apparatus according to claim 1, wherein the boundary data is data used in image processing of indicating the region of the boundary subject with respect to a second image displayed on a second display based on the image data.

4. The imaging apparatus according to claim 3, wherein the image processing is processing of assigning default color to a first pixel corresponding to the region of the boundary subject among a plurality of first pixels constituting the second image.

5. The imaging apparatus according to claim 3, wherein the image processing is processing of assigning default luminance to a second pixel corresponding to the region of the boundary subject among a plurality of second pixels constituting the second image.

6. The imaging apparatus according to claim 3, wherein the image processing is processing of assigning a mark indicating the region of the boundary subject to the second image.

7. The imaging apparatus according to claim 3, wherein the image processing is processing of superimposing a distance image, which is generated based on the distance data, on the second image.

8. The imaging apparatus according to claim 1, wherein the boundary portion includes a first boundary portion positioned on a near point side of the depth of field, and a second boundary portion positioned on a far point side of the depth of field, the boundary subject includes a first boundary subject present at a distance of the first boundary portion, and a second boundary subject present at a distance of the second boundary portion, and the boundary data includes first boundary data indicating a region of the first boundary subject, and second boundary data indicating a region of the second boundary subject.

9. The imaging apparatus according to claim 8, wherein the first boundary data is data that represents, in a first manner, the region of the first boundary subject with respect to a third image displayed on a third display based on the image data, and the second boundary data is data that represents, in a second manner different from the first manner, the region of the second boundary subject with respect to the third image.

10. The imaging apparatus according to claim 1, wherein the boundary portion is at least one of a near point or a far point of the depth of field.

11. The imaging apparatus according to claim 10, wherein the processor is configured to:

acquire region data indicating a region of the boundary subject that is present at a distance equal to the distance of the boundary portion among the distances between the imaging apparatus and the plurality of subjects, based on the distance data; and generate the boundary data based on the region data.

12. The imaging apparatus according to claim 1, wherein the boundary portion is at least one of a range including a near point of the depth of field or a range including a far point of the depth of field.

13. The imaging apparatus according to claim 12, wherein the range including the near point of the depth of field is a range extending from the near point of the depth of field to a far point side of the depth of field.

14. The imaging apparatus according to claim 12, wherein the range including the far point of the depth of field is a range extending from the far point of the depth of field to a near point side of the depth of field.

15. The imaging apparatus according to claim 1, wherein the processor is configured to:

set a distance range including the distance of the boundary portion;

acquire region data indicating the region of the boundary subject that is present at a distance falling within the distance range among the distances between the imaging apparatus and the plurality of subjects, based on the distance data; and generate the boundary data based on the region data.

16. The imaging apparatus according to claim 1, wherein a width of the boundary portion varies depending on a depth of the depth of field.

17. The imaging apparatus according to claim 16, wherein the processor is configured to increase the width of the boundary portion as the depth of the depth of field becomes deeper and decrease the width of the boundary portion as the depth of the depth of field becomes shallower.

18. The imaging apparatus according to claim 1, wherein a width of the boundary portion varies depending on the number of pixels corresponding to the boundary portion among a plurality of pixels constituting a fourth image displayed on a fourth display based on the moving image data.

19. The imaging apparatus according to claim 1, further comprising:

an imaging lens, wherein an allowable confusion circle diameter of the image sensor varies depending on at least one of an object distance, a focal length, or a stop value of the imaging lens.

20. The imaging apparatus according to claim 19, wherein the processor is configured to acquire a first depth of field based on the object distance, the focal length, the stop value, and a default allowable confusion circle diameter, and in a case where a depth of the first depth of field is shallower than a first default depth, the allowable confusion circle diameter is smaller than a first default value.

21. The imaging apparatus according to claim 1, wherein the processor is configured to:

generate, in a case where a display image is displayed on a fifth display, display image data representing the display image by including focusing position data, which indicates a region of an in-focus subject present at an object distance among the plurality of subjects, and the boundary data in the moving image data, based on the distance data;

output the display image data to the fifth display; and output, in a case where a record image is displayed on the fifth display, the moving image data to the fifth display.

22. The imaging apparatus according to claim 1, wherein the processor is configured to store the image data in a non-transitory storage medium.

23. The imaging apparatus according to claim 1, wherein the image sensor includes a plurality of phase difference pixels, and the processor is configured to acquire the distance data based on phase difference pixel data output from the phase difference pixel.

24. The imaging apparatus according to claim 23, wherein the phase difference pixel is a pixel for selectively outputting non-phase difference pixel data and the phase difference pixel data, the non-phase difference pixel data is pixel data obtained by performing photoelectric conversion on an entire region of the phase difference pixel, and the phase difference pixel data is pixel data obtained by performing the photoelectric conversion on a part of a region of the phase difference pixel.

25. An imaging method comprising:

acquiring distance data related to distances between an imaging apparatus and a plurality of subjects within an imaging area imaged by an image sensor that is included in the imaging apparatus;

generating boundary data indicating a region of a boundary subject that is present at a distance of a boundary portion of a depth of field, based on the distance data;

generating moving image data including the boundary data based on image data obtained by imaging with the image sensor; and outputting the moving image data.

26. A non-transitory computer-readable storage medium storing a program causing a computer to execute a process comprising:

acquiring distance data related to distances between an imaging apparatus and a plurality of subjects within an imaging area imaged by an image sensor that is included in the imaging apparatus;

generating boundary data indicating a region of a boundary subject that is present at a distance of a boundary portion of a depth of field, based on the distance data;

generating moving image data including the boundary data based on image data obtained by imaging with the image sensor; and outputting the moving image data.

* * * * *